United States Patent [19]

Kopec et al.

[11] Patent Number: 5,883,986
[45] Date of Patent: Mar. 16, 1999

[54] METHOD AND SYSTEM FOR AUTOMATIC TRANSCRIPTION CORRECTION

[75] Inventors: Gary E. Kopec, Belmont; Philip A. Chou, Menlo Park; Leslie T. Niles, Palo Alto, all of Calif.

[73] Assignee: Xerox Corporation, Stamford, Conn.

[21] Appl. No.: 460,454

[22] Filed: Jun. 2, 1995

[51] Int. Cl.$^6$ ............................... G06K 9/03; G06K 9/68
[52] U.S. Cl. .......................... 382/310; 382/155; 382/159; 382/161; 382/215; 382/226; 382/230
[58] Field of Search ................................... 382/229, 230, 382/231, 226, 227, 228, 310, 224, 215, 209, 309, 159, 155, 161, 203, 197

[56] References Cited

U.S. PATENT DOCUMENTS

| | | | |
|---|---|---|---|
| 3,167,746 | 1/1965 | Reines et al. | 340/146.3 |
| 3,548,202 | 12/1970 | Ide et al. | 307/201 |
| 3,969,700 | 7/1976 | Bollinger et al. | 340/146 |
| 4,599,692 | 7/1986 | Tan et al. | 364/513 |
| 4,654,875 | 3/1987 | Srihari et al. | 382/40 |
| 4,769,716 | 9/1988 | Casey et al. | 358/263 |
| 4,979,227 | 12/1990 | Mittelbach et al. | 382/40 |
| 5,020,112 | 5/1991 | Chou | 382/37 |
| 5,048,097 | 9/1991 | Gaborski et al. | 382/14 |
| 5,048,113 | 9/1991 | Yamagata et al. | 382/57 |
| 5,257,328 | 10/1993 | Shimizu | 382/61 |
| 5,303,313 | 4/1994 | Mark et al. | 382/56 |
| 5,321,773 | 6/1994 | Kopec et al. | 382/30 |
| 5,438,630 | 8/1995 | Chou | 382/159 |
| 5,526,444 | 6/1996 | Kopec et al. | 382/233 |
| 5,544,260 | 8/1996 | Chefalas | 382/161 |

FOREIGN PATENT DOCUMENTS

| | | |
|---|---|---|
| 0 312 905 | 4/1989 | European Pat. Off. |
| 0546843 | 6/1993 | European Pat. Off. ......... G06K 9/00 |

OTHER PUBLICATIONS

E.M. Riseman and A.R. Hanson, "A Contextual Postprocessing System for Error Correction Using Binary n–Grams", *IEEE Transactions on Computers*, May 174, pp. 480–493.

J.R. Ullman, "A Binary n–Gram Technique for Automatic Correction of Substitution, Deletion, Insertion and Reversal Errors in Words", *The Computer Journal*, 1977, pp. 141–147.

J.J. Hull and S.N. Srihari, Experiments in Text Recognition with Binary n–Gram and Viterbi Algorithms, *IEEE Transactions on Pattern Analysis and Machine Intelligence*, Sep. 1982, pp. 520–530.

(List continued on next page.)

*Primary Examiner*—Jose L. Couso
*Assistant Examiner*—Matthew C. Bella

[57] ABSTRACT

A method and system for automatically modifying an original transcription produced as the output of a recognition operation produces a second, modified transcription, such as, for example, automatically correcting an errorful transcription produced by an OCR operation. The invention uses information in an input text image of character images and in an original transcription associated with the input text image to modify aspects of a formal image source model that models as a grammar the spatial image structure of a set of text images. A recognition operation is then performed on the input text image using the modified formal image source model to produce a second, modified transcription. When the original transcription is errorful, the second transcription is a corrected transcription. Several aspects of the formal image source model may be modified; in particular, character templates to be used in the recognition operation are trained in the font of the glyphs occurring in the input text image. When errors in the original transcription are caused by matching glyphs against templates that are inadequately specified for the given input text image, the subsequently performed recognition operation on the text image using the trained, font-specific character templates produces a more accurate transcription.

15 Claims, 28 Drawing Sheets

OTHER PUBLICATIONS

G. Kopec, "Least–Squares Font Metric Estimation from Images", in *IEEE Transactions on Image Processing*, Oct., 1993, pp. 510–519.

G. Kopec and P. Chou, "Document Image Decoding Using Markov Source Models." in *IEEE Transactions on Pattern Analysis and Machine Intelligence*, vol. 16, No. 6, Jun. 1994, pp. 602–617.

Huang, Ariki and Jack, *Hidden Markov Models for Speech Recognition* Edinburgh University Press, 1990, chapters 2, 5 and 6, pp. 10–51; 136–166; and 167–185.

L. Rabiner and B. Juang, "An Introduction to Hidden Markov Models", in *IEEE ASSP Magazine*, Jan. 1986, at pp. 4–16.

L. Rabiner, "A Tutorial on Hidden Markov Models and Selected Applications in Speech Recognition", in *Proceedings of the IEEE*, vol. 77, No. 2, Feb., 1989, at pp. 257–285.

H.S. Baird, "A Self–Correcting 100–Font Classifier," in SPIE vol. 2181 Document Recognition, 1994, pp. 106–115.

S. Kuo and O.E. Agazzi, "Keyword spotting in poorly printed documents using pseudo 2D hidden Markov models," in *IEEE Transactions on Pattern Analysis and Machine Intelligence*, vol. 16, No. 8, Aug., 1994, pp. 842–848.

C. Bose and S. Kuo, "Connected and degraded text recognition using a hidden Markov model," in *Proceedings of the International Conference on Pattern Recognition*, Netherlands, Sep. 1992, pp. 116–119.

P.A. Chou and G. E. Kopec, "A Stochastic Attribute Grammar Model of Document Production and Its Use in Document Image Decoding", *Document Recognition II*, Luc M. Vincent, Henry S. Baird, Editors, Proceedings SPIE 2422, pp. 66–73 (Feb., 1995).

A. Kam and G. Kopec, "Separable source models for document image decoding", *Document Recognition II*, Luc M. Vincent, Henry S. Baird, Editors, Proceedings SPIE 2422, pp. 84–97 (Feb., 1995).

A. Kam, "Heuristic Document Image Decoding Using Separable Markov Models", S.M. Thesis, Massachusetts Institute of Technology, Cambridge, MA, Jun., 1993.

M. Brown and J. Wilpon, "A grammar compiler for connected speech recognition," in *IEEE Trans. on Signal Processing*, vol. 39, No. 1, Jan. 1991, pp. 17–28.

K. Y. Wong, R. G. Casey and F.M. Wahl, "Document Analysis System", *IBM J Res Develop.*, vol. 26, No. 6, Nov. 1982, pp. 647–656.

Thomas M. Breuel, "A system for the off–line recognition of handwritten text" in *Proceedings of the International Conference on Pattern Recognition* (ICPR), Oct. 9–13, 1994, Jerusalem, Israel, pp. 129–134.

National Science Foundation (NSF) Grant Proposal for NSF Program Digital Libraries NSF 93–141 Feb. 4, 1994, submitted by the Regents of the University of California, Berkeley, document date Jan. 24, 1994, p. i–xi, 2–5, 36–37, 101, and 106.

"Automatic Switching of Recognition Character Set," IBM Technical Disclosure Bulletin, vol. 37, No. 04B, Apr. 1994, p. 41, Armonk, NY.

European Search Report for EPO counterpart application No. 96303900.3, Jul. 23, 1997.

H.S. Baird, "Self–Correcting 100–font Classifier," in SPIE. vol. 2181 Document Recognition, 1994, pp. 106–115.

G. Kopec and P. Chou, Document Image Decoding Using Markov Source Models in IEEE Trans on Pattern Anal and Machine Intel, vol. 16 Jun. 1994 pp. 602–617.

Fig. 19

530 — Bigram Table

| c1 | c1 → c2 |
|---|---|
| ␣ | F P \n s a d i p - r t h c b T m v l o |
| F | r o |
| r | o t ␣ e s w c y g |
| o | m ␣ l r n \n t v w f |
| m | ␣ e p i u a |
| P | a |
| a | g l r i t n c k |
| g | e . i |
| e | ␣ a n t r m \n l s p y . |
| \n | b F d o m p h |
| b | u e |
| u | t s g |
| t | ␣ o s a h e i |
| s | o t . , ␣ e |
| l | s ␣ e m l y o |
| d | e i |
| i | n l o c t s |
| n | ␣ e t g s - |
| p | a t o i r |
| . | \n ␣ |
| - | m \n |
| , | ␣ |
| h | e o : u a |
| c | o a h c e |
| v | e |
| w | h \n |
| T | y |
| y | p , ␣ |
| : | t |
| f | i |
| k | e |

Augmented Bigram Table

| c1 | c1 → c2 |
|---|---|
| ␣ | F P \n s a d i p - r t h c b T m v l o ⓤ — 542 |
| F | r o |
| r | o t ␣ e s w c y g ⓝ — 544 |
| o | m ␣ l r n \n t v w f |
| m | ␣ e p i u a ⓝ |
| P | a |
| a | g l r i t n c k |
| g | e . i |
| e | ␣ a n t r m \n l s . p y . |
| \n | b F d o m p h |
| b | u e |
| u | t s g |
| t | ␣ o s a h e i ⓝ |
| s | o t . , ␣ e ⓝ |
| l | s ␣ e m l y o ⓝ |
| d | e i |
| i | n l o c t s |
| n | ␣ e t g s - ⓝ |
| p | a t o i r |
| . | \n ␣ |
| - | m \n ⓤ |
| , | ␣ ⓝ |
| h | e o : u a |
| c | o a h c e ← — 546 |
| v | e |
| w | h \n ⓤ |
| T | y |
| y | p , ␣ ⓝ |
| : | t |
| f | i |
| k | e |

*FIG. 24*

From Page \nbut some also deal in stolen parts.\nFor retailers, the temptation to\ndeal in hot components can be\noverwhelming. Typically, these \nmerchants must accept very low\nprofit margins, but they can make\nhuge profits on stolen merchan-\ndise.\n
●
●
●

$$\boxed{\begin{aligned}
&\textbf{procedure } (\mathcal{B}, \mathcal{C}, \mathcal{A}, Z_1, Z_0) \textbf{ do begin}\\
&\quad \textbf{while } \max_{\left\{\begin{array}{l} t \in \mathcal{B} \\ \vec{x} \in \mathcal{C} \\ \alpha_1 \in \mathcal{A} \end{array}\right\}} S_c(\vec{x}; Z_{\sigma(\alpha_1)}, \alpha_1) > 0 \textbf{ do begin}\\
&\quad\quad (s, \vec{w}, \hat{\alpha}_1) := \arg \max_{\left\{\begin{array}{l} t \in \mathcal{B} \\ \vec{x} \in \mathcal{C} \\ \alpha_1 \in \mathcal{A} \end{array}\right\}} S_c(\vec{x}; Z_{\sigma(\alpha_1)}, \alpha_1)\\
&\quad\quad q_s(\vec{w}) := 1\\
&\quad\quad \alpha_1^{(s,\vec{w})} := \hat{\alpha}_1\\
&\quad\quad \textbf{for } i = 1 \ldots N_s \textbf{ do } z_1(\vec{w} + \vec{x}_i^{(s)}) := 0\\
&\quad\quad \textbf{for } i = 1 \ldots N_s \textbf{ do } z_0(\vec{w} + \vec{x}_i^{(s)}) := 1\\
&\quad \textbf{end}\\
&\textbf{end}
\end{aligned}}$$

470

FIG. 31

METHOD AND SYSTEM FOR AUTOMATIC TRANSCRIPTION CORRECTION

CROSS REFERENCE TO OTHER APPLICATIONS

The invention that is the subject matter of the present application is related to several other inventions that are the subject matter of copending, commonly assigned U.S. patent applications, respectively identified as Ser. No. 08/431,223, "Automatic Training of Character Templates Using a Transcription and a Two-Dimensional Image Source Model, now issued as U.S. Pat. No. 5,594,809"; Ser. No. 08/431,253, "Automatic Training of Character Templates Using a Text Line Image Source, a Text Line Transcription and an Image Source Model"; Ser. No. 08/431,714, "Method of Producing Character Templates Using Unsegmented Samples"; and Ser. No. 08/430,635, "Unsupervised Training of Character Templates Using Unsegmented Samples."

FIELD OF THE INVENTION

The present invention relates generally to the field of computer-implemented methods of and systems for character recognition, and more particularly to a method and system for the automatic correction of transcriptions produced by document image decoding and character recognition systems.

BACKGROUND

Information in the form of language symbols (i.e., characters) or other symbolic notation that is visually represented to a human in an image on a marking medium, such as in a printed text document, is capable of manipulation for its semantic content by a computer system when the information is accessible to the processor of the system in an encoded form, such as when each of the language symbols is available to the processor as a respective character code selected from a predetermined set of character codes (e.g. ASCII code) that represent the symbols to applications that use them. Traditionally, manual transcription by a human typist has been used to enter into computers the character codes corresponding to the language symbols visually represented in the image of text documents. In recent years, a mostly automatic software operation variously called "recognition," or "character recognition," or "optical character recognition" (OCR) has been performed on text document images to produce the character codes needed for manipulation by the computer system, and to automate the otherwise tedious task of manual transcription. However, manual text entry output and the output of character recognition operations, both referred to as transcriptions herein, are inherently error-prone; some kind of proofreading or correction process is usually needed when an accurate transcription is desired.

Given a text document image and a transcription of the document image, there are a number of approaches that might be taken to correct errors in that transcription. Before the widespread use of computers, manual proofreading by a human operator was about the only method available, and is still the method of choice when the greatest possible accuracy is needed. For example, the University of Washington provides an extensive document image database for use in various aspects of document processing research; these document images have associated transcriptions that reportedly were each carefully proofread by three separate people, requiring one hour per proofreader per page. But even this close attention had a residual error rate considerably higher than the goal of one per million characters. Automatic proofreading and correction is clearly desirable in order to reduce the manual labor required to produce a final, accurate transcription.

1. Error correction systems

Various types of automatic error correction techniques are commonly used to improve transcription accuracy. These existing techniques are seldom totally automatic because of inherent limitations in their methodologies that prevent them from making what might be called final decisions as to correctness; consequently, these methods almost always involve the manual intervention of a human user who must be the final arbiter as to the corrections to be made. One type of error correction methodology involves performing a character recognition operation on the original document image and comparing the output transcription produced to the original transcription to be corrected in order to highlight the differences between the two transcriptions and to identify likely locations for at least some of the errors in the original transcription. When the original transcription has been generated by a first OCR operation, a second, different OCR operation is used for the correction or proofreading operation. Two types of problems occur using this approach. The first is that it is very likely that many of the recognition errors in the second transcription may be the same as those appearing in the original transcription and thus cannot be detected by comparing the two transcriptions. This is because the vast majority of current commercial OCR technology is designed to be "omnifont;" that is, able to handle a wide range of text fonts and typographic constraints so as to be generally useful with a wide variety of document images. This generality, however, is the very characteristic that leads to errors: subtle cues that are useful or necessary for accurate recognition within a particular character font are typically not represented in the feature-based character templates that are used in omnifont recognizers. For example, there is often only a very slight difference between the glyphs representing the letter "l" and the numeral "1" in a given font, typically less difference than between the glyphs for "1" in different fonts, so l/1 confusion errors are common in omnifont OCR systems. (The term "glyph" refers to an image that represents a realized instance of a character.) A second limitation of this correction approach is that even when a disagreement between the first, original transcription and the second transcription produced by the omnifont recognizer is found, it typically cannot be directly and automatically determined which transcription is in error and which, if either, is correct. Therefore, the best this type of approach can accomplish is to flag potential errors for manual intervention by a human operator.

Another category of error correction methodology employs some type of language modeling. A spelling corrector that ensures that each word in the transcription is a correctly spelled word from some dictionary is a simple form of such language modeling. Contextual postprocessing error correction techniques make use of language structure extracted from dictionary words and represented as n-grams, or n-character subsets of words. More advanced forms of language modeling include examining the parts of speech, sentence syntax, etc., to ensure that the transcription correctly follows the grammar of the language the document is written in. There are, however, several limitations to the language modeling approach. First, an extensive dictionary and/or grammar is needed for the particular language represented by the character strings that appear in the document; obviously, a dictionary and grammar must be available for each language represented in the document transcriptions to be corrected. It is also very likely that a given document will contain character strings that do not occur in even a very large dictionary or that are "ungrammatical," e.g., names, numbers, etc.; a special mechanism must be available for handling these portions of the transcription if they are to be evaluated for correction.

A significant limitation of the language modeling approach to error correction is the fact that language modeling involves using the content of a transcription as a guide to determining what errors exist, and ignores the content of the original document image. If the original document contains spelling or grammatical errors, those will be detected as "errors" by the language model, even though they may be correctly transcribed. Conversely, if such misspellings or grammatical errors in the document are mis-transcribed into correctly spelled words or into grammatically correct strings, a transcription error has occurred that cannot be detected by language modeling. Some error correction systems that use a language modeling approach compensate for this by merely flagging potential errors, leaving the final determination and correction to a human operator, and consequently requiring some level of human intervention in the correction process.

Language modeling may also be of limited value for post-recognition correction of a transcription that has been generated by a computer-implemented OCR operation because most commercial OCR systems already include some sort of language modeling as part of the recognition process. Therefore, transcription errors that still occur after recognition have presumably not been corrected by the language model component of the recognizer, and therefore are likely to be the type of errors that are not readily detected by language modeling. For example, U.S. Pat. No. 4,979, 227 issued to Mittelbach et al. discloses a character recognition system that includes a context lexicon that is used to correct word-based strings of recognized characters. Current recognized strings are compared to the strings of the context lexicon and that string in the lexicon which is optimum with respect to similarity and frequency is selected for further evaluation. A correction is only executed when the substitution transposition is probable based on the classifier characteristic for the characters under consideration. U.S. Pat. No. 4,654,875 issued to Srihari et al. discloses a character recognizer that includes lexical information in the form of acceptable words represented as a graph structure.

U.S. Pat. No. 5,257,328 issued to Shimizu discloses a document recognition device capable of correcting results obtained from recognizing a character image using a post-recognition correction operation that includes a correction data base in which is registered correction information on misrecognized characters that are specified as targets to be corrected by an operator. The post-recognition correction operation also includes an automatic correction process that corrects results recognized by the character recognizer using the correction data base, an operator's correction process that allows an operator to correct erroneous results of the automatic correction process, and a correction data base update operation that updates the correction data base with correction information made by the operator. Automatic correction to characters are made on the basis of statistics collected in the correction data base as a result of the recognition operation that indicate the number of times a character occurs in an image and the number of times it has been corrected to other characters.

J. J. Hull and S. N. Srihari discuss the use of contextual constraints in text recognition and error correction, in "Experiments in Text Recognition with Binary n-Gram and Viterbi Algorithms," in *IEEE Transactions on Pattern Analysis and Machine Intelligence*, September, 1982, pp. 520–530. Such contextual constraints may take a variety of forms including vocabulary, probabilities of co-occurring letters, syntax represented by a grammar, and models of semantics. An example of a structural representation of contextual knowledge, known as the binary n-gram algorithm, utilizes contextual knowledge in the form of sets of binary arrays that represent legal letter combinations in the language used in the document being recognized. The binary n-gram algorithm utilizes an abstraction of a dictionary that is assumed to contain all allowable input words. The method attempts to detect, as well as correct, words with errors. J. J. Hull and S. N. Srihari disclose a binary n-gram procedure for correcting single substitution errors.

Two major recognition problems contributing to transcription inaccuracy that may not be entirely addressed by the types of error correction methodologies just described are image noise and glyph segmentation errors. Glyphs occurring in bitmapped images produced from well-known sources such as scanning and faxing processes are subject to being degraded by image noise and distortion which contribute to uncertainty in the actual appearance of the glyph's bitmap and reduce recognition accuracy. A degraded bitmap appearance may be caused by an original document of poor quality, by scanning error, by image skewing, or by similar factors affecting the digitized representation of the image. Particular problems in this regard are the tendencies of characters in text to blur or merge, or to break apart. Such a degraded image is referred to herein as a "noisy" image. Many OCR errors occur from recognizers attempting to recognize individual glyphs in images that have been degraded by such noise and distortion.

Image noise is often a contributing problem to accurate glyph segmentation. Since many commercial omnifont recognizers depend upon the accuracy of a pre-recognition segmentation process to isolate glyphs for recognition, individual glyphs must occur within the image either in non-overlapping bounding boxes, or, if the glyph samples are not so restricted, the recognition process must provide for a way to assign pixels in the image to a specific glyph, so that the glyphs may be isolated, recognition may be performed and character labels may be assigned to the glyphs. This requirement of the input image will be hereafter described as requiring that the input glyph samples be "segmentable" during the recognition process, either by determining the bounding box around each glyph, or by some other process that assigns pixels to glyph samples. Some images may contain glyphs representing characters in fonts or in character sets that do not lend themselves easily to such segmentation, or image noise may prevent accurate glyph image segmentation.

Some post-recognition error correction methods have been specifically developed to overcome the recognition problems introduced by noisy images and poor segmentation. For example, U.S. Pat. No. 5,048,113 issued to Yamagata et al. is concerned inter alia with the correction of errors that result from misrecognition of characters in multiple fonts or multiple type sizes that occur in one document image. Yamagata et al. disclose a feature-based character recognizer in which the recognition results include certain information about the recognition reliability of each character in the transcription. A character string, typically a word, is selected from the transcription and a candidate reference character in the character string is identified and selected on the basis of certain factors of the recognitron results. The candidate reference character is then located in the original document image, and certain image processing analysis is performed on the character image to develop reference image attributes, such as height and baseline position, by which to judge the correctness of the remaining characters in the character string, and to correct them if necessary on the basis of the reference image attributes.

Another technique that makes use of post-recognition image analysis for recognition error correction is disclosed in U.S. Pat. No. 5,048,097 issued to Gaborski et al. A neural network character recognizer makes use of a post-recognition processor that attempts to find and separate, in the original document image being recognized, adjacent characters which are kerned and characters which are touching that have been identified by the neural network as having low recognition scores. Characters successfully segmented in the post-recognition processor are fed back to the neural network for re-recognition. Dekerning and character segmentation are accomplished using various image processing techniques including connected component analysis.

U.S. Pat. No. 3,969,700 issued to Bollinger et al. discloses a system for selecting the correct form of a garbled input word that is misread by an optical character reader so as to change the number of characters in the word by character splitting or concatenation. The error correction technique uses what is referred to as a regional context maximum likelihood procedure performed using a conditional probabilistic analysis that evaluates the likelihood that each member of a predetermined class of reference words, stored as a dictionary of words, being considered could have been mapped into the garbled character string by means of OCR segmentation error propensities. The segmentation error propensity data are represented as a table of independent conditional probabilities for various types of substitution and segmentation errors for the stored dictionary words. When a garbled OCR word is input to the system, it is compared with each stored dictionary word by loading the two words in a pair of associated shift registers and aligning their letters on one end. The method then calculates the total conditional probability that the OCR word in the first shift register was misread given that the dictionary word was actually scanned by the OCR. The OCR and dictionary words are realigned as needed during this computation if the total probability computed indicates that a segmentation or concatenation error has occurred.

This brief discussion of the wide variety of, and distinctly different approaches to, post-recognition error correction methodologies developed to improve the accuracy of the output transcription points to at least two major causes of transcription errors. The first of these is inadequate character template models that are unable to sufficiently discriminate between individual characters in a single font, thereby typically causing substitution errors, the correction of which is typically handled by some sort of language model. The second major cause of errors is a degraded image that results in segmentation and concatenation errors when isolating character images for recognition, typically causing insertion, deletion and substitution errors as a result of presenting an incorrect glyph for recognition. Correction of these types of errors may involve the use of several types of error correction solutions. The variety of solutions that have been developed appears to suggest that the causes of transcription errors are too varied to be susceptible to correction by a single uniform approach, and that several correction operations are'required in combination in order to achieve a significant reduction in errors in most transcriptions.

It is of significance to note that, while some of the techniques (e.g., the language model correction techniques) heretofore described make use of a priori knowledge about the language in which the text of a document appears in order to effect error correction, none of them makes use of explicitly defined a priori knowledge about the text document image itself—in the form of an explicitly defined image model—to improve the accuracy of a transcription. Explicitly defined formal image models have been used in recognition operations; a brief description of formal image models and their use is provided here as relevant background in understanding the present invention.

2. Image Models

An image model is a characterization or description of the set of possible input images for which a recognition system is designed, provided in a form that can be used to determine which one of the possible images best matches a given input image. An image model represents a priori information about this set of input images and is distinguishable from data structures that define a particular input image or contain the results of performing analysis and recognition processing on a particular image.

For example, an image model for individual character images defines the set of possible characters that are expected to be presented for recognition, and indicates the value of each pixel in each character image. A typical form for a character image model is a set of binary or feature templates. An isolated character image model provides a recognition system with the a priori information necessary to determine which character is most likely to correspond to a given input image of an isolated character. Similarly, an image model for isolated text lines might describe the set of possible text line images by specifying the set of possible character sequences within the line and the positioning of the individual character images relative to each other and the text baseline. When used in recognition, a text line image model typically provides the a priori information necessary to determine an output text string that is most likely to correspond to a given observed image of an isolated, but otherwise unsegmented, text line. An image model for a whole page of text might describe the set of possible text line images that can occur and their possible positions relative to each other and to the boundary of the page. When used in recognition, a page image model provides the a priori information required to determine an output sequence of text strings that is most likely to correspond to a given observed input image of a text page. An image model frequently describes conventional text images, but an image model may be constructed to describe any one of a number of classes of input images, including, for example, images of printed music, images of equations, and images with fixed or known structural features such as business letters, preprinted forms and telephone yellow pages.

a. Formal and informal image models.

For purposes of the discussion herein, image models may also be classified as "informal" and "formal." A formal image model describes a set of images using a formal description language, such as a formal grammar or a finite state transition network. A formal grammar is a set of rules that define the allowable formats (syntax) that statements in a specific language are allowed to take. Grammars may be characterized by type as unrestricted, context sensitive, context free and regular, and a particular type of grammar may be more or less suited to a specific image model. In a computer implemented system, a formal image model is typically represented as an explicit data structure that defines the possible constituents of the image and their possible positions in the image. As noted above, the image model represents a priori information and is to be distinguished from data structures constructed to represent a particular input image to a recognition system or the results of recognition processing of a particular input image.

For purposes of this background discussion, and for discussing the present invention, an informal image model includes all approaches to describing a set of possible images other than by use of a formal explicit description system. The design of every text recognition system is based on either an explicit or implicit image model. The distinction to be drawn is whether the image model is explicitly and formally stated in a manner that is independent of the processing algorithms that use the model, or whether the model is only represented implicitly, as a body of code that performs image analysis operations. A formal image model, in this regard, is analogous to a formal grammar in a grammar-based character string parsing system which exists as an explicit data structure independent of the code of the parser that uses it.

b. Zero-, One-, and two-dimensional image models.

Formal image models may take "zero-dimensional" (OD), one-dimensional (1D) or two-dimensional (2D) forms. A OD image model, as that term is used herein, describes images of isolated characters. The most common types of OD image models are binary and feature-based character templates. A 1D image model, as that term is used here, defines the structure and appearance of a sequence of character images, such as a word or an entire text line, including the appearance and positioning of the individual characters in the line. A primary application of explicit 1D image models is in text line recognition systems that do not attempt to segment the text line into individual character images prior to recognition. The character and text line models used in such systems typically resemble the kinds of models used in speech recognition systems based on hidden Markov models, or simple extensions to such models.

A 2D image model, as that term is used herein, is distinguishable from a 1D image model in that the 2D image model typically defines the recognition process for an entire 2D image by describing how 2D subregions in the image are related to each other, without isolating 1D lines of text or individually segmenting character or word instances in the image in a distinct process prior to recognition. The use of a 2D image model for recognition provides the opportunity to eliminate the pre-recognition step of character, word or text line isolation or segmentation.

Formal 1D image models are used to represent words in S. Kuo and O. E. Agazzi, in "Keyword spotting in poorly printed documents using pseudo 2D hidden Markov models," *IEEE Transactions on Pattern Analysis and Machine Intelligence*, Vol. 16, No. 8, August, 1994, pp. 842–848 (hereafter, Kuo et al.,) which discloses an algorithm for robust machine recognition of keywords embedded in a poorly printed document. For each keyword model, two statistical models, named "pseudo 2D Hidden Markov Models", or "PHHMs," are created for representing the actual keyword and all other extraneous words, respectively. C. Bose and S. Kuo, "Connected and degraded text recognition using hidden Markov model," in *Proceedings of the International Conference on Pattern Recognition*, Netherlands, September 1992, pp. 116–119 disclose a recognition method for recognizing isolated word or line images; the recognizer is based on a formal 1D model expressed as a hidden Markov model.

U.S. Pat. Nos. 5,020,112 and 5,321,773 disclose recognition systems based on formal 2D image models. U.S. Pat. No. 5,020,112, issued to P. A. Chou, entitled "Image Recognition Using Two-Dimensional Stochastic Grammars," discloses a method of identifying bitmapped image objects using a 2D image model represented as a stochastic 2D context free grammar having production rules that define spatial relationships between objects in the image according to a rectangular image model; the grammar is used to parse the list of objects to determine the one of the possible parse trees that has the largest probability of occurrence. The term "stochastic" when used in this context refers to the use of probabilities associated with the possible parsing of a statement to deal with real world situations characterized by noise, distortion and uncertainty. U.S. Pat. No. 5,321,773, issued to G. Kopec and P. A. Chou, entitled "Image Recognition Method Using Finite State Networks" discloses a formal 2D image model represented as a stochastic finite state transition network that defines image generation in terms of a regular grammar, in contrast to the context free grammar used in U.S. Pat. No. 5,020,112. The template model described by the 2D image model defines the sidebearing model of letterform shape description and positioning, where character positioning does not depend on determining rectangular bounding boxes for character images; pairs of adjacent character images are positioned with respect to their image origin positions to permit overlapping rectangular bounding boxes as long as the foreground (e.g., black) pixels of one character are not shared with, or common with, the foreground pixels of the adjacent character. The 2D image model and the template model are also discussed in G. Kopec and P. Chou, "Document Image Decoding Using Markov Source Models," in *IEEE Transactions on Pattern Analysis and Machine Intelligence*, June, 1994, pp. 602–617 (hereafter, "Kopec and Chou, 'Document Image Decoding'".)

SUMMARY OF THE INVENTION

The present invention is a single unified approach to automatic transcription correction that makes use of a key understanding about the interrelationships among three components: the original text document image that is being recognized, the associated original and errorful transcription of that text document image, and a formal image model that describes both the document structure of a set of text images that includes the original input text image and the set of possible transcriptions that could be produced from the set of modeled text images. This key understanding is that these components together provide sufficient a priori information about the font in which the glyphs appear in the specific input text image, about the language characteristics of the language represented by the glyphs that appear in the specific input text image, and about the positioning of the glyphs in the text image to be able to produce a second, modified transcription that has substantially fewer errors than the original, errorful transcription. This key understanding leads to a two stage transcription correction process: in the first stage, the explicit formal image model that models a set of text images is modified with the a priori information available in the errorful transcription and in the specific input text image to produce a modified formal image model that is tailored to be used to produce a transcription for the specific text image with which the errorful transcription is associated. In the second stage, this modified model is used to re-recognize the original text image to produce the second, modified transcription.

An important element of the present invention is the use of a formal image model as an explicit input to the transcription modification process. In particular, the formal image model is a two-dimensional (2D) image model that describes the physical (i.e., spatial) structure of an entire page of the text image, includes the character template models of the glyphs that are expected to occur in the text document image, and describes the spatial positioning of these template models in the image. The model modification stage of the present invention results in incorporating one or both of at least two types of modifications to the formal 2D image model. While it has been shown through experience with actual implementations of the transcription correction methodology of the present invention that these types of model modifications work effectively in combination, each modification may be viewed as independent of other model modifications, and variations of the implementation of the present invention may include only one of the model modifications described. The transcription correction methodology of the present invention may also include other types of model modifications that are similar in their intent and effect to those described here and illustrated below.

A first type of modification results in the re-recognition process being a font-specific recognition operation performed on the input text image. That is, the binary character template models to be used in the subsequent re-recognition process are trained, in a supervised training procedure, in the font in which the glyphs appear in the input text document image, using training data that is entirely derived from the input text document image and from the input, errorful transcription. This character template training aspect of image model modification and transcription correction is based on the premise that a font-specific recognition system provides consistently higher recognition accuracy than an omnifont recognition system for documents that include character images that are predominantly in a specific font. As noted above, omnifont systems are typically insensitive to subtle font differences that can be necessary for accurate discrimination between characters in a single font. Font-specific recognition systems are considered to provide a generally higher degree of recognition accuracy for a particular document; however, they have been considered to be of limited usefulness and generality primarily because such systems have not been easy to generalize to new fonts as a consequence of the need to train templates in each new font, and the need, in turn, for considerable user involvement in the preparation of the training data for the template training process. The supervised training process incorporated in the present invention, however, requires no user involvement in the preparation of the training data. In addition, this training process involves no prior segmentation or isolation of the training data samples in the input text image.

A second modification to the formal 2D image model involves a flexible approach to language modeling. The language model used in the present invention is not restricted to explicit language modeling of the type that requires a language dictionary or formal language model based on the characteristics of a particular language. While such an approach may provide virtually exhaustive language modeling, it is language specific, and not document specific. In keeping with the key understanding that the a priori knowledge captured in the interrelationships among the text image, the input transcription and the image model provide sufficient information from which to produce a modified and improved transcription, the language modeling of the present invention is based on the discovery that the input transcription to be corrected, even in its errorful state, contains specific useful and important information about how the language of the text document being recognized was actually used; this information can be used to improve the re-recognition process subsequently performed on the text image by modifying the formal image model to reflect this known and explicit language usage. In the illustrated embodiment of the present invention described below, this specific language usage information is related to the observed sequencing of the glyphs in the input text document image, as reported by the input transcription. The formal image model describes the character template models of the glyphs that are expected to occur in the text document image, and describes the spatial positioning of these template models in the image. The transcription provides further information about the expected sequences of these character templates. Assuming that the transcription is correct in substantial portions, the pairs or triplets or larger sequences of characters that actually occur in the input text document image, as reported in the transcription, provide language specific information about what character sequences validly occur in the language of the document image being recognized. This information about the sequence positioning of the character templates can be used to modify the formal image model to produce these sequences, and to produce some additional sequences that may be incorporated using simple general or language specific rules.

Moreover, this language model may be extended to use other known language modeling techniques, such as word- or sentence-based models, and may further make use of language usage in transcriptions of text document images that are included in the set of documents modeled by the formal image model. For example, if the transcription to be corrected is a journal article in the field of chemistry, available transcriptions of other text document images in the same subject matter field could also be modeled; this would model a wider language usage than that contained in the single transcription without requiring the modeling of an entire dictionary of the language being used.

A benefit of this type of language modeling is its usefulness with documents and parts of documents for which a dictionary-based language model is unsuitable for providing useful correction information, as is the case, for example, with many names or strings of numbers. A further benefit of this type of language modeling is its independence from a language specific dictionary or language specific grammar model. The transcription correction technique of the present invention may be used on documents in any language without requiring the modeling of an entire language specific dictionary.

The significant advantage of this type of model modification is that the subsequent recognition operation that uses the formal image model modified in this manner is constrained to produce an output transcription that contains only the allowed character sequences described by the modified model; this is because the modified model describes the positioning of character templates in the text image so that these character templates are positioned only in the sequence specified by the information derived from the input transcription and whatever other sources were used to construct the language model. This constraint imposed on the subsequent re-recognition operation results in substantial improvement in the accuracy of the re-recognition operation, since that operation is no longer unrestricted as to what possible transcription may be produced from the input text image, but is now constrained by the sequence of characters reflected in the modified model. Depending upon the particular implementation of the invention, a consequence of constraining re-recognition in this manner may be improved computational efficiency in recognition as compared to a recognition process that simply decodes the input text image with no constraints imposed by an input transcription.

The second stage of transcription correction—the re-recognition operation—may be any suitable type of re-recognition operation that makes use of the bitmap templates and language model obtained in the first stage. In particular, the re-recognition process of the illustrated embodiment involves the use of the document image decoding operation described in U.S. Pat. No. 5,321,773. This recognition operation uses a formal image model that includes binary character templates to decode an input text image to produce a message, or transcription, for the image. This decoding operation requires no segmentation or isolation of the glyphs in the input text image to accomplish recognition of the glyphs. The re-recognition operation makes use of the modified formal image model having the trained, font-specific character templates and modified to reflect the specific language usage as found in the input transcription to produce a second, modified and improved transcription of the input text image. Moreover, the re-recognition operation of the illustrated embodiment is particularly able to handle noisy images and provides good recognition accuracy at noise levels that would typically result in very poor output from other existing recognizers.

It can be seen, therefore, that the present invention presents a unified approach toward solving the major causes of transcription errors, and so overcomes the various limitations that are found in existing error correction systems and methods. Recognition errors caused by the poor discrimination of individual characters in a particular font are more likely to be corrected when the text image is re-recognized using a font-specific recognizer that has been trained using the actual character images that occur in the document being recognized. Recognition errors caused by incorrect segmentation or concatenation of individual characters resulting from image noise are less likely to be duplicated by a recognizer that requires no such segmentation. All types of recognition errors are more likely to be corrected when information is available about what specific sequences of characters are most likely to occur in the input text image.

The transcription correction methodology of the present invention has been designed to require no user involvement, so that transcription correction becomes an automatic post-recognition operation. With respect to template training, the present invention eliminates the user's involvement in training data preparation by using the text image as the source of the glyph samples to be used for training; by using the errorful transcription as a source of information about the labeling of the glyph samples; and by using the formal 2D image model as an explicit input to the training process that defines the relationship between the glyph samples in the 2D image and the information in the transcription so that substantially correct character labels are assigned to appropriate glyph samples. In addition, the construction of a language model from the input transcription is an entirely automated process, and the formal image model modification process is similarly under the control of a machine processor and requires no user involvement.

An important benefit of using an explicit formal 2D image model is that it provides for flexibility and detail in describing the set of possible 2D input images for which transcriptions may be corrected, which in turn means that transcriptions of a wide variety of text document images may be corrected using this methodology. The type (e.g., structural appearance) of text document images for which transcriptions may be corrected may be changed by simply changing the formal 2D image model to reflect information about a new type of image; there is no need to rewrite the instructions that carry out the transcription correction process when the type of input image or its language content changes. This feature of the present invention makes automatic transcription correction a relatively straightforward process because the input of a new type of document image and its associated transcription are easily accommodated. The description of a formal image model may also vary in its level of detail; it can be made as specific and detailed as is necessary for the type of document to be recognized.

An interesting additional advantage of the transcription correction technique of the present invention is its reliability in producing corrections only for actual errors that occur in the original, errorful transcription. In contrast to some error correction techniques, especially those based on extensive dictionary-based language modeling, the present technique does not falsely correct spelling or grammatical errors that in fact occur in the original text image, since transcription correction is essentially performed in the context of a re-recognition of the original text image.

In accordance with the present invention, therefore, a method of operating a system to correct errors in a transcription of a text image is provided. The system operated by the method includes a memory device for storing data, including instruction data, and a processor connected for accessing the data stored in the memory, and for executing the instructions to operate the system. The method uses as input a formal two-dimensional image source model data structure, referred to as a 2D image model, that models as a grammar a set of two-dimensional (2D) text images. Each 2D text image includes a plurality of glyphs, each of which is an image instance of a respective one of a plurality of characters in an input image character set. The 2D image model includes mapping data indicating a mapping between a glyph occurring in a 2D text image and a respective message string identifying a character in the input image character set. The method also uses as input an image definition data structure defining a two-dimensional text image, referred to as an input 2D image of glyphs, that includes a plurality of glyphs representing characters in the input image character set. The input 2D image of glyphs has a vertical dimension size larger than a single line of glyphs, and is one of the set of 2D text images modeled by the 2D image model. The transcription correction method further uses as input a first transcription data structure, referred to as a first transcription, that is associated with the 2D image and that includes a first ordered arrangement of transcription label data items, referred to as transcription labels identifying characters in the input image character set represented by the glyphs occurring in the input 2D image of glyphs. The first transcription includes at least one transcription error. The mapping data included in the 2D image model is modified using the transcription labels in the first transcription to produce modified mapping data included in a modified 2D image model, and a recognition operation is performed on the input 2D image of glyphs using the modified mapping data included in the modified 2D image model. The modified mapping data maps a sequence of glyphs occurring in a 2D text image to a sequence of respective message strings identifying characters in the input image character set such that the sequence of message strings indicates a second transcription identifying the characters represented by the glyphs occurring in the input 2D image of glyphs and does not include the at least one transcription error.

In accordance with one aspect of the present invention, the mapping data included in the 2D image model includes a first set of character templates. The glyphs included in the input 2D image of glyphs are perceptible as appearing in an input image font. Modifying the mapping data included in the 2D image model includes producing character template training data including a plurality of glyph samples and respectively paired glyph labels for each character in the input image character set. Each glyph sample is included in the input 2D image of glyphs, and each respectively paired glyph label is produced using the first transcription and indicates a respective one of the characters in the input image character set. A second set of character templates is produced using the character template training data. The second set of character templates indicates character images of the characters in the input image character set that are perceptible as appearing in the input image font. This second set of character templates, showing character images in the input image font, is used to perform the recognition operation on the input 2D image of glyphs. When the transcription error in the first transcription is caused by matching a glyph in the input 2D image of glyphs against a character template that is inadequately specified for the glyphs in the input 2D image of glyphs, the subsequently performed recognition operation on the input 2D image of glyphs using the trained, font-specific character templates produces a more accurate transcription.

In accordance with one aspect of the present invention, modifying the mapping data included in the 2D image model includes constructing a language model using the transcription labels included in the first transcription. The language model indicates a plurality of sequences of transcription labels occurring in the first transcription; the plurality of sequences of transcription labels including the ordered arrangement of the transcription labels indicated by the first transcription. The language model is combined with the mapping data included in the 2D image model to produce the modified mapping data included in the modified 2D image model. The modified mapping data constrains the mapping between a glyph occurring in a 2D text image and a respective message string identifying a character in the input image character set to map sequences of glyphs to sequences of message strings indicated by the language model. The recognition operation performed on the input 2D image of glyphs uses the modified mapping data to map a glyph occurring in the input 2D image of glyphs to a respective message string identifying a character in the input image character set such that a sequence of respective message strings mapped from a sequence of glyphs occurring in the input 2D image of glyphs by the modified mapping data is one of the plurality of sequences of transcription labels occurring in the first transcription. When a transcription label indicating a transcription correction for the transcription error in the first transcription is included in one of the plurality of sequences of transcription labels in the language model, the modified mapping data will produce the transcription correction when mapping a glyph occurring in the input 2D image of glyphs representing the at least one transcription error to a respective message string.

In one implementation of the training technique of the present invention, the formal 2D image model is represented as a Markov source having the form of a finite state transition network that models the spatial image structure of a set of 2D text images as a series of nodes and transitions between pairs of nodes. Associated with each transition in the network are transition data items that include a character template, a message string, a transition probability and a vector displacement. During transcription correction processing, the original transcription is used to create a language model network that is merged with the formal 2D image network to produce a language-image network. The character templates are trained from character template training data produced by merging the formal 2D image network with a transcription network indicating the original transcription and then decoding the input 2D image using the merged network. The rerecognition operation decodes the input 2D image of glyphs using the language-image network including the trained character templates to produce the second, corrected transcription.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts and acts.

BRIEF DESCRIPTION OF THE DRAWINGS

FIG. 19 presents an image of a collection of sample image regions clipped from the 2D input image for use in training a template according to the illustrated implementation of template construction shown in FIG. 22;

FIG. 23 is a table of character pairs, known as bigrams, that occur in the portion of the transcription illustrated in FIG. 3, for use in constructing the language model used in the illustrated implementation of the present invention;

FIG. 24 is the bigram table of FIG. 23 augmented with additional characters;

FIG. 31 is a pseudo code procedure for producing multi-level character templates that uses a candidate set of foreground parameters that vary by template pixel position and that model a "space" character;

Figure 1:
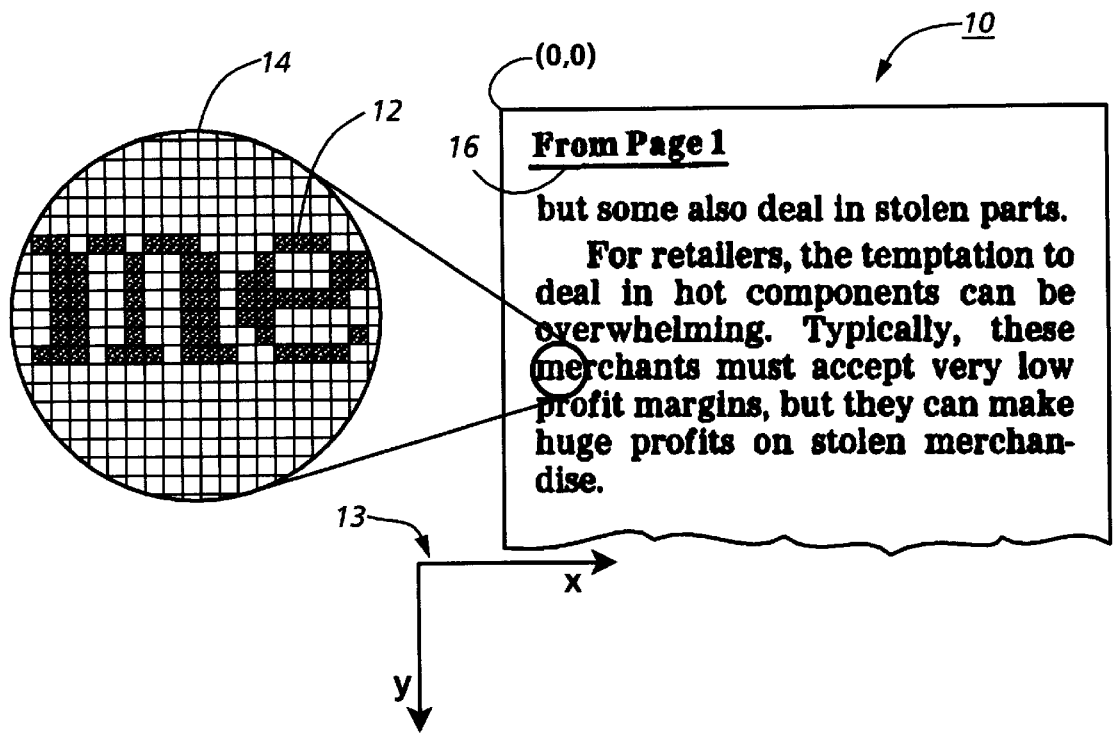
FIG. 1 illustrates a representative text image including a plurality of glyphs which is the image with which the original errorful transcription of FIG. 3 is associated.

While the present invention will be hereinafter described in connection with an illustrated embodiment, it will be understood that it is not intended to limit the invention to that embodiment. On the contrary, it is intended to cover all alternatives, modifications and equivalents as may be included within the scope of the invention as defined by the appended claims.

The remainder of this description has the organization shown in Table 1 below:

Table 1
A. Conceptual Framework and Definitions.
1. Data, images and system components.
2. Character, character code, and the input text image.
3. Character templates.
4. Transcriptions.
5. The formal 2D image model.
B. General Features
C. An illustrated implementation of the transcription correction technique
1. Implementation overview.
2. The 2D image model represented as a stochastic finite state transition network.
3. The role of a transcription network in character template training.
4. Merging the transcription network with the 2D image source network to produce the transcription-image network.
5. Decoding the input 2D image using the transcription-image network to produce labeled glyph sample image origin positions.
6. Template construction from training data composed of labeled glyph sample image origin positions.
   a. Overview of template construction.
   b. Creating template image regions for storing templates.
   c. Identifying sample image regions in the 2D input image.
   d. The mathematical model of template construction.
   e. Constructing templates contemporaneously from the sample image regions.
7. Determining character set widths for constructed templates.
8. Iterating decoding and backtracing steps with the current set of character templates produced from the template construction step.
Table 1-Continued
9. The language model network.
10. Merging the language model network with the 2D image source network with the trained character templates to produce the language-image network.
11. Re-recognition using the language-image network.
D. The System and Software Product Configurations.
1. The system configuration.
2. The software product.
E. Additional Considerations.
1. Efficiency considerations.
2. Modeling horizontal white space as a template in the image source model.
3. Producing templates comprising arrays of foreground probabilities.

4. Extending the template construction technique to gray-level and color character templates.
5. Implementing transcription correction in the text line image environment.
   a. Overview of transcription correction in the text line image environment.
   b. Mathematical principles of text line image source models.
   c. Obtaining a text line image source model from a 2D image model.
   d. Template construction in the 1D image environment.

A. Conceptual Framework and Definitions

The following terms and discussion provide the framework for describing the claimed invention as illustrated in the accompanying drawings. The terms defined below have the meanings indicated below throughout this specification and in the claims. In the event that these terms are defined in other sources, such as, for example, in documents that are incorporated by reference herein elsewhere in this description, the definitions below take precedence over definitions found elsewhere.

1. Data, images and system components

Figure 2:
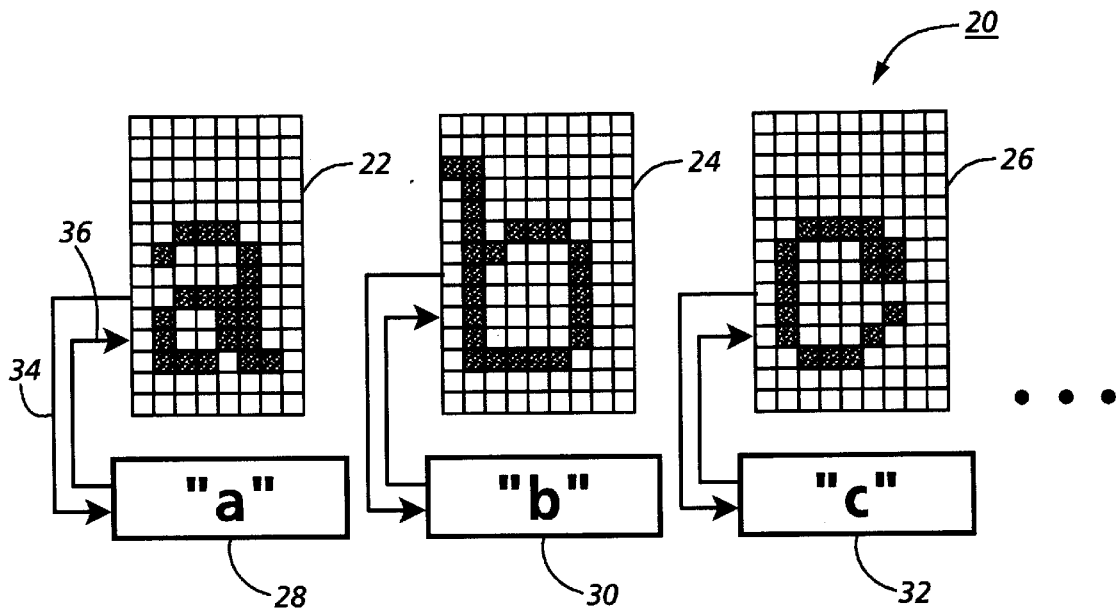
FIG. 2 illustrates an example of a character template data structure used by the present invention.

The term "data" or "data item" refers herein to physical signals that indicate or include information. Data items can be combined into a "data structure" such that the data structure "includes" the combined data items; thus, a "data structure" is any combination of interrelated data. A data structure may also include other data structures. An item of data "indicates" a thing, an event, or a characteristic when the item has a value that depends on the existence or occurrence of the thing, event, or characteristic or on a measure of the thing, event, or characteristic. For example, in FIG. 2, character label data item 28 in character template data structure 20 indicates the character code for the character "a." A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, directed arrow 36 in FIG. 2 shows that character label data item 28 in character template data structure 20 indicates character template 22, which depicts an image of the character "a." An item of data "identifies" or "is an identifier of" one of a set of identifiable items if the item of data is one of a set of items of data, each of which can be mapped to at most one of the identifiable items. For example, in FIG. 2, character label data item 28 may be said to identify character template 22.

A "processor-controlled machine" or "processor" is any machine, component or system that can process data, and may include one or more central processing units or other processing components. Any two components of a machine or system are "connected" when there is a combination of circuitry that can transfer data from one of the components to the other. "Scanning circuitry," for example, is circuitry that can receive an image by a scanning operation, such as by scanning a physical document, and provide data defining a version of the image. A "scanning device" is an input device that includes scanning circuitry. "User interface circuitry" is circuitry that can provide data indicating the occurrence of a user action. A "user input device" is an input device that includes user interface circuitry, such as a keyboard, a mouse or a stylus device.

An "image" is a pattern of light. One or more items of data "define" an image when the data includes sufficient information for the processor to directly produce the image, such as by presenting the image on a display. Data defining an image may be referred to as "image definition data". For example, a two-dimensional (2D) array can define all or any part of an image, with each item of data in the array providing a value indicating the color of a respective location of the image. In this type of image representation, each such image location is conventionally called a "picture element," or "pixel," and represents a small unique region of the image. In black and white binary images, the value in a pixel indicates black or white, where black is typically intended to represent a respective mark or active position in the image. An image in a processor-controlled system that is represented by a 2D array of binary data items defining pixels is referred to as a "binary image." For simplicity of exposition, the template construction process of the transcription correction technique described below will be presented in terms of constructing binary character images, but, as is noted below, most of the concepts are easily generalized to other image representations. FIG. 1 illustrates an example of an image definition data structure 10 defining a binary image.

2. Character, character code, and the input text image

"Character" as used herein means a single, discrete, abstract element or symbol. For example, a character can include an abstract symbol that appears in a written or printed form of a language. Characters in a language can include not only alphabetic and numerical elements, but also punctuation marks, diacritical marks, mathematical and logical symbols used in mathematical notation such as equations, and other elements used in the written or printed form of the language. More generally, characters can include phonetic, ideographic, or pictographic elements in addition to alphanumeric elements. For example, symbols in pictographic languages and symbols representing musical notation are included in the term character. All of the characters related to a particular language or other symbol notation such as music comprise a "character set." A "word" is a set of one or more characters that is treated as a semantic unit in a language. A "text" or "string" is a sequence of characters; a "subsequence" or "substring" of characters is a set of one or more consecutive characters within a text or string; the characters of a text or string may form words and other subsequences within the text.

A "character code" is an item of data in a processor-controlled machine or system that defines, or represents, a character (the abstract symbol) to the processor. The encoding of a set of characters, such as those that belong to a language, involves defining a set of character codes that includes a respective character code for each character in the set. An example of a set of character codes is the set of ASCII codes for the symbols that make up the English language.

A "glyph" is a single instance, or example, of a character that is realized as an image, for example on a marking medium such as paper or on a display screen. For example, an image that is produced by a scanning operation performed on a paper document that includes text and that is received by scanning circuitry includes a plurality of glyphs, each of which is an image that represents a realized instance of a respective one of the characters in the text. Because a variety of factors may affect how an image of a character is produced when it is printed, scanned, copied or faxed, one glyph of a character in a text image may not be identical to another glyph of the same character in the text image.

The terminology "image definition data defining an input text image including a plurality of glyphs" (hereafter also referred to as a "text image," or "text image data structure")

refers to a data structure, suitable for storage in a memory device of a processor-controlled machine, that defines a text image in which a plurality of bitmapped representations of characters occur in the 2D space defined by the image. The organization of the text image data structure is such that individual pixel locations are accessible by the processor, but the pixels that comprise an individual glyph are not initially identified as a unit of data that is accessible to the processor, and no information is initially available to the processor as to whether a specific x,y coordinate position in the text image indicates one of the pixels included in a glyph. The text image by definition has a vertical size dimension larger than an image of a single horizontal row of glyphs, as, for example, represented by a single line of text in a document. A text image is conceptually analogous to a page of a document, and may frequently represent an image of an actual physical page, with glyphs being vertically, as well as horizontally, distributed in the 2D space; however, the input text image is not intended to be limited in any manner to an entire page, or to a single page of a document. The text image is not limited to include only glyphs; other image objects such as graphical objects or shapes, pictures, halftone images, line drawings, photographs, other pictorial elements, or images that constitute noise may be included in the input text image source of glyphs. For convenience, collections of pixels representing image objects that are not glyphs will be referred to as "nonglyphs."

FIG. 1 illustrates text image data structure 10 that includes bitmapped representations of characters in the character set that comprises the English language. In FIG. 1, each discrete representation of an English language character in text image 10 is a glyph; glyphs 12 and 14 have been enlarged to illustrate a schematic representation of the individual pixels that make up their respective images. Text image 10 in FIG. 1 illustrates a portion of the data structure representing a binary image that has been produced by scanning a newspaper article, and includes pixels comprising line segment 16, a nonglyph, included in the text image.

A "font" as used herein is a distinctive, visually consistent design for representing the characters in a character set as character images. An input text image may contain glyphs that appear in one or more fonts. An "input image font" is the visually perceptible and consistent character image design of the glyphs occurring in an input text image.

The source device that produces an input text image is independent of and unrelated to the operation of the transcription correction technique. The input text image may be produced by a scanning, digital faxing or digital copying operation applied to an existing physical document; the input text image may also be a synthetic binary image created by a user using any suitable processor-controlled machine.

3. Character templates.

A "character template" or "template" is a data structure that indicates an image of a character in which each pixel takes on a value that is either a "foreground" value or a "background" value. There is only one background value for all templates. In the simplest case, there is only one foreground value for all templates as well. More generally there may be many possible foreground values. The value of a pixel in a template can generally be regarded as a code for a probability distribution over the possible values of image pixels. For binary images, for example, the background value of a template may be a code 0 (zero) representing a probability distribution $(\alpha_0, 1-\alpha_0)$, where $\alpha_0$ is the probability that a corresponding image pixel is white and $1-\alpha_0$ is the probability that it is black. Similarly, a foreground value of a template pixel may be a code 1 representing a probability distribution $(1-\alpha_1, \alpha_1)$, where $\alpha_1$ is the probability that a corresponding image pixel is black and $1-\alpha_1$ is the probability that it is white. In this case, a template pixel value of zero (0) usually means that the corresponding image pixel is white with high probability, and template pixel value of 1 usually means that the corresponding image pixel is black with high probability. In some template implementations, it may be useful to associate a low probability with a template pixel value of 1, as in the case of modeling a "space" character, as is described below. In general, there may be many possible foreground values (i.e., different probabilities that image pixels are black.) For simplicity in the discussion that follows, the image pixels in the input image from which the training data samples are derived are described as being black and white so that each probability distribution that a template pixel value may take on can be parameterized by a single real number, e.g., $\alpha_0$. Initially, the discussion will also focus on the case of one background value and one foreground value. In this case, the template pixels values may be identified as white and black. Later, the discussion will include the possibilities of more than one foreground value, i.e., more than one probability of an image pixel being black.

The "support" of a bitmapped character template is the set of pixel locations where the template's pixel values are different from pixel values indicating a background color.

A "character label" is a data item that indicates information uniquely identifying one of the characters in a character set with the respective character template indicating the bitmapped image of the character. A character label may indicate a character code, such as an ASCII code, to identify the template, or may indicate some other information that uniquely identifies the template as the one indicating the bitmapped image of a particular one of the characters in a character set, such as font identifying information, size, or type style information. For example, when a data structure includes a set of character templates for characters in each of two different fonts, and so includes two templates representing the character "a," one in each of the different fonts, the respective character label identifying each template includes font identifying information that uniquely distinguishes one of the templates representing the character "a" from the other. In addition to character template identifying information, a character label may also include information, such as font identifying information, size, and type style information, about the character template that is not required to identify it.

A "set of labeled character templates" or a "set of character templates" is a data structure that includes at least one character template and the respective character label that uniquely identifies the character template. When a set of character templates is used in a recognition operation to identify glyphs in an input text image, the set of character templates typically includes a character template for each character in the character set represented by the glyphs occurring in the input text image. For convenience, this character set will be referred to as the "input image character set."

FIG. 2 illustrates set 20 of labeled character templates representing characters in the English language character set. Exemplary data structure 20 represents character templates as explicit 2D arrays of ON/OFF pixel values, each representing a complete character. Character template data structures 22, 24 and 26 each indicate character label data items 28, 30 and 32, respectively, as shown via exemplary directed arrow 34 from character template 22 to character label 28. Identifying information in each of character label data items 28, 30 and 32 is shown as a character in quotation marks; this representation is used in the figures herein to indicate a respective character code stored in a data memory of a processor-controlled machine, as distinguished from pixels that represent an image of the character. Character label data items 28, 30 and 32 each respectively indicate character template data structures 22, 24 and 26, respectively, as shown via exemplary directed arrow 36 from character label 28 to character template 22.

The illustration of character templates in FIG. 2 is not intended to limit in any way the organization of the data structure that represents a character template as defined herein. For example, a character template may be constructed from the concatenation of pieces of bitmapped characters, such as vertical strokes, joins, ascenders, descenders, and curved portions. A template may also be represented by a formal model, such as a finite state transition network, that produces a data structure indicating an image of a character as one of its outputs.

The representation of the reference information that comprises a character template may be referred to as its model. Character template models are broadly identifiable as being either images of characters, or lists of high level "features" of character images. "Features" are measurements of a character image that are derived from the character image and are typically much fewer in number than the number of pixels in the image. Examples of features include a character's height and width, and the number of closed loops in the character. Within the category of character template image models, at least two different types of models have been defined: one model may be called the "segmentation-based" model, and describes a character template as fitting entirely within a rectangular region, referred to as a "bounding box," and describes the combining of adjacent character templates as being "disjoint"—that is, requiring nonoverlapping bounding boxes. Another character template image model is based on the sidebearing model of letterform shape description and positioning used in the field of digital typography. The sidebearing model describes the combining of templates to permit overlapping rectangular bounding boxes as long as the foreground (e.g., typically black) pixels of one template are not shared with, or common with, the foreground pixels of an adjacent template; this is described as requiring the templates to have substantially "disjoint supports." U.S. Pat. No. 5,321,773 uses the sidebearing model to define the character template model used in the decoding process disclosed therein. In the illustrated embodiment of the transcription correction technique of the present invention, the character templates are also defined by the sidebearing model of character positioning. The character labels in the character template data structure, therefore, also indicate character template origin coordinate information, set width information, and other font metric information.

4. Transcriptions.

A "transcription data structure" or "transcription" as used herein is a data structure indicating a unique message string, M. Message string M includes a plurality of message substrings, $m_1, m_2, \ldots m_n$, each of which indicates at least one of a plurality of characters in a character set. Each substring, $m_i$, is referred to as a "transcription label data item," or simply as a "transcription label." A transcription is said to be "associated with" a formal 2D image model (defined below) when the formal 2D image model together with the information indicated by the characters in the transcription establishes a mapping between one or more glyphs in an input text image and one or more character labels indicating character templates in the set of character templates associated with the formal image model. The term "mapping" is used herein in its mathematical sense to refer to a rule of correspondence established between two sets that associates each member of the first set with a single member of the second. The interpretation of the information indicated by the transcription is dependent on information indicated by the formal image source model about the mapping between the glyph samples and the character labels.

A transcription is said to be "associated with" a specific input text image when the transcription data structure meets one of two conditions: (1) The transcription data structure is, or is capable of being produced from, the output of a recognition operation performed on the input text image. The recognition operation may be processor-controlled, such as a computer-implemented recognition or decoding operation performed on the specific text image. Or the recognition operation may be performed by a user using a processor-controlled machine; for example, a user may produce the transcription data structure by visually inspecting the text image and entering character codes using a conventional input device, such as a keyboard, that produces signals indicating the character codes. (2) The transcription data structure is, or is capable of being produced from, a data structure that is an input source to an image rendering operation, such as a document formatting operation, that produces the text image. The input text image with which a transcription is associated is referred to as the "associated text image."

Figure 3:
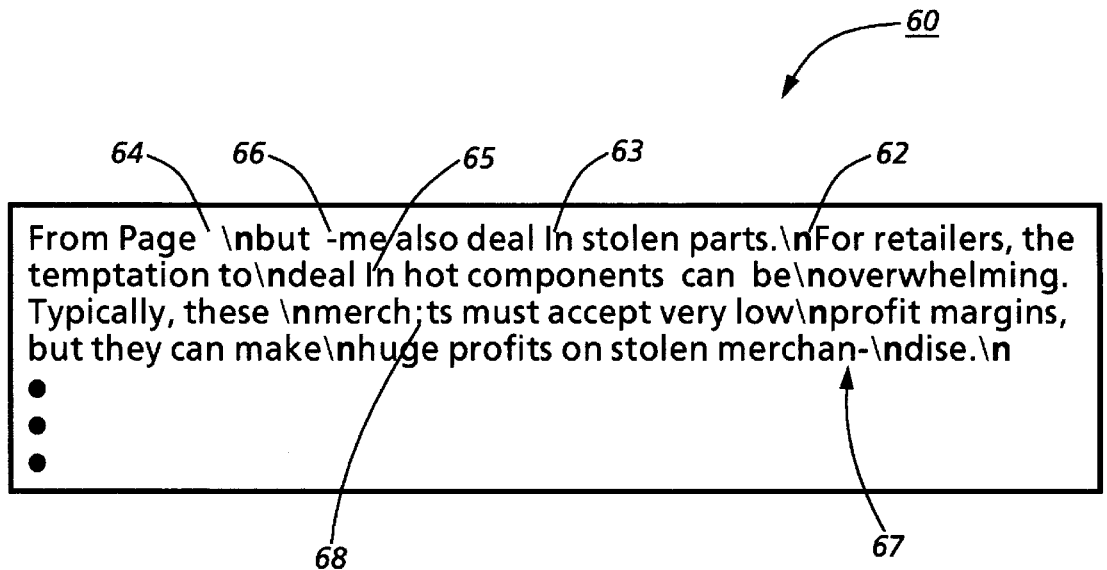
FIG. 3 illustrates an example of a transcription data structure for the text image of FIG. 1 suitable for use as input to the transcription modification method and system of the present invention.

A "literal transcription" is a type of transcription that includes an ordered sequence of transcription labels, each of which indicates a character label for a character template in the set of templates being trained, and substantially all of which, taken in the sequential order of their occurrence in the transcription, can be paired, by visual inspection of an associated input text image, with respective individual glyphs occurring in the associated image that represent the characters indicated by the respective character labels in the transcription, when the glyphs are taken in a sequence consistent with the reading order for the associated text image. FIG. 3 illustrates a literal transcription 60 that is associated with text image source of glyphs 10 (FIG. 1) and that includes a single ordered sequence of transcription labels. It can be seen by visual inspection of text image 10 that substantially all of the transcription labels indicate individual characters that can be paired with respective single glyphs in text image 10, when text image 10 is read by a human in the conventional reading order for an English language document. A literal transcription may include a transcription label that indicates data that cannot be paired by visual inspection of an associated input text image with a glyph occurring in the associated image when the transcription label indicates what can, by visual inspection of the associated text image, be called a transcription error, or when the transcription label indicates a character that is considered to be a matter of common usage. For example, literal transcription 60 includes error character ":" 68 and "newline" character 62, shown in FIG. 3 as the symbol \n, shown in bold face in the figure for purposes of illustration. It can be seen by visual inspection of text image 10 that character ":" 68 is an error place holder for the glyphs "a" and "n" in text image 10. Newline character 62 is a label that indicates that the character labels following the newline character have paired glyph samples that are positioned in the next line of the associated text image; newline characters are commonly inserted in data structures indicating text by users preparing a text document using a text editor, and may be provided routinely as part of a transcription produced by a conventional OCR operation.

A "transcription error" is defined in terms of its associated text image, and is a transcription label produced by the recognition operation performed on the associated text image that would be interpreted by a human user to be incorrect recognition output. An "errorful transcription" refers to a transcription that contains one or more transcription errors in one or more transcription labels. Transcription 60 in FIG. 3 is an example of an errorful transcription, with errors 63, 64, 65, 66 and 68 specifically called out. Error 64 illustrates what would be interpreted to be a missing transcription label; error 66 illustrates that a transcription label may include data indicating that the character label for the paired glyph in text image 10 was not able to be determined by the recognition operation. Errors 63 and 65 illustrate that the recognition operation apparently interpreted a lowercase letter "i" as an uppercase letter "I" in both instances.

A "set of transcriptions" refers to at least two transcriptions that are associated with a single text image. The transcription correction technique of the present invention accepts a set of transcriptions as the input transcription. This permits the recognition output of many conventional recognition systems to be used as the input transcription. Conventional recognition systems use a variety of pattern matching, syntactic, and semantic analysis techniques to improve the accuracy of their transcriptions, and these techniques typically include providing a set of two or more alternative transcription labels for a character image or string of character images, such as those representing a word, when the recognition system cannot determine within its certainty range what the correct transcription should be. For example, a recognition system may provide alternative pairs or triplets of transcription labels or alternative words for a set of glyphs in the image; or a post-recognition semantic analysis process applied to one or more transcription labels may narrow down a set of best possible character matches to one or two character labels, or to alternative words. A conventional recognition system may not actually produce two physically distinct transcription data structure outputs when it produces alternative recognition outputs for some sequence of glyphs in the text image; rather, a conventional recognition system typically produces a single transcription that includes one or more transcription labels indicating alternative recognition outputs for the same glyph or sequence of glyphs. For example, the transcription label representing alternative recognition output for the word "From" in text image 10 might indicate the characters "F (r|n) (om|orn)". For purposes of the present invention, a transcription indicating two or more alternative message substring choices as the recognition output for one or more glyphs in an associated input text image will be treated as being multiple transcriptions and will be referred to as a set of transcriptions; the set will include one transcription data structure for each alternative message that may be generated from the alternative message substring choices.

5. The formal 2D image model

A "formal two-dimensional image source model," also called a "formal 2D image model" or "2D image model," is a data structure that is an explicit input to the transcription modification technique and system of the present invention, and contains instructions, in the form of a formal description language such as a formal grammar or a finite state transition network, that characterize or describe a priori information, including structural features and functional characteristics, about a set of possible input text images for which a recognition system is designed and a set of possible transcriptions that may be associated with the set of possible images. The formal 2D image model includes a set of character templates that is described according to a character template model. The formal 2D image model is distinguishable from a data structure such as input text image 10 that defines a specific text image, or from a data structure such as a transcription that is the output of a recognition operation on a specific image. The formal 2D image model, in this regard, is analogous to a formal grammar in a grammar-based character string parsing system which exists as an explicit data structure independent of the instructions (i.e., the code) of the parser that uses it.

A formal 2D image model intended to be the type of model suitable for use in the present invention represents as a grammar the physical structure and position information of the image constituents or objects (e.g., glyphs, text lines, text columns, graphical objects, photographs, etc.) that may be included in the set of input text images. Frequently, but not necessarily, when the image represents an English language document, position information defined by the model for glyphs included in the image is consistent with the conventional reading order for the document when the document is read by a human. In the illustrated embodiment described below, images, including input text image 10 in FIG. 1, are assumed to be rectangular, and to have an image coordinate system 13 (FIG. 1) in which x increases to the right, y increases downward, and the upper left corner is at x=y=0. The model's description of image position information for nonglyph image objects permits a portion or portions of a given input image to be eliminated as identifying possible image positions of glyphs. This aspect of the model permits a wide variety of input text images to be accommodated as glyph sample sources, and the model may be constructed to describe any one of a number of classes of input text images, including, for example, images of printed music, images of equations, and images with fixed or known structural features such as business letters, forms and telephone yellow pages. Transcription ordering information is expressed as the set of rules that define how message substrings are sequentially arranged in the transcription.

The formal 2D image model expresses transcription label information as the set of rules that define the mapping between the information indicated by the message substrings in the transcription and actual message substrings, in terms of character labels, that appear in a text image, and, for each substring, what its appearance is in the image. This mapping effectively establishes a mapping between the set of possible text images, the set of possible transcriptions, and the set of character templates that enables the present invention to determine which one of the possible text input images—that is, which sequence of characters in which sequence of lines of text strings—best matches a specific text input image associated with a specific transcription. From this best match information, the model may be used to determine the positions of the glyphs in the 2D image, and to assign message strings to the glyphs. The specific position information about the glyphs that needs to be determined is a function of the particular template model that defines the character templates. For example, if the template is defined according to the sidebearing model, then the mapping established by the formal model produces information indicating glyph origin positions.

The design of the formal 2D image model is influenced by the type and content of the transcription to be used, and so permits further flexibility in the nature of the document images that may be modeled. The information included in the formal 2D image model about the structural and functional features of the transcription is only that information needed by the model to establish the mapping between glyphs and character labels, which in turn is the additional information needed by the model to specify a specific image from the set of possible images defined by the model. The farther removed the information in the transcription is from a literal transcription of an associated input text image, the more information is needed in the 2D image model to establish the correct mapping.

Any formal 2D image model having the characteristics and properties described above is suitable for use in the present invention, and is intended to be encompassed by the appended claims. An example of an implementation of the formal 2D image model of the type intended to be used in the present invention, and that is used in the illustrated embodiment described below, is a stochastic finite state transition network that represents its production rules as a regular grammar, and that explicitly defines the sidebearing model of letterform shape description and positioning as its character template model. A simplified, general illustration of this model as a Markov source is schematically shown as model 50 in FIG. 7, and is described in more detail below in the discussion of a particular implementation of the present invention. Further information about the types of formal 2D image models suitable for use in the present invention may be found in P. A. Chou and G. E. Kopec, "A stochastic attribute grammar model of document production and its use in document image decoding," in *Document Recognition* II, Luc M. Vincent, Henry S. Baird, Editors, Proc. SPIE 2422, pp. 66–73 (February 1995) (hereafter, "Chou and Kopec, 'A stochastic attribute grammar model'"), which is hereby incorporated by reference.

B. General Features

Figure 4:
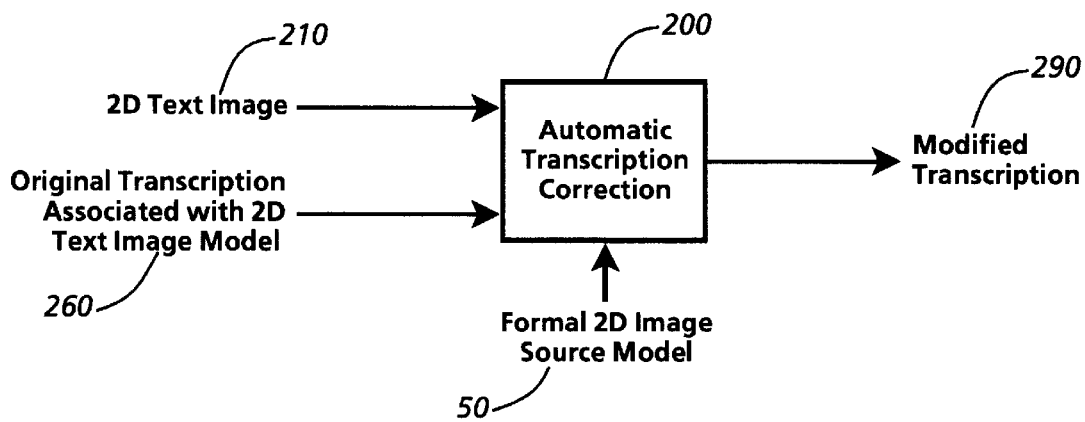
FIG. 4 is a high level block diagram illustrating the input and output data structures of the transcription correction technique and system of the present invention.
Figure 5:
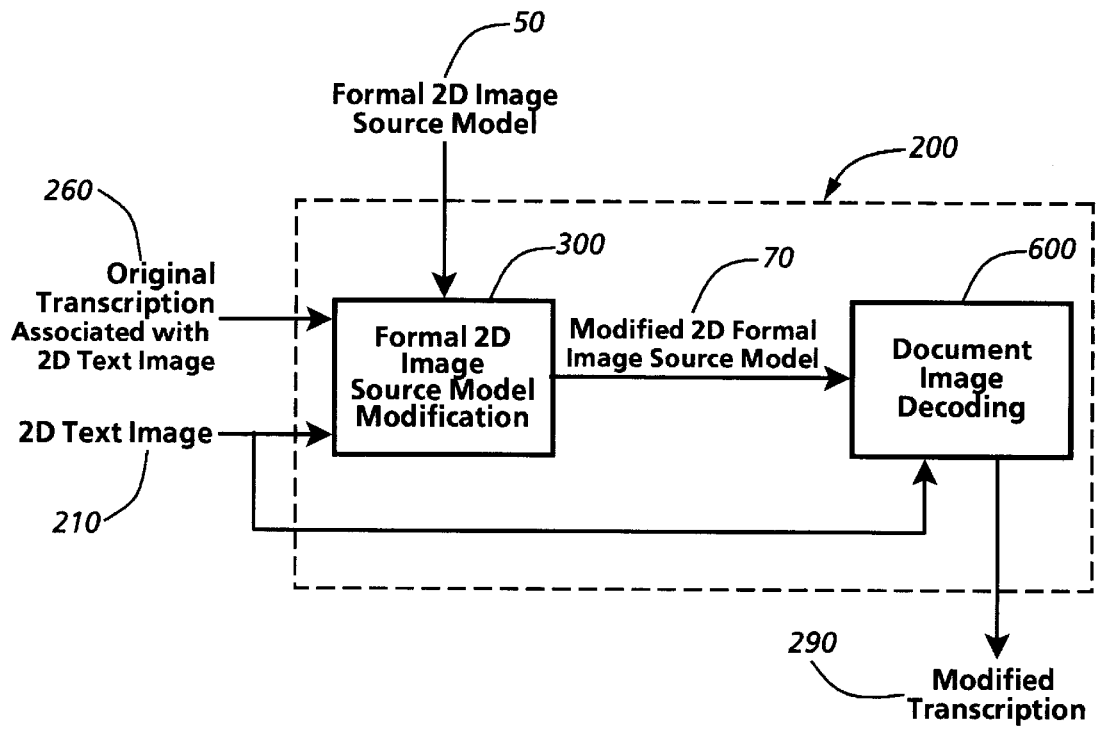
FIG. 5 is a block diagram expanded from the block diagram of FIG. 4 illustrating the two stages of transcription correction and an intermediate data structure produced according to the transcription correction technique and system of the present invention.

FIGS. 4 and 5 illustrate the general features and operation of the present invention. FIG. 4 is a high level block diagram showing the general input and output data flow of the present invention. FIG. 5 is an expanded block diagram that shows the two stages of transcription modification and an intermediate data structure produced as a result of the first stage. The terms "transcription correction" and "transcription modification" are used interchangeably to generally refer to the functional processing of the present invention.

The transcription modification technique 200 of the present invention illustrated in the block diagram of FIG. 4 is provided with inputs of a text image 210, an original transcription 260 associated with text image 210, and an image model 50, all of which have been defined above. Image 10 of FIG. 1 is an example of the type of input text image 210 that may be used in the present invention. Similarly, transcription 60 of FIG. 3 is an example of the type of original transcription 260 that may be used in the present invention. Transcription modification technique 200 uses these input sources of data to produce modified transcription data structure 290 which is a message string indicating a transcription of text image 210 that is different from the message string of original transcription 260. When original transcription 260 is an errorful transcription having transcription label errors, modified transcription 290 indicates one or more corrected transcription labels.

FIG. 5 shows an expanded block diagram for transcription correction technique 200 that shows the two stages of transcription correction according to the present invention: formal 2D image model modification process 300 and document image decoding process 600, which is a re-recognition process. Formal image model 50 defines as a grammar the spatial image structure of a set of document images in which text image 210 is included, and provides a mapping between the sequence of glyphs occurring in text image 210 and a sequence of message strings that identify the glyphs. A decoding operation, such as decoding operation 600, using formal image model 50 to re-recognize text image 210 might produce a transcription that is different from original transcription 260 and that transcription might or might not have corrected transcription labels; this is because model 50 defines the spatial structure of a class of document images and provides a mapping between glyphs occurring in any document image of the type defined by model 50 and message strings identifying those glyphs, and thus is directed to a class of document images and not to the specific content of text image 210 and transcription 260. The role of model modification in transcription correction is premised on the understanding that a modified image model, referred to as modified 2D image model 70 in FIG. 5, that is modified according to the specific content of text image 210 and transcription 260 will direct re-recognition process 600 to produce more accurate recognition results than indicated by original transcription 260, and than would be produced if text image 210 were decoded using formal image model 50 in an unmodified form.

The transcription correction methodology of the present invention may include several types of model modifications. The key criterion for evaluating whether a modification of the formal image model is a suitable modification and is intended to be encompassed by the present invention is whether the modification to the image model uses the specific a priori knowledge available in the input text image 210, the input transcription 260, a combination of the two inputs, or some other language specific knowledge in order to alter the mapping expressed in the original formal image model between the sequence of glyphs in the input text image and a sequence of message strings that identify those glyphs. The alteration of original formal model 50 must in some way be derived from the specific document content of one or both of the inputs or from some language specific knowledge, and must facilitate the more accurate recognition of the glyphs occurring in text image 210.

One type of model modification involves training the set of character templates included in formal image model 50 in the font in which the glyphs appear in text image 210 and to use the trained character templates in re-recognition process 600. The rationale for this type of model modification is based on the observation that some number of errors occurring in original transcription 260 were caused by a recognition operation using character templates that inadequately discriminate between character images appearing in the same font in text image 210. It follows from this observation that training the character templates in the font in which the glyphs appear in the input text document image should lead to improved recognition performance when the trained templates are used in comparisons with the glyphs in the same text image 210 during the subsequent decoding of text image 210.

The supervised template training process that is a component of the transcription correction technique of the present invention uses training data that is entirely derived from the input text document image and from the input, errorful transcription, and is based on two observations about these input sources. The first observation is that the text image typically contains multiple sample images of a unique character in a particular font of the character set represented by the characters in the transcription, and, if information indicating the 2D image x,y coordinate positions and the character identity of each sample were known, a trained character template for each unique character in the 2D image, in the specific font of the samples, could be derived from the pixel colors of the set of pixels that make up each glyph sample. The second observation is that the transcription labels of the transcription associated with the 2D image provides identity and sequence information for each of the glyphs in the 2D input image that may be used to identify the character of a respective one of the glyphs. The grammar-based 2D image model defines spatial positioning information about the glyphs that occur in the text image in order to locate the glyphs, and defines mapping data indicating a mapping of a respective one of the glyphs occurring in the 2D image to a glyph label indicating the character in the input image character set.

A second modification to the formal 2D image model involves a document specific approach to language modeling in which the specific, observed language usage found in original, errorful transcription 260 is represented as a language model in a form that permits the language model to modify the formal 2D image model. The language model models a set of transcriptions as a set of string grammars. The set of transcription strings includes the string of the input transcription and at least one other possible string for the given input image that contains a character string that indicates a correct character string for a transcription error in the given input transcription.

The rationale for this type of model modification is based on two observations about original transcription 260: first, even though transcription 260 is errorful, it contains many correctly recognized sequences of character labels that represent valid and common language usage in the language system that is represented by the glyphs in the text image. Secondly, some transcription label errors occurring in original transcription 260 occur in character label sequences that have been produced correctly elsewhere in the transcription, leading to the conclusion that some recognition errors are perhaps less due to poor character discrimination resulting from using inadequate template models and are more likely to be caused by segmentation errors resulting from noisy portions of the image. It follows from these observations that information about the valid and common character label sequences that occur in the transcription in text image 210 can be used to modify the formal image model to specifically and only produce these sequences of character labels during a subsequent decoding process.

This type of language modeling uses information that is principally derived from the input transcription. Transcription 260 is analyzed to produce a language model of a specific type of language usage that is available from the observed character label sequences, and this language model is used to modify formal 2D image model 50. In addition, the language model may include language specific information about the language system that is represented by the glyphs in the text image. For example, some simple language specific rules may be used to allow some additional valid character label sequences that may not occur in transcription 260 to be incorporated into the formal image model. In the illustrated implementation described below, language usage is modeled as a finite state network representing a bigram model derived from transcription 260. The bigram language model network is augmented using some simple language specific rules, and the language model network is merged with the formal 2D image source network after template training to produce a modified formal 2D image model 70. Other types of language models derived from the transcription, and from other language specific information, are also possible, and will be discussed in more detail below in the discussion of language model construction.

With reference again to FIG. 5, modified formal 2D image model 70 is used in document image decoding process 600 to re-recognize text image 210 to produce a modified transcription 290 that indicates fewer transcription label errors than original transcription 260.

The transcription correction technique of the present invention may be implemented as an entirely automatic post-recognition correction process in a commercial recognition system, requiring no involvement or control by a user in the actual correction process. Because the formal image model defines the spatial structure of a particular class of document images to be recognized, if a formal image model does not exist that describes the spatial structure of the text image associated with a transcription presented for correction, such a model must be provided. Automated methods for preparing the formal image model may be utilized for this function, and may require user provided data and parameters; these may be collected and managed through a specially designed user interface. It is expected that users of such a system could include OCR system development users as well as end users.

C. An illustrated implementation of the training technique

An embodiment of the present invention has been implemented as a software program on a SUN SparcStation 10 computer running the SUN Solaris-1 operating system, available from Sun Microsystems, Inc., of Mountain View, Calif. The system was configured with 64MB RAM memory and a disk swap space of 600MB. The software program is written in a standard version of the Common Lisp programming language, using a compiler obtained from Lucid, Inc. of Menlo Park, Calif. (now available from Harlequin, Inc. of Cambridge, Mass.) Portions of the software were written in the C programming language, compiled using the GCC compiler available from the Free Software Foundation, Inc., of Cambridge Mass. The compiled C programs were accessed from Lisp via the Lucid Common Lisp foreign function interface.

The description of the illustrated implementation that follows requires a familiarity with the details of the invention that is the subject matter of commonly assigned U.S. Pat. No. 5,321,773, issued to Kopec and Chou, inventors herein, and entitled "Image Recognition Method Using Finite State Networks." The disclosure of this patent is hereby incorporated by reference as if set out in full herein for all that it teaches. Additional information about the image model and image decoding discussed in the illustrated implementation may also be found in the article by Kopec and Chou, "Document Image Decoding," referenced earlier in the background discussion, which is also hereby incorporated by reference herein as if set out in full. In the context of the discussion that follows of the illustrated implementation, the term "2D image decoding" or "document image decoding" or simply "decoding" will be used to refer to a recognition operation that includes matching a binary character image to a character template in order to assign a character code to the character image.

The description of the illustrated implementation also presumes an understanding of probability and decision theory as they relate to pattern matching problems, and presumes a working knowledge and familiarity with the application to and implementation of hidden Markov models for modeling the occurrence of a sequence of observable symbols. One useful text in this regard is *Hidden Markov Models for Speech Recognition* by Huang, Ariki and Jack (Edinburgh University Press, 1990). In particular, chapter 2, "Fundamentals of Pattern Recognition" at pp. 10–51; chapter 5, "Hidden Markov Models and Basic Algorithms" at pp.

136–166; and chapter 6, "Continuous Hidden Markov Models" at pp. 167–185 provide relevant background. All of these chapters are hereby incorporated herein by reference for all purposes, as if set out in full. Other sources of information about hidden Markov models include L. Rabiner, "A Tutorial on Hidden Markov Models and Selected Applications in Speech Recognition", in *Proceedings of the IEEE*, Vol. 77, No. 2, February, 1989, at pp. 257–285 (hereafter referred to as "the Rabiner tutorial reference,") and L. Rabiner and B. Juang, "An Introduction to Hidden Markov Models", in *IEEE ASSP Magazine*, January 1986, at pp. 4–16. Both of these articles are also hereby incorporated herein by reference for all purposes, as if set out in full.

The discussion of the illustrated implementation is organized as follows: first, an illustrated embodiment is presented of training character templates in the font in which the glyphs appear in the input text image with which the original errorful transcription is associated. The discussion of this first modification to an original formal 2D image model in the context of the illustrated embodiment includes a description for producing character template training data using the transcription and the input 2D image, and a discussion of an implementation of a novel template construction process that produces trained character templates using the character template training data. A discussion of a second model modification is then presented which involves the construction of a language-image model. Finally, an illustrated embodiment of the re-recognition process using the modified formal image model is presented. FIGS. 6–22 illustrate the features of an illustrated embodiment of the present invention for constructing trained character templates. FIG. 14 illustrates the process of identifying the training data for template training, i.e., the finding and labeling of glyph sample image origin positions in the input text image, and FIGS. 15–22 illustrate the implementation of the template construction process using the training data. FIGS. 23–26 illustrate the second model modification process, i.e., the process of using the transcription to produce the language-image network. The flowchart of FIG. 27 shows the illustrated embodiment of the second stage of transcription correction, the document image decoding process using the modified formal 2D image model.

Character template training in a two-dimensional environment is the subject matter of copending, commonly assigned U.S. patent application Ser. No. 08/431,223, "Automatic Training of Character Templates Using a Transcription and a Two-Dimensional Image Source Model," which is hereby incorporated by reference for all that it teaches. While this discussion of the illustrated implementation describes the production of character template training data as finding and labeling glyph sample image origin positions in the input text image without performing a conventional glyph segmentation process, U.S. patent application Ser. No. 08/431,223 notes that the type of training data that is produced depends on the type of character template model that is being trained; when the character template model is a segmentation-based model in which character template bounding boxes are not allowed to overlap, producing character template training data according to the transcription correction method and system present invention may include segmenting the glyphs.

In the mathematical notation used in this description, the symbols x and $\Delta_t$ in bold type will be used to denote vectors x and $\Delta_t$, respectively, and an equation defined in the discussion will be subsequently referenced by its equation number in parentheses.

1. Implementation overview

Figure 6:
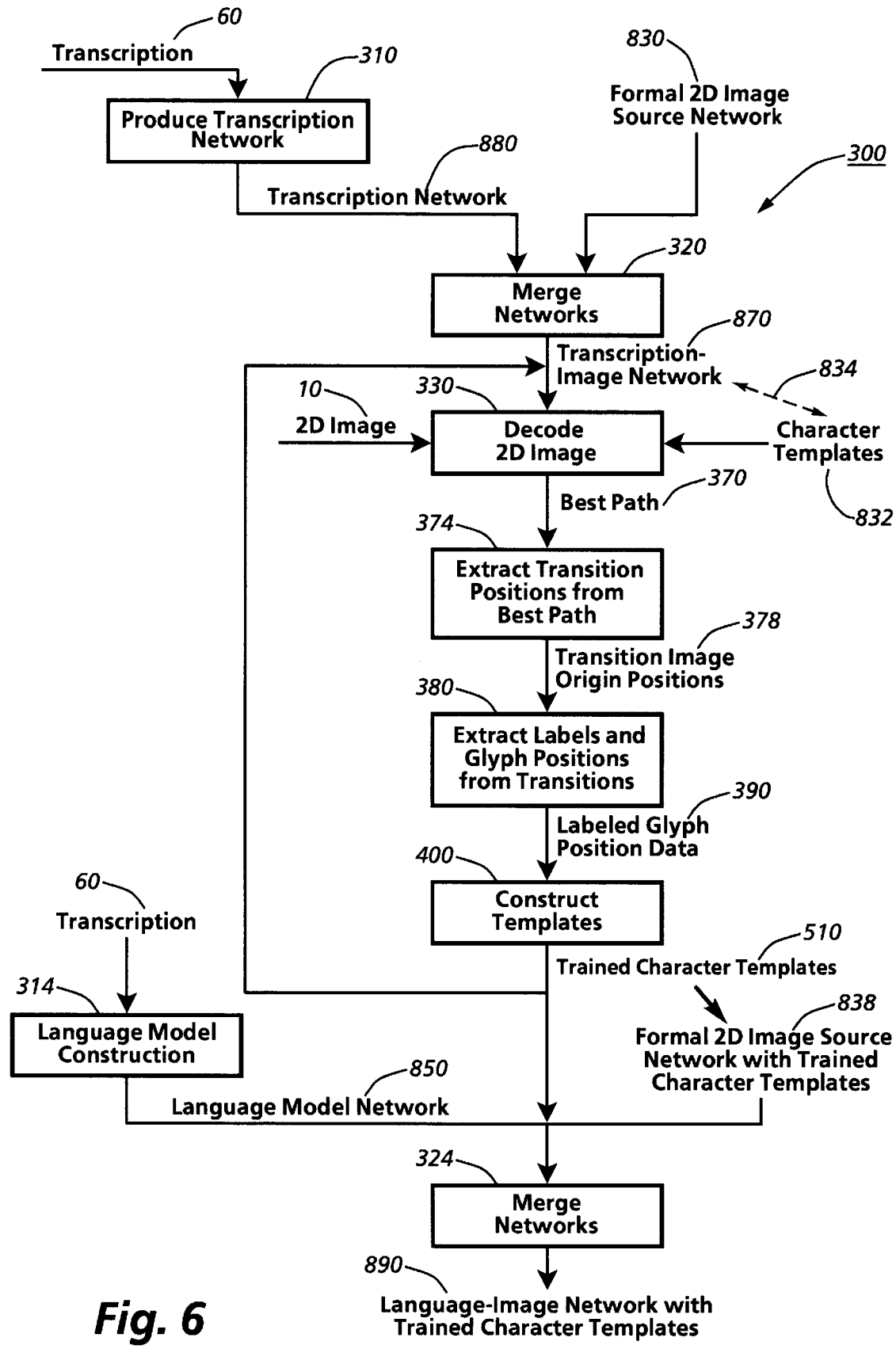
FIG. 6 is a block diagram expanded from the block diagram of FIG. 5 illustrating the general processes and data flows of the model modification stage of the transcription correction technique of the present invention.

FIG. 6 illustrates an expanded block diagram of the model modification stage of the transcription correction technique of the present invention, showing the processes and data flows of model modification as they relate to the illustrated implementation that is described in detail below.

Transcription 60 (of FIG. 3) is input to transcription network production process 310 which produces a transcription network 880 in the form of a finite state transition network. Two-dimensional (2D) image source model 830, represented as a stochastic finite state transition network similar to that disclosed in U.S. Pat. No. 5,321,773, and transcription network 880 are inputs into network merge process 320 which produces a merged finite state network called a transcription-image network 870. This merged network is then used to decode text image 10 (of FIG. 1) using a Viterbi decoding process 330 that produces a best sequence of transitions, or path, through the merged network. Decoding step 330 uses a current set of character templates to determine the best path through transcription-image network 870. An initial set of character templates 832 is used during the initial iteration of decoding; dotted line 834 indicates that initial set of character templates 832 is part of the merged finite state transcription-image network 870 since, as will be explained below, character templates may be attributes on transitions in network 830, and consequently in transcription-image network 870. The initial set of character templates has arbitrary content and may be generated by the processor for association with the transitions in transcription-image network 870. Process 374 identifies the transitions and their corresponding image origin positions in 2D image 10 that compose the best path through transcription-image network 870, as produced by Viterbi decoding process 330. Process 380 then determines the image origin positions and message strings from the transitions that have non-null character template attributes; the image origin positions indicate estimated locations of glyph samples in 2D image 10, and the message strings associated with the image origin positions on the transitions provide character labels for the glyph samples. The training data, i.e., labeled glyph image origin positions 390, are then input into template construction process 400, which produces a set 510 of character templates trained in the font in which the glyphs appear in 2D image 10. FIG. 6 also shows that the decoding, training data extraction, and template construction steps, in boxes 330, 374, 380, and 400, are iterated. Iteration continues until a stopping condition is met, and the set of templates used in decoding step 330 during iterations subsequent to the initial iteration is the current set of templates produced as the output of template construction step 400. At the completion of template construction, the set 510 of trained character templates becomes part of 2D image source network 830, now designated as 2D image source network 838 in FIG. 6. Prior to network merge process 324, transcription 60 (of FIG. 3) is input to language model construction process 314 which produces a language model network 850 in the form of a finite state transition network. 2D image source network 838 and language model network 850 are inputs into network merge process 324 which produces a merged finite state network called a language-image network 890 that includes the set 510 of trained character templates. Each of the processes in FIG. 6 is now discussed in more detail.

2. The 2D image model represented as a stochastic finite state transition network.

Figure 7:
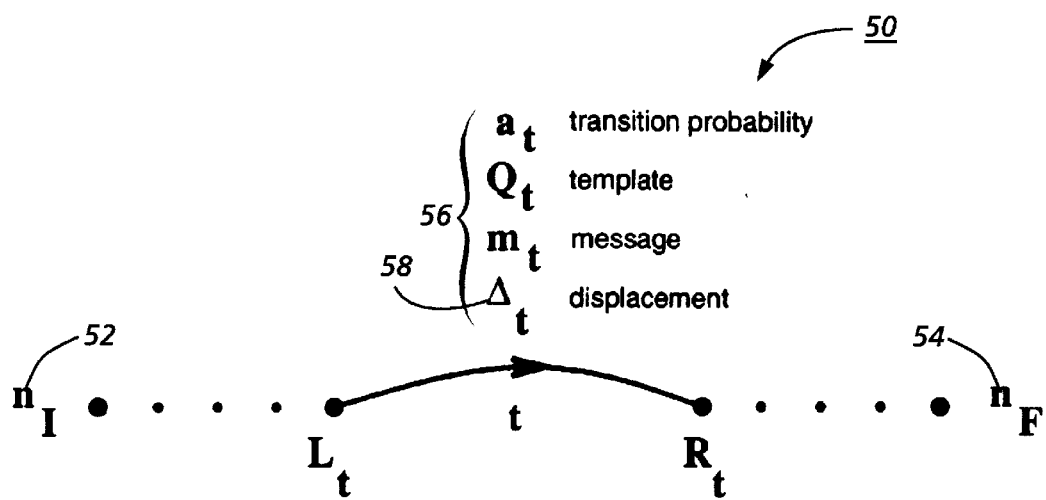
FIG. 7 illustrates a formal 2D image model represented in its general form as a simplified, finite state transition network.

With reference now to FIG. 7, formal 2D image model 50 is represented in the illustrated embodiment as a finite state image model of the type disclosed in U.S. Pat. No. 5,321,773 and discussed and described in Kopec et al.,"Document Image Decoding." The general characteristics of this finite state image model and its mathematical constructs are repeated here for convenience, followed by a discussion of the specific finite state image model that models a set of 2D images having the common spatial structure of a single column of text, of which text image 10 is a representative image. Note that, in general, it is known and understood in the art that a data structure representing data or models as a finite state transition network is equivalent to a data structure representing data as a set of regular grammar rules, and that depicting data structures as finite state transition networks in the figures herein, and in the discussion of an illustrated implementation of the present invention, neither intends nor implies any limitation on the types of data structures that may be used in carrying out the present invention.

With reference to FIG. 7, the structure of a set of images is captured formally by modeling image generation as image source model 50, which is also called a Markov source. A Markov source consists of a finite set of states (nodes, vertices), N, and a set of directed transitions (branches, edges) B. Each transition t connects a pair of states, $L_t$ and $R_t$, that are called, respectively, the predecessor (left) state and the successor (right) state of t. Two distinguished members of N are the initial state $n_I$, denoted by reference numeral 52, and the final state $n_F$, denoted by reference numeral 54. It is assumed that no transition has $n_F$ as its predecessor, so that the final state is a trap state. With each transition t is associated a 4-tuple of attributes 56, ($Q_t$, $m_t$, $a_t$, $\Delta_t$), where $Q_t$ is a character template, $m_t$ is the message string, $a_t$ is the transition probability, and $\Delta_t$, denoted by reference numeral 58, is the vector displacement of t, analogous to set width for characters. A description of character set width may be found in either U.S. Pat. No. 5,321,773 or Kopec and Chou, "Document Image Decoding." In the illustrated implementation, some of these attributes may be null for particular transitions, each transition message string $m_t$ of image source model 50 is assumed to be either the empty string $\epsilon$ or else contains a single character, and vector displacement 58 may have negative, zero or positive scalar component values. The template $Q_t$ is defined over the entire image plane $\Omega$, although normally its support (set of non-zero, foreground pixels) will be localized within a small region near the origin of the local template coordinate system.

A "path," denoted $\pi$, in a Markov source is a sequence of transitions $t_1 \ldots t_P$ for which $L_{t_1} = n_I$ and $$R_{t_i} = L_{t_{i+1}} \tag{1}$$

for i=1, . . . , P−1. A "complete path" is a path for which $R_{t_P} = n_F$. A "cycle" or "loop" is a sequence of transitions $t_1 \ldots t_P$ for which $L_{t_1} = R_{t_P}$. Associated with each path, $\pi = t_1 \ldots t_P$, is a composite message, or message string, $$M_{\pi} = m_{t_1} \cdots m_{t_P} \tag{2}$$

formed by concatenating the message strings of the transitions of the path. A message string in this context is another term for the transcription, and the terms message, message string, transcription and transcription string are used interchangeably in the discussion of the illustrated implementation. The set of transcriptions generated by complete paths through a Markov image source is a regular language and the source model itself is a finite state automation that accepts that language. A Markov image source model defines a probability distribution on complete paths by $$Pr\{\pi\} = \prod_{i=1}^{P} a_{t_i} \tag{3}$$

and induces a probability distribution on messages by $$Pr\{M\} = \sum_{\pi | M_\pi = M} Pr\{\pi\} \tag{4}$$

where $M_\pi$ is the message associated with path $\pi$ and the summation is taken over complete paths.

Also associated with each path $\pi$ is a sequence of vector image pixel positions $x_1 \ldots x_{P+1}$ recursively defined by $$x_1 = 0 \tag{5}$$

$$x_{i+1} = x_i + \Delta_{t_i} \tag{6}$$

where $x_{P+1}$ is introduced for convenience, and a composite image Q defined by $$Q_\pi = \bigcup_{i=1}^{P} Q_{t_i}[x_i] \tag{7}$$

where Q[x] denotes Q shifted so that the origin of its local coordinate system is located at x, and the union of two template images is an image that has foreground pixels where either of the two template images has a foreground pixel. For a path $\pi$, $$\Delta_\pi = x_{P+1} - x_1 = \sum_{i=1}^{P} \Delta_{t_i} \tag{8}$$

is defined to be the displacement of the path and $\Delta x_\pi$ and $\Delta y_\pi$ denote the x and y components of $\Delta_\pi$, respectively. A pair $(x_i, t_i)$ consisting of one of the positions defined by (5) or (6) and the corresponding transition of the Markov source will be called a "labeled transition image origin position." The set of all such pairs defined by a complete path is called the set of labeled transition image origin positions of the path. For each transition t, let $N_t$ denote the number of transition image origin positions of the path that are labeled with t and let the corresponding transition image origin positions be denoted $x_1^{(t)} \ldots x_{N_t}^{(t)}$. Thus, $$P = \sum_{t \in B} N_t \tag{9}$$

Based on the premise that fonts are typically designed so that the foreground pixels of the character glyphs do not overlap (i.e., share the same foreground pixels) in text strings, image source models of the type illustrated in FIG. 7 and in this illustrated implementation are required to be designed so that $$Q_{t_i}[x_i] \cap Q_{t_j}[x_j] = \emptyset \tag{10}$$

for $i \neq j$, for every path $\pi$. The requirement expressed in (10) may be referred to as the "template disjointness constraint" of neighboring template supports.

Image source model 50 (FIG. 7) defines a relation, or mapping, between message strings and images via an underlying path and (2) and (7) that is bidirectional. While the primary concern in document recognition is decoding—that is, recovering messages (i.e., transcriptions) from observed images—image source model 50 can also function as an imaging model for use in generating an image of a specified message. Equation (7), in view of (10), defines an imaging model that can be conceptually viewed as follows: Imagine a collection of transparent plastic sheets, on each of which is painted one copy of some template Q, with the origin of Q at the center of the sheet. For each transition $t_i$ of path $\pi$, a sheet containing $Q_{t_i}$ is placed on top of a stack of transparencies with the center of the sheet aligned at $x_i$. The template disjointness constraint ensures that the support of $Q_{t_i}$ does not overlap with the support of a template on a previous transparency. Individual plastic sheets are likely to overlap significantly, and it is permissible for template bounding boxes to overlap, since bounding boxes play no particular role in this imaging model. The complete stack of transparencies defines the image, $Q_\pi$.

As noted above, an image source model defines a finite state acceptor for the language of messages generated by the model. Thus, given a message string M, it is straightforward to determine if there is a complete path $\pi$ for which $M_\pi=M$, and, if such a path exists, to find one. The image $Q_\pi$ defined by (7) is then an image of M. If the image source model defines a deterministic acceptor for the message language, the process of message imaging using the image source model admits a simple procedural interpretation, similar to the "turtle geometry" interpretation for strings generated by Lindenmayer systems in computer graphics. Imagine an imager automation (referred to as an "imager") that draws what may be called an "ideal" image in an output image plane under the control of an input message "program". The structure of the imager is defined by a finite state image source model of the type illustrated in FIG. 7. The imager begins at location (0,0) of the output image plane in internal state $n_I$. The imager examines the first character in the input message, compares it with the message labels on the transitions from $n_I$, and selects the branch whose message matches the input character. If the template associated with the selected branch is non-null, the imager draws a copy of the template on the output image plane, with the template origin aligned with the imager's current image position. The imager then increments its image position by the branch displacement and updates its internal state to the successor node of the selected branch. This process is repeated for each character of the input message until ideal image $Q_\pi$—and a path through the network from initial node, $n_I$ to the final node, $n_F$—is completed.

As an image decoder, image source model 50 may be used to extract simple text strings from an observed image to produce a literal text transcription of the image (i.e., a transcription without formatting or logical structure tags.) These text strings are extracted from the message string attribute associated with each transition included in a path identified through model 50 as the observed image is being decoded. Image source model 830 in FIG. 8 models a set of 2D images having the common spatial structure of a simple text column and will be used to illustrate the process of image decoding in more detail. A simple text column consists of a vertical sequence of text lines, alternating with white (background) space. Horizontally, a text line is a sequence of characters typeset according to the sidebearing template model. Text image 10 is a representative image of the type modeled by image source model 830. Model 830 models a path through a 2D image of a single column of text that follows the conventional reading order for a text in the English language, assuming that the path through the image starts at the top left corner of the image and proceeds to the bottom right corner, and proceeds from the left of the image to the right in repeated 1D line sequences. Each transition $t_i$ between nodes in the network has the associated 4-tuple of attributes, shown in FIG. 8 in the order $[a_t]$ $(\Delta_t)$, $m_t$, $Q_t$, where, when a template $Q_t$ is associated with a transition, the message string $m_t$ identifies the character represented by the template. It can be seen that some of these attributes are null for some transitions.

Figure 8:
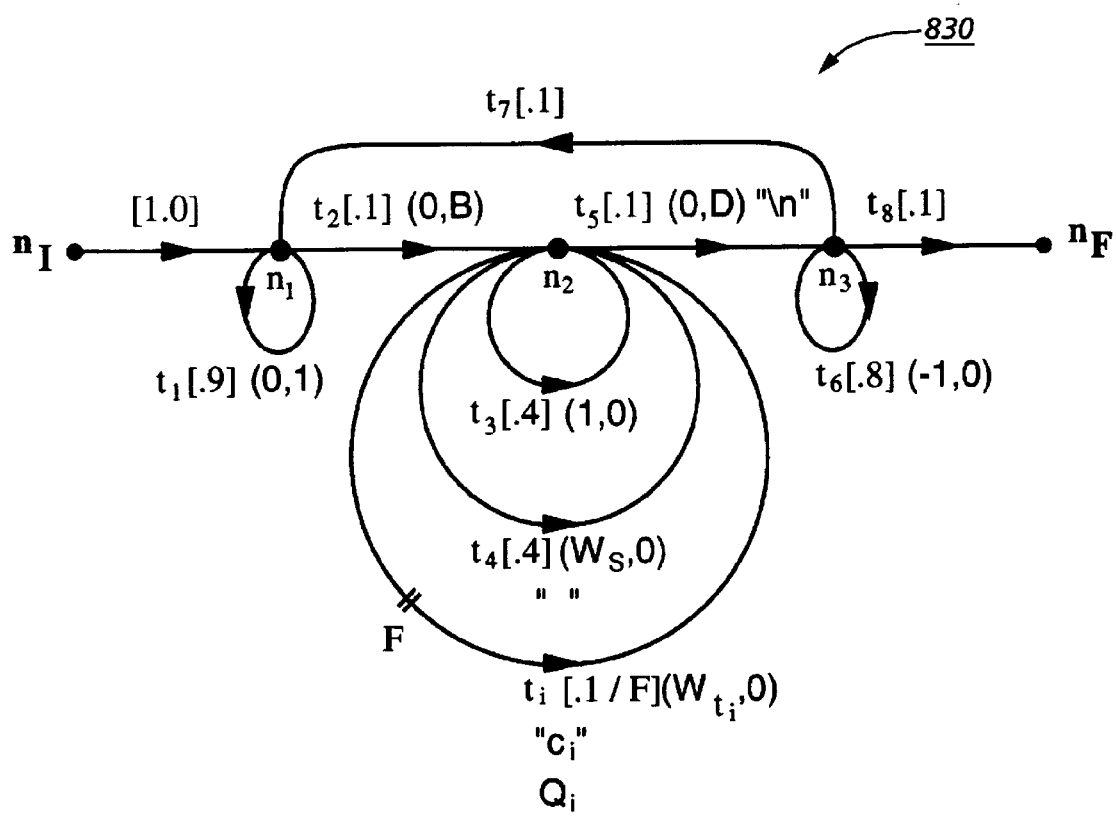
FIG. 8 is a diagram illustrating a finite state transition network modeling a class of 2D text images having the spatial structure of a single text column, such as the 2D text image of FIG. 1, used in the illustrated implementation of the present invention.

With reference now to FIG. 8, state $n_1$ corresponds to the creation of vertical white space. Each time branch $t_1$ is traversed, the imager moves down one row without drawing anything on the output image plane, since no image template is associated with $t_1$. At some point, the imager reaches the top of a text line and follows branch $t_2$. The displacement (0,B) of $t_2$ moves the cursor down to the text baseline; B is the font height above baseline. State $n_2$ represents the creation of a horizontal text line. The self-transitions from $n_2$ to $n_2$ are of two types. The F transitions $t_i$ that are labeled with image templates $Q_i$ and single-character message strings "$c_i$" are used to draw individual glyphs on the output image plane. The horizontal displacement associated with each of these branches is the character set width, $W_{t_i}$. Branches $t_3$ and $t_4$ have blank templates associated with them and represent white space. Branch $t_3$ represents a white space of minimal (1 pixel) width and is used for fine spacing adjustment. Branch $t_4$ corresponds to a real space character of font-dependent width $W_S$ and is labeled with a space message "". At the end of a text line, the imager traverses $t_5$ ("line feed") and enters "carriage return" state $n_3$. The message on $t_5$ is the new line character "\n". The vertical displacement associated with $t_5$ is the font depth D. Each traversal of branch $t_6$ moves the imager left by one pixel. Finally, transition $t_7$ returns the imager to state $n_1$ and the process is repeated for the next text line. After the last text line has been created, the imager traverses $t_8$ into final state $n_F$.

The transition probabilities illustrated in FIG. 8 have been set manually. Actual experience with image source model 830 suggests that the exact values of the transition probabilities are not important in determining the most likely path through the network, given an observed image, except when the observed image alone is insufficient to reliably distinguish between alternative possibilities, for example, as a result of noise.

It can be seen from the operation of image source model 830 as a decoder, that, given an existing set of templates, model 830 decodes any observed 2D text image having the appearance of a single column of text that is organized in the image in conventional English language reading order by producing an ideal image, $Q_\pi$, that is closest in appearance to the input image being decoded, using the set of templates provided as part of the model; the transitions that are taken along the best path through the network produce a mapping from character images to message strings, and extracting the set of message strings from the transitions produces a transcription of the input image. This general form of decoding is unconstrained with respect to any particular set of message strings that is produced; that is, model 830 permits any character template to follow any other character template in the ideal image that is created for comparison with the 2D input image. In addition, the appearance of the character templates used in model 830 during decoding directly affect the comparison of the ideal image with the 2D input image, and thus affect the transitions that ultimately compose the best path and the message strings that are extracted from the transitions.

The transcription correction technique of the present invention is premised on the discovery that, if image source model 830 were modified to use character templates that were trained in the font in which the glyphs actually appear in the input text image, character templates that are closest in appearance to corresponding glyphs in the input image would be more likely to occur in the ideal image produced during decoding, thereby producing transitions in the best path through the network that have correct message strings associated with them.

Further, if image source model 830 were modified to produce a path through the network that was constrained by actual language usage in the original transcription, the sequence of the imaging of character templates in an ideal image would be directed to a sequence of glyphs that actually occurs in the input image and would be more likely to produce a set of transitions along the best path that represent character templates in the ideal image that correctly represent glyphs in the input image, thereby resulting in errorful sequences in the original transcription being corrected in subsequent re-recognition of the input image; such a model modification would also less likely result in errors being introduced during subsequent re-recognition than if re-recognition took place using an unconstrained image model, since character template imaging choices are constrained.

It can be seen that either one of these model modifications alters the mapping between character images and message strings that would have been produced if unmodified model 830 were used during a re-recognition operation, and that model 830 modified in one or both ways would produce, in a subsequent re-recognition operation performed on the input text image, a mapping between character images and message strings that would be likely to correct transcription label errors in an original transcription associated with that input text image. Each of these model modifications will now be described in turn, in the context of the illustrated embodiment.

3. The role of a transcription network in character template training.

Template training is based on two observations: first, that transcription labels provide a source of character labels for glyphs occurring in the input text image 10 such that, if the locations of these glyphs in image 10 were known and could be labeled, image 10 would serve as a source of training data for training templates. Secondly, it can be seen from the discussion above of the decoding process using 2D image source network 830 (FIG. 8), that glyph image origin positions and character labels are available from the best path through the image source network 830 produced from decoding observed image 10.

Decoding an observed input image using the formal 2D image model just described produces training data for training character templates in the form of glyph image origin positions and character labels that are available from the best path through the network produced by decoding. However, successful decoding of an observed 2D image using 2D image models of the type illustrated in FIG. 8 assumes an existing set of character templates of a certain level of quality and suitability for the decoding task. When such a set of character templates does not exist prior to training (which could be reasonably assumed in the case of transcription correction,) decoding an observed 2D image for the purpose of producing training data, with no other information available about the glyphs in the image, would be highly inefficient and would be unlikely to provide accurate training data.

The transcription associated with the observed 2D image is provided to constrain the decoding process to produce a path through the network that produces the message string of the transcription. This is accomplished by representing the message string of the transcription as a finite state transition network, called a "transcription network." The transcription network is a simplified form of the finite state image source model of FIG. 7 in which each transition is associated with a message string $m_t$, but no other attributes. A set of transcriptions may also be represented as a transcription network. Given a data structure representing a set of transcriptions, and given the data structure for a particular transcription, it can be determined whether the particular transcription belongs to the set defined by the data structure for the set of transcriptions.

Figure 9:
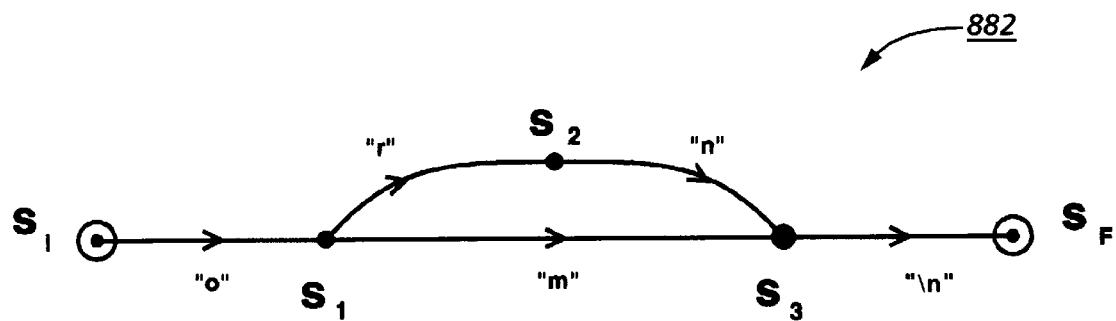
FIG. 9 is a diagram illustrating a simplified portion of a transcription network used to illustrate the process of model merging according to the present invention.

Model 882 in FIG. 9 is a simple example of a finite state transition network for a set of transcriptions (taken from the word "From" in 2D image 10 of FIG. 1) representing the set containing the two transcription strings "orn\n" and "om\n" where the symbol "\n" represents the new line character. In the illustrated implementation, as is the case with image source model 830, each transition message string $m_t$ of transcription network 880 (FIG. 6) is assumed to be either the empty string $\epsilon$ or else contains a single character. It is known that a network that contains message strings with multiple characters may be transformed into an equivalent network in which each message string contains either zero or one character by introducing additional nodes and transitions. Thus, this assumption incurs no loss of generality.

A transcription network, such as network portion 882 of transcription network 880 illustrated in FIG. 9, is capable of generating a complete path through the network; a transcription is available from the transitions composing the path. Thus image source network 830 and the transcription network jointly define an ideal image that is a spatial arrangement of copies of character templates placed at specified image locations in the ideal image and selected according to a message string consistent with the transcription, and this ideal image is an approximation of the actual input 2D image with which the transcription is associated. It follows from this that decoding 2D image 10 using image source model 830 would be most efficient if decoding were able to be constrained to generate only ideal images, and consequently paths, that were consistent with the paths, and consequently message strings, generated by the transcription network. Such a constraint may be imposed on the decoding process that uses image source network 830 by merging image source network 830 with transcription network 880.

The data structure representing transcription network 880 is produced, in box 310 in FIG. 6, from transcription data structure 60 by any process that uses conventional tools for producing finite state string grammars and transition networks.

4. Merging the transcription network with the 2D image source network to produce the transcription-image network.

The inputs to the network merge step 320 (FIG. 6) are 2D image model 830 and transcription network 880 produced by process 310. The output of this step is a second Markov image source model of the type illustrated in FIG. 7, called the transcription-image network 870. Transcription-image network 870 is defined by the following two properties: (a) for each complete path $\pi$ in transcription-image network 870 there is a complete path in image source model 830 which has the same transcription string and image as $\pi$; and (b) for each complete path $\pi$ in image source model 830, if the transcription of $\pi$ is in the set of transcriptions generated by transcription network 880, then there is a complete path in transcription-image network 870 which has the same transcription string and image as $\pi$. The set of transcriptions generated by the transcription-image network is the intersection of the set of transcriptions generated by image source model 830 and the set of transcriptions generated by transcription network 880. The ideal images generated by transcription-image network 870 that have a given transcription are the same as those generated by image source model 830 having that transcription.

For Markov image sources and finite state transcription networks as defined in the illustrated implementation, network merging step 320 may be implemented as follows. Let $\overline{N} = \{n_0 \ldots n_{N-1}\}$ be the states of image source model 830, where $n_0$ is the initial state $n_I$ and $n_{N-1}$ is the final state $n_F$. Similarly, let $S = \{s_0 \ldots s_{T-1}\}$ be the states of transcription network 880, where $s_0$ and $s_{T-1}$ are the initial and final states, respectively. For each image source model or transcription network transition t, it is assumed that message $m_t$ is either the empty string $\epsilon$ or a string containing exactly one character, as discussed previously. The network formed from combining image source model 830 and transcription network 880 contains NT states, which correspond to pairs of image source and transcription states. The set of states of a combined transcription-image network may be written $$\{(n_i, s_j)\} i=0 \ldots N-1, j=0 \ldots T-1 \tag{11}$$

Network merging step 320 is essentially concerned with constructing transitions between pairs of image source and transcription network states in the merged transcription-image network such that the transcription-image network satisfies the two properties (a) and (b) defined above. These transitions are constructed according to the following three steps.

1. For each transition t of image source model 830 for which $m_t = \epsilon$ (i.e. the message associated with t is the null string) and for each $j=0 \ldots T-1$: add to the transcription-image network a transition from node $(L_t, s_j)$ to node $(R_t, s_j)$. The message, template and displacement associated with each such transition of the transcription-image network are the same as those of t.

2. For each transition t of image source model 830 for which $m_t \neq \epsilon$ (i.e. the message associated with t is a single-character string) and for each transition t' of transcription network 880 for which $m_{t'} = m_t$: add to the transcription-image network a transition from node $(L_t, L_{t'})$ to node $(R_t, R_{t'})$. The message, template and displacement associated with each such transition of the transcription-image network are the same as those of t.

3. For each transition t' of transcription network 880 for which $m_{t'} = \epsilon$ and for each $i=0 \ldots N-1$: add to the transcription-image network a transition from node $(n_i, L_{t'})$ to node $(n_i, R_{t'})$. The message and template associated with each such transition of the transcription-image network are both empty, and the displacement is the vector 0.

Figure 10:
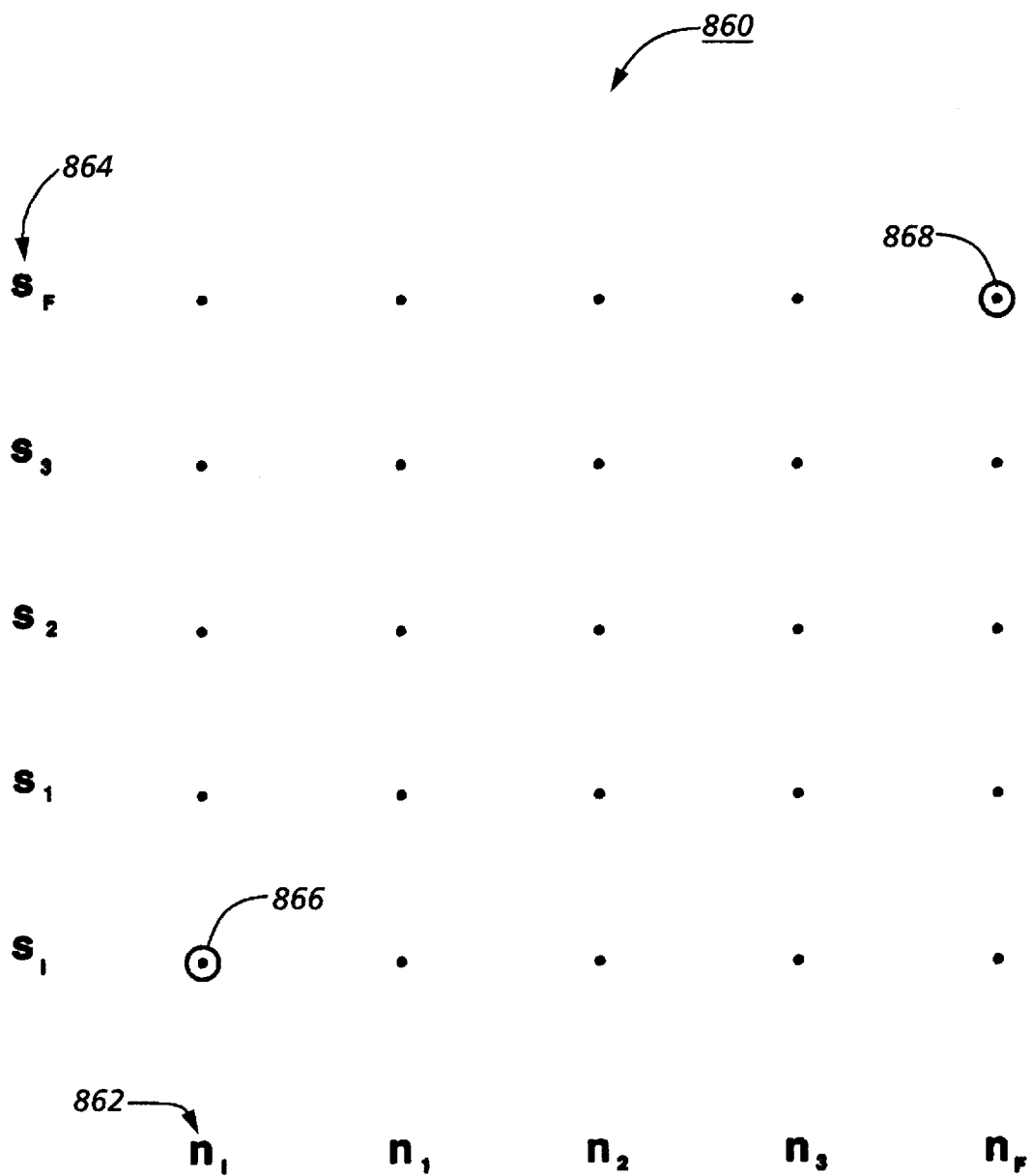
FIGS. 10, 11, 12 and 13 schematically illustrate the merging of the finite state image source network of FIG. 8 with the transcription network of FIG. 9, according to the illustrated implementation of the present invention.
Figure 11:
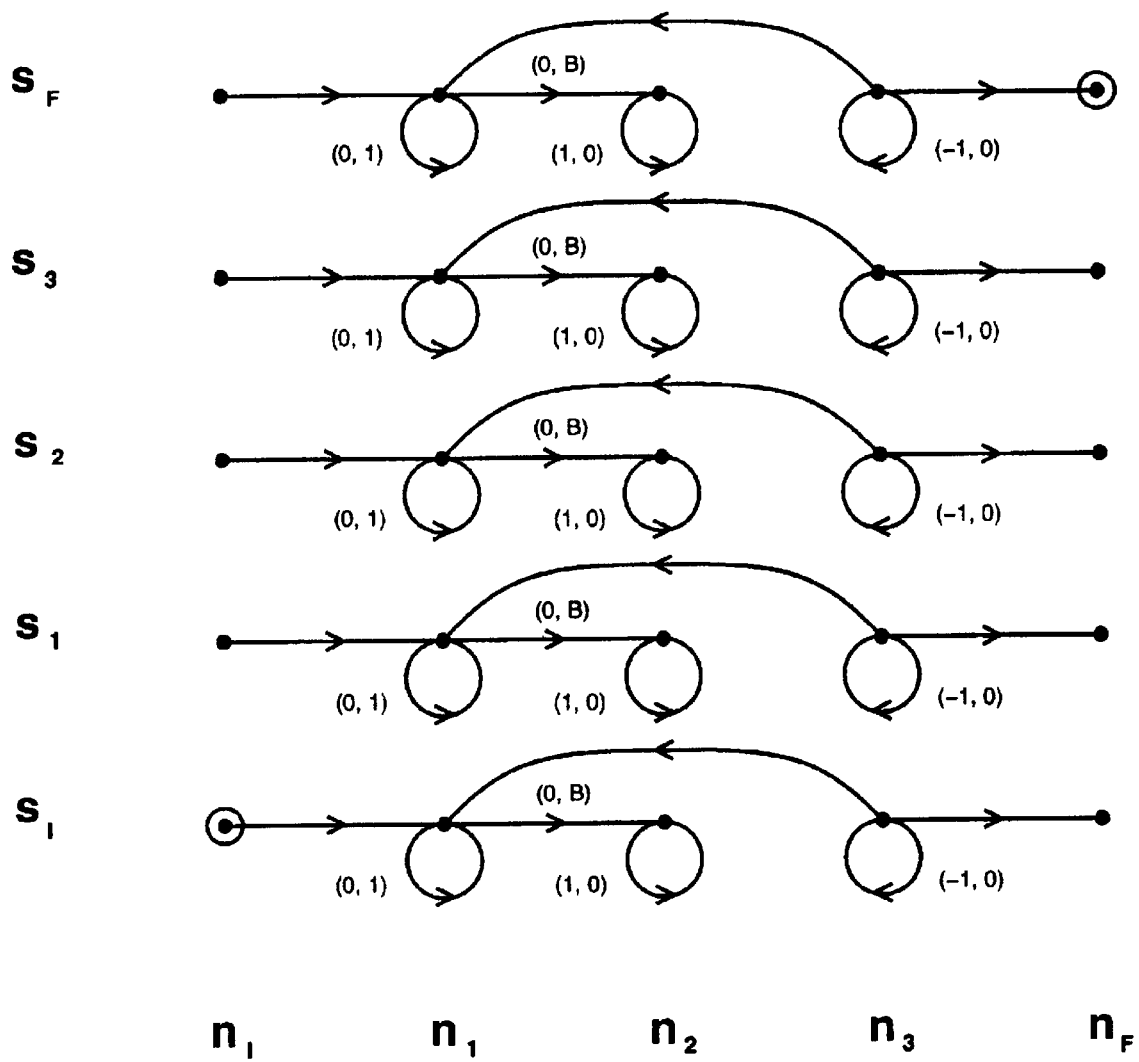
Figure 12:
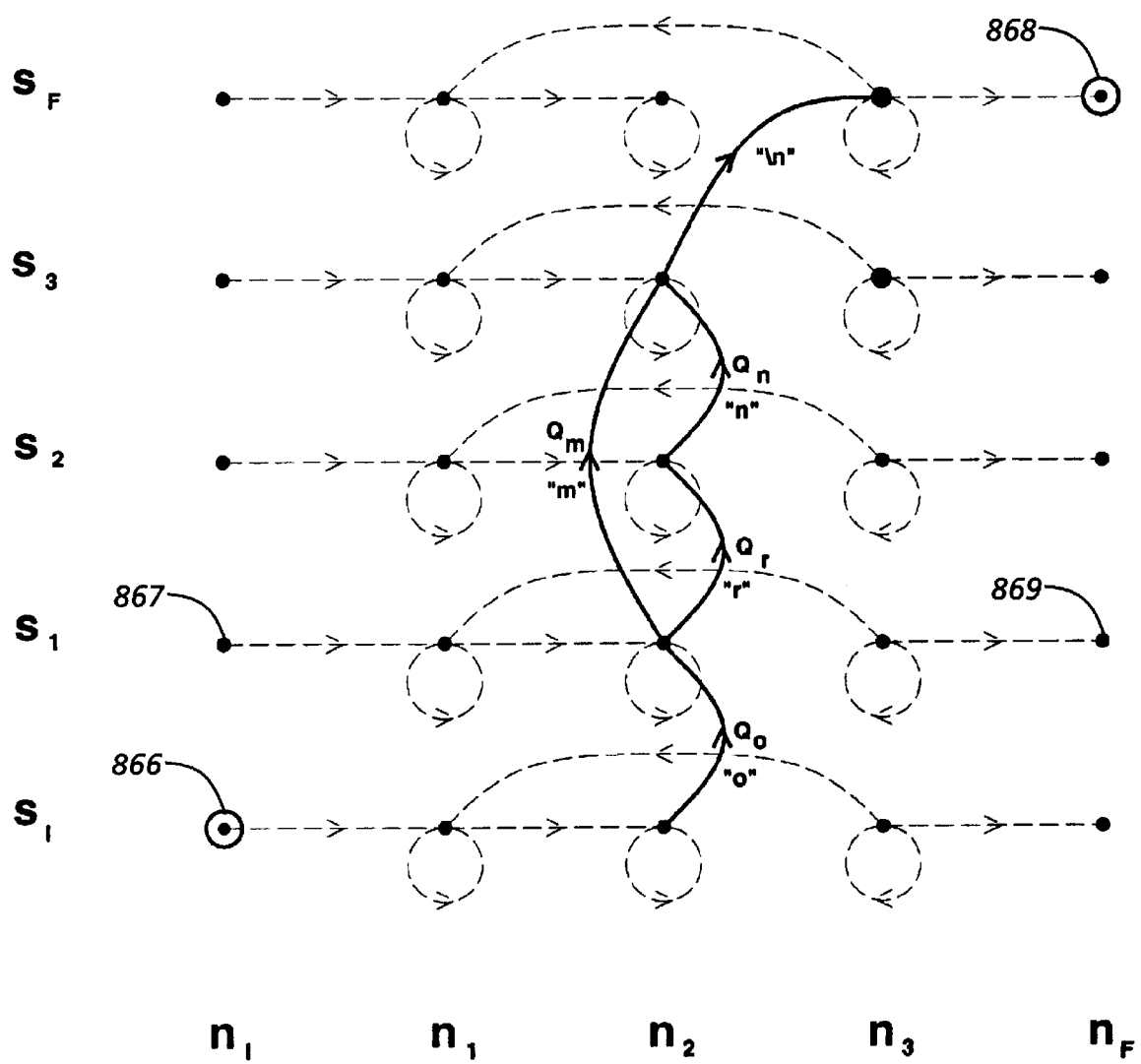
Figure 13:
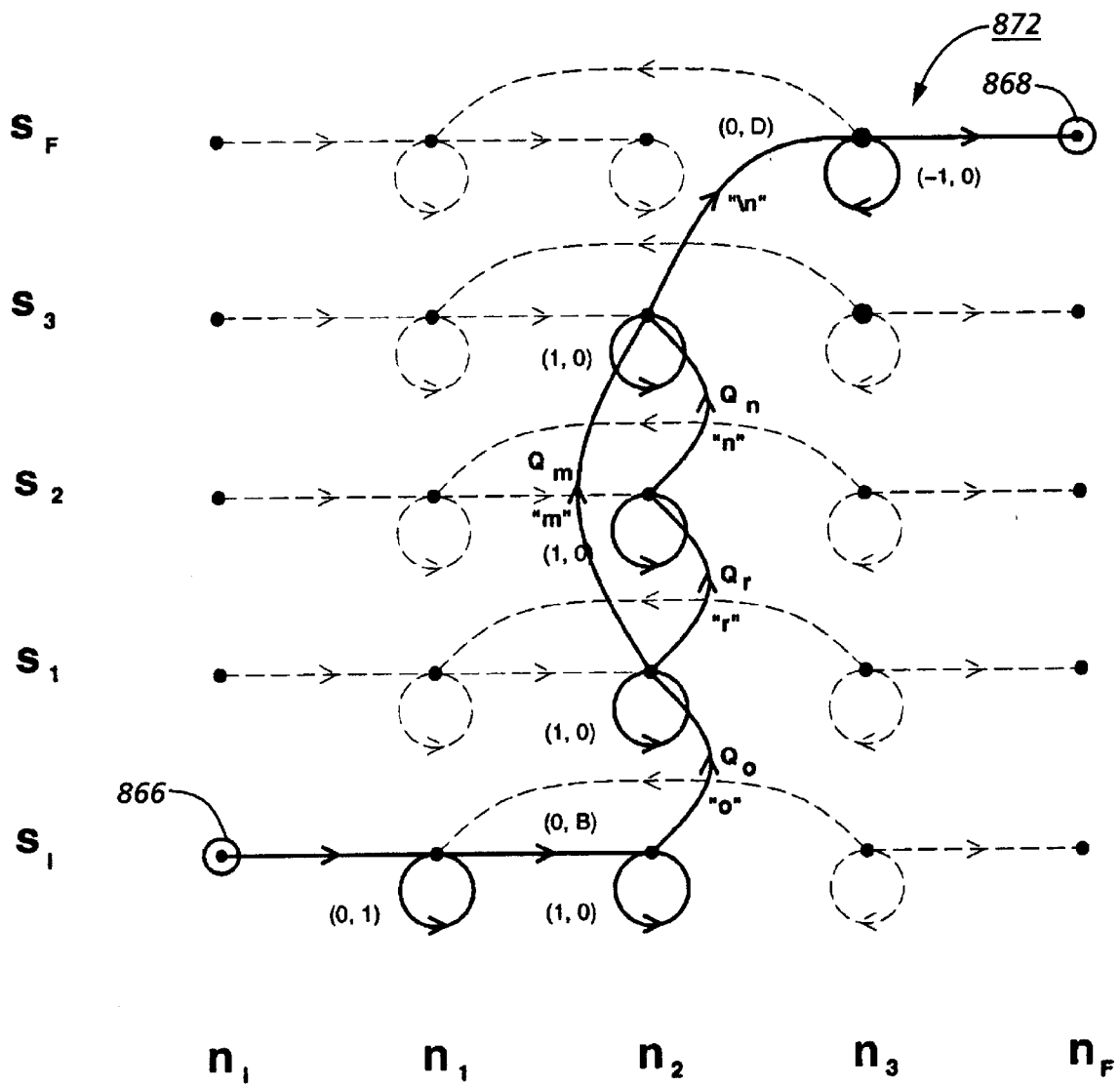
Figure 14:
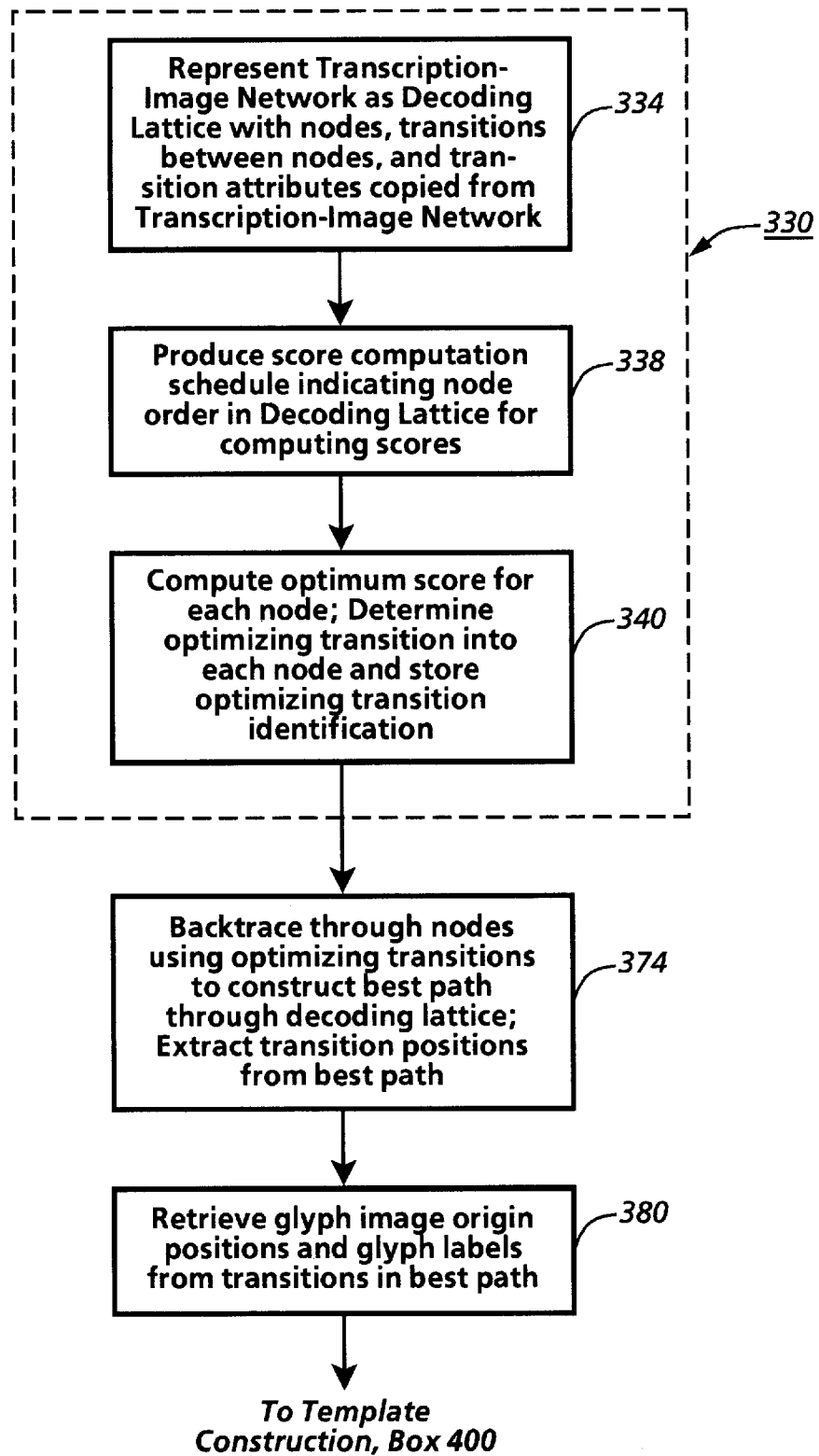
FIG. 14 is a flow chart illustrating the decoding step in the block diagram of FIG. 6 as a Viterbi decoder, according to the illustrated implementation of the present invention.

For simplicity in illustration, the construction of only a portion of transcription-image network 870, which will be designated as transcription-image network 872, is schematically illustrated in FIGS. 10,11, 12 and 13 using image source model 830 of FIG. 8 for the simple text column and transcription network 882 shown in FIG. 9. FIG. 10 illustrates the nodes of the transcription-image network constructed by network merge process 320 as dots or points in a two-dimensional (2D) lattice 860, with image source model nodes 862 positioned horizontally and transcription network nodes 864 positioned vertically in 2D lattice 860. The lattice points 866 and 868 for the initial state $(n_I, s_I)$ and the final state $(n_F, s_F)$, respectively, are each represented by a circle around a dot. FIG. 11 shows the transcription-image network after constructing transitions in the transcription-image network according to step (1) of the above procedure. For simplicity, transition probabilities are not shown. FIG. 12 shows the transitions of FIG. 11 added in step (1) of the network merge process as dotted lines, and shows the transitions that are added to the transcription-image network in step (2) of the above procedure in solid lines. Again, transition probabilities and displacements are not shown. Because transcription network 882 in FIG. 9 contains no transitions with empty message strings, step (3) of the above procedure for constructing transitions is not applied in this example.

During the decoding step 330 of FIG. 6 (described below), the decoder finds the best complete path through the transcription-image network, i.e., a path from initial state 866 to the final state 868. It is clear from FIG. 12 that some of the nodes in the combined transcription-image network cannot possibly lie on a complete path, since either there is no way to reach them from start node 866 or no way to reach final node 868 from them. For example, there is no path from the start node 866 to node 867, $(n_I, s_I)$. Similarly, there is no path from node 869, $(n_F, s_1)$, to final node 868. Any node that cannot lie on a complete path may be deleted from the combined transcription-image network prior to its use in decoding, as can all transitions that enter or leave a deleted node. FIG. 13 depicts combined transcription-image network 872 after this simplification is performed. Note that this simplified, or merged, network contains significantly fewer states and transitions than the combined transcription-image network of FIG. 12. Thus, network simplification after merging typically leads to faster decoding of the input source of glyph samples.

5. Decoding the text image using the transcription-image network to produce labeled glyph sample image origin positions.

Decoding process 330 (FIG. 6) may be accomplished using any type of software- or hardware-implemented decoder suitable for decoding 2D image 10 using the merged transcription-image network to produce the labeled glyph image origin positions indicating the glyph samples in 2D image 10. In particular, a decoder based on a dynamic programming algorithm that minimizes the probability of error between the original input 2D image and a target ideal 2D image, $Q_\pi$, is likely to be the most appropriate decoding process to use for a particular implementation. More information on suitable decoding processes is available in the earlier referenced Chou and Kopec, "A stochastic attribute grammar model."

In general, a decoding process of the type suitable for use in the present invention will identify some or all of the complete transcription-image paths through the transcription-image network, each of which indicates a target ideal 2D image, $Q_\pi$, and will determine which one of the identified paths is the best path, by determining which target ideal 2D image best matches the text image according to a defined matching criterion. The best path through the network is the transcription-image path that indicates the best matched target ideal 2D image; transition image origin positions in the text image can be computed from the transitions that make up this best path, and glyph image origin positions and their labels are available, in turn, from selected ones of the transitions and their transition image origin positions. The matching criterion may be any suitable image measurement; typically, the matching criterion will involve optimizing a pixel match score for the target ideal image compared to the text image.

Decoding process 330 requires an initial set of character templates and respective character label data items to produce the labeled glyph image origin positions 390 that comprise the training data for template construction technique 400 (FIG. 6). An initial set of character templates having arbitrary pixel content is generated prior to decoding if no initial set of character templates is available. In the illustrated embodiment, each character template in this initial set is represented as a black rectangle. Each initial character template must have a set of font metrics established for it in order to completely describe it for the decoding process. In particular, since the illustrated embodiment uses the sidebearing model of letterform shape description and positioning as its template model, the value of the character set width must be initialized so that values for displacements associated with transitions that include templates can be established. While the content of the initial set of character templates may be arbitrary, the default size of each black rectangle, which is necessarily related to the template's set width, is not arbitrary and must be carefully considered, since during decoding, these initial templates are imaged in the image plane according to the displacements on the transitions. The size of each template is typically determined using information available about the sizes of the characters in the font for which templates are being trained. Experience with template training according to the illustrated implementation shows that each initial template should have a default set width established that is smaller than the true set width for the corresponding character, and that the set width include a minimum space allowed between characters in an image. The default set width should be (1) small enough to permit templates to be placed close enough together to match an actual input 2D image, and (2) large enough to satisfy a "template disjointness constraint," which is described below in connection with the actual construction of the character templates. The number of templates in the initial set of character templates generated by the technique may be arbitrary, but, in practice, the number of initial templates generated should be related to the total number of characters in the character set being trained. Information about the number of initial character templates needed may be available from examining the transcription data structure. An existing set of character templates, when available, may also be provided as the initial set of templates.

Decoding process 330 in the illustrated implementation is accomplished using a Viterbi decoder, described in detail in Kopec and Chou, "Document Image Decoding," and in U.S. Pat. No. 5,321,773. The Viterbi decoder finds the maximum a posteriori (MAP) path through the transcription-image network, using the assumed asymmetric bit flip channel model, also described in Kopec and Chou, "Document Image Decoding," and shown in FIG. 5 therein. The purpose of the Viterbi decoder is to maximize a recursive MAP decision function over all complete paths through the transcription-image network in order to determine the most likely path through the network. As noted above in the discussion of decoding using image source model 830, each complete path through the transcription-image network corresponds to an ideal image produced during decoding. Thus, the Viterbi decoder determines which ideal image, of the possible ideal images produced from complete paths through the network, is closest in appearance (by pixels) to the input image being decoded, i.e., 2D image 10. It does this by computing a likelihood measurement, or likelihood score, for a path defining an ideal image that is the summation of scores for individual transitions in the path. The general operation of the Viterbi decoder is discussed next; the references cited above should be consulted for the mathematical foundation of decoding process 330 and for additional details about the process.

With reference now to FIG. 14, Viterbi image decoding involves path finding in a three-dimensional decoding lattice, also called a decoding trellis. The decoding lattice is composed of nodes that may be viewed as forming a stack of image planes, one for each node or state of the source model. There is a one-to-one correspondence between paths in the transcription-image network and paths in the lattice, and corresponding transitions between nodes in the lattice have the same attribute information as transitions between states in the transcription-image network. Thus, in step 334, transcription-image network 870 is first represented in a data structure as the decoding lattice. Next, in box 338, the order in which scores for the nodes in the lattice are to be computed must be determined; this is accomplished by producing a score computation schedule for the recursion, indicating in which order the nodes of the lattice are to be visited and consequently, in which order the node scores are to be computed. Then, the maximum likelihood scores for each node, in the order prescribed by the schedule, are computed, in box 340. For each node, the transition into that node that maximizes the likelihood score is identified and stored. The steps of decoding process 330 have been illustrated as being performed in a particular sequence for purposes of describing the functions that are performed during decoding according to the illustrated implementation; they may be, and usually are, performed contemporaneously in an actual software implementation.

At the conclusion of decoding, after the likelihood score for the $n_F$ image plane in the decoding lattice has been computed, the most likely complete path found by the Viterbi decoder is retrieved, in box 374, by backtracing through the stored transitions from the final node to the initial node in the decoding lattice to identify the transitions that compose the best path, and to compute the transition image origin positions $(x_i, t_i)$ in 2D image 10 using equations (5) and (6) above. Each transition of the best path defines one transition image origin position. However, not all of these image positions in 2D image 10 are of interest; a filtering step 380 identifies the transitions that indicate estimated glyph image origin positions in 2D image 10 (i.e., the transitions that include as attributes non-null character templates for characters in the input image character set), extracts these image origin positions from all of the identified transition image origin positions, and pairs these image origin positions with the respective character label of the template attribute on each of the identified transitions.

Decoding provides an estimate of the image origin position of a glyph sample in 2D image 10, but does not provide information about the extent or size of the glyph sample in the image. The image origin positions are considered to be estimates of positions of glyph samples in the input image because decoding may produce imperfect results such as, for example, when an errorful transcription or a noisy 2D image 10 is provided as an input.

6. Template construction from training data composed of labeled glyph sample image origin positions.

Figure 15:
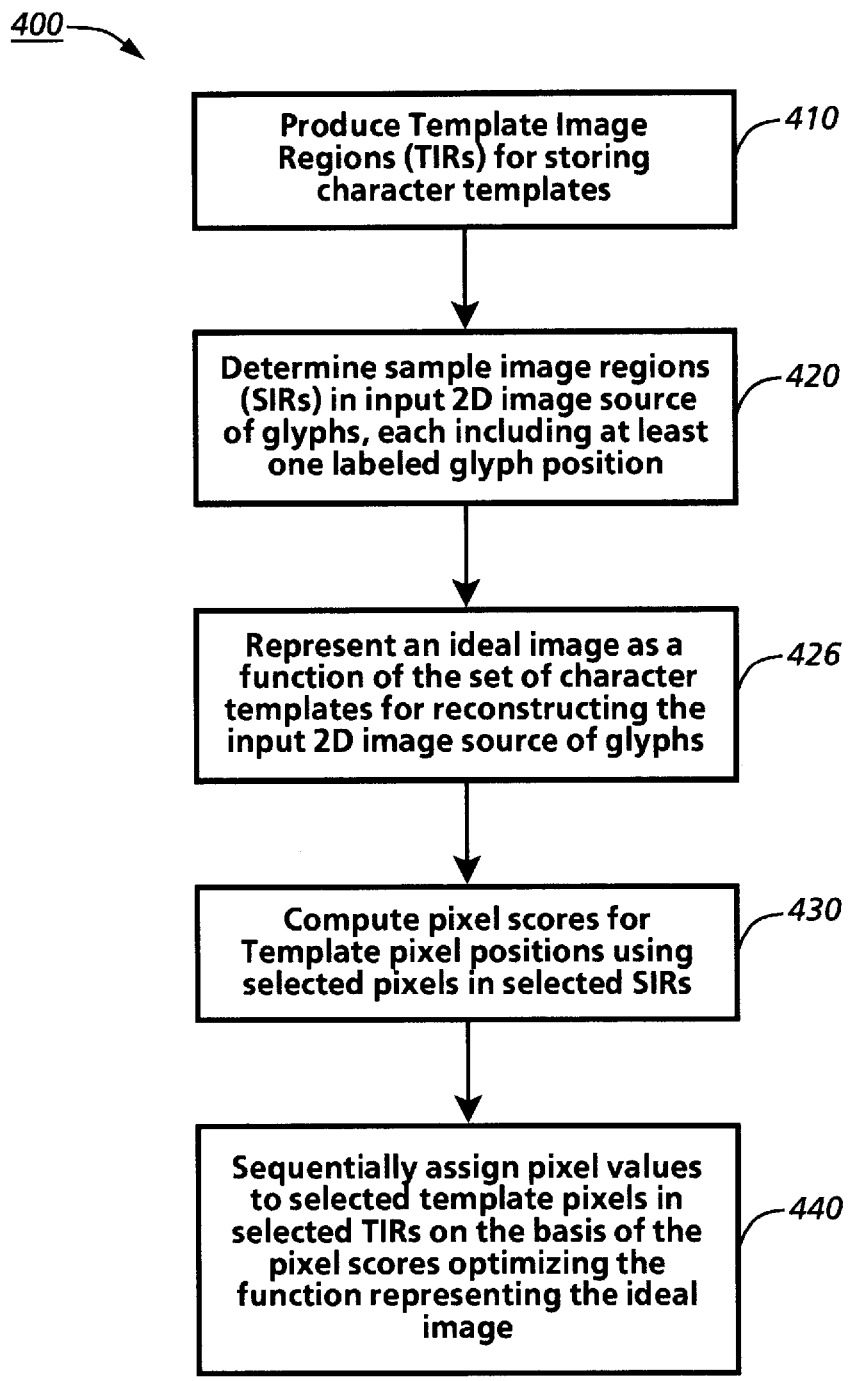
FIG. 15 illustrates the general steps of the template construction technique to produce trained character templates that are used to modify the image source model according to the present invention.
Figure 16:
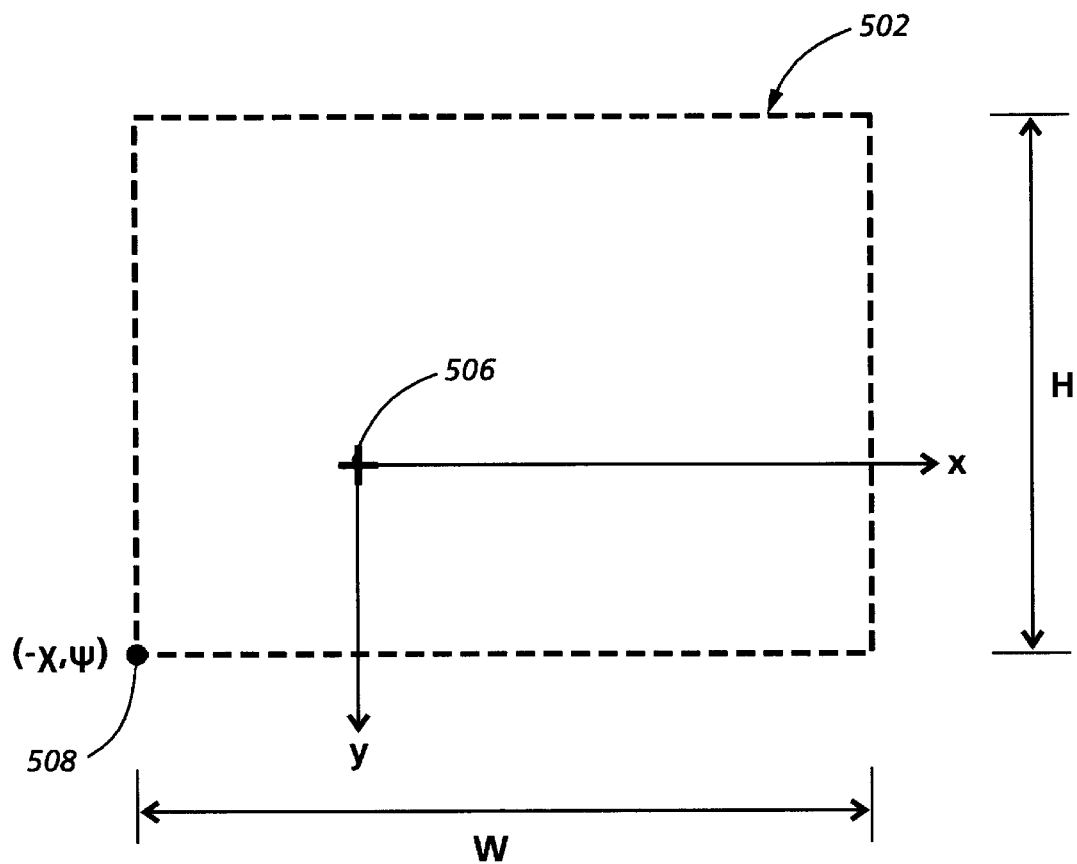
FIG. 16 illustrates the concept of a template image region used for storing a trained template during the template construction technique illustrated in FIGS. 15 and 22.
Figure 17:
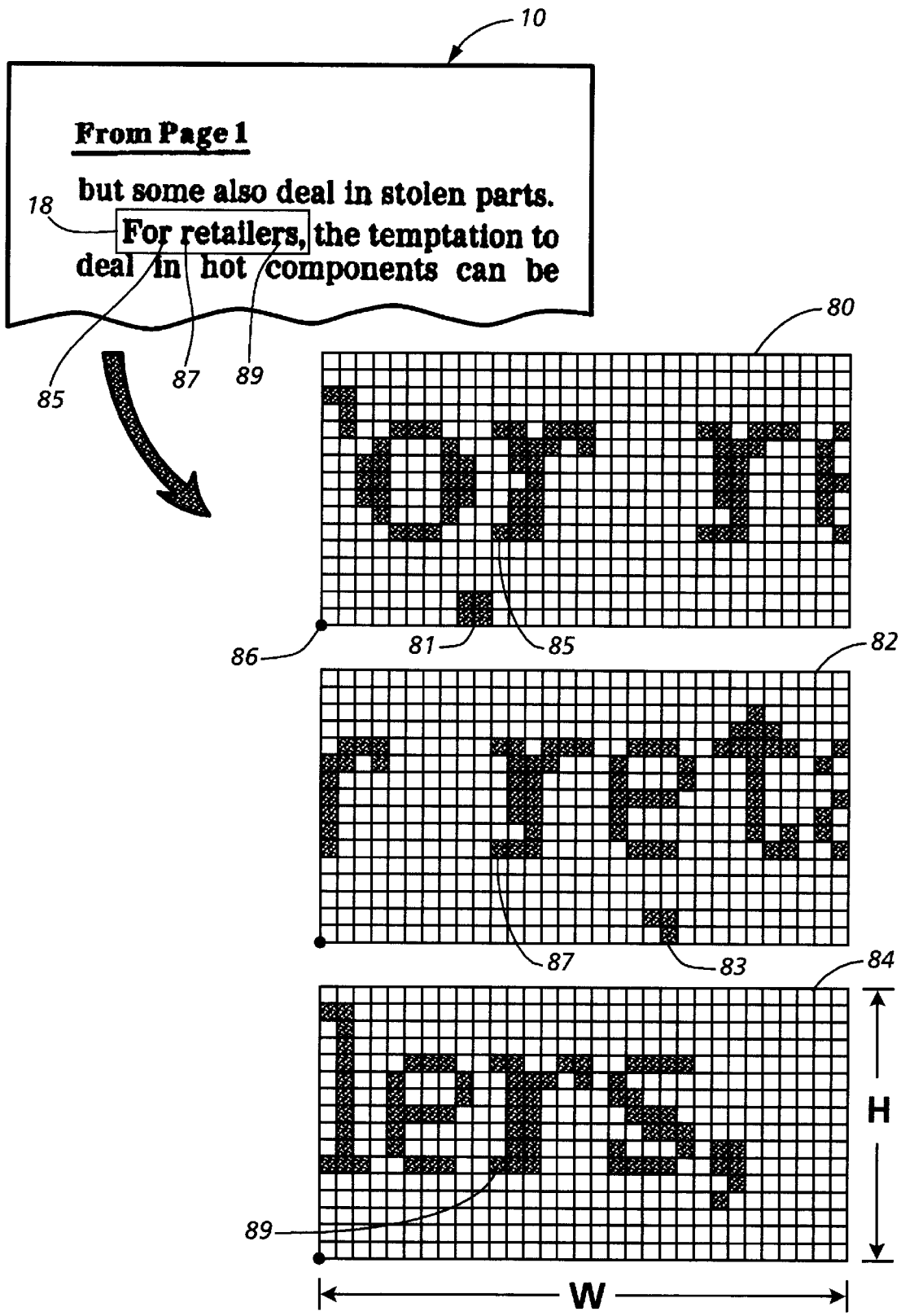
FIG. 17 illustrates the sample image regions that are identified in the 2D image of FIG. 1 from which character templates are trained according to the template construction technique illustrated in FIGS. 15 and 22.
Figure 18:
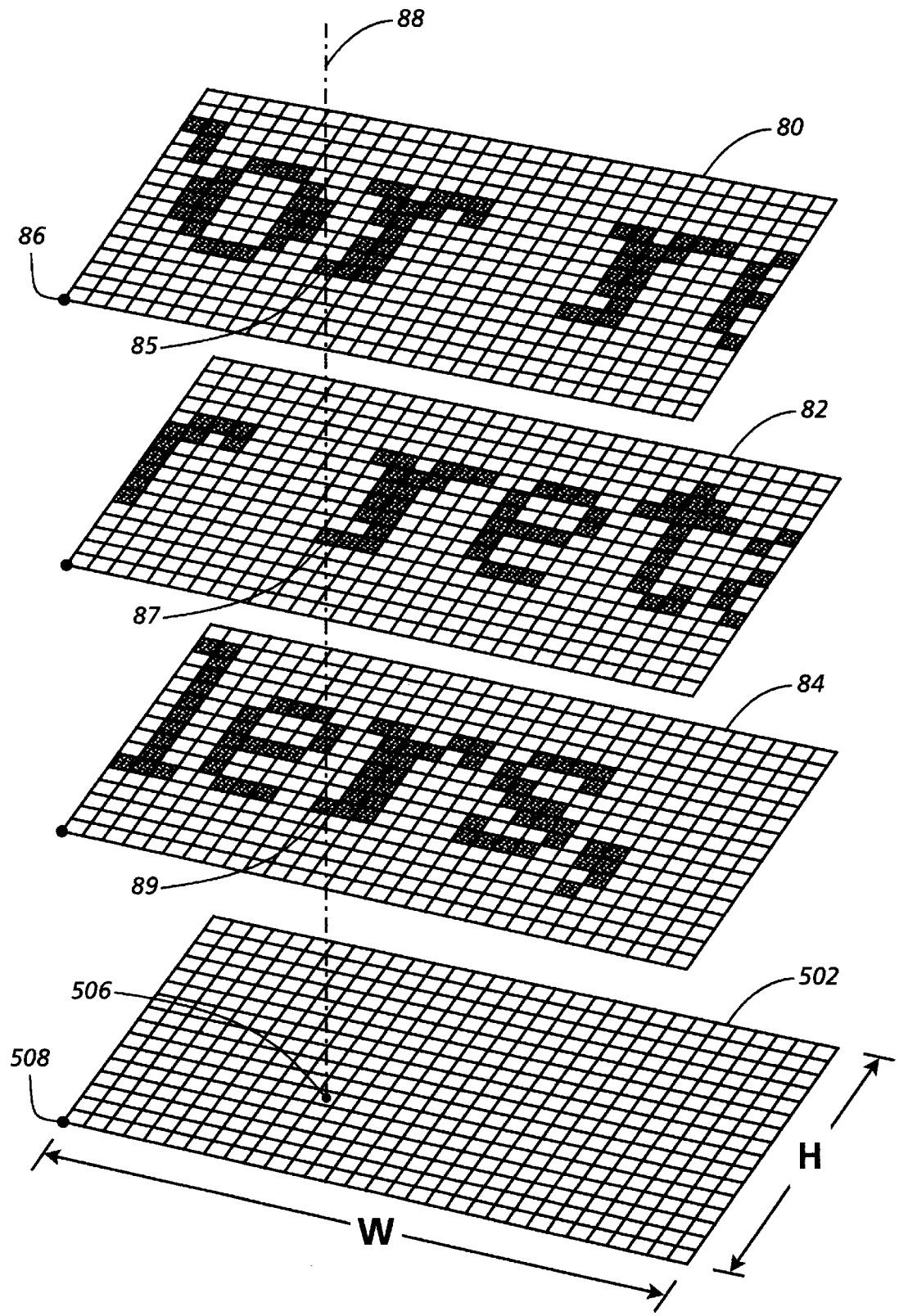
FIG. 18 is a schematic image of three sample image regions of the 2D image of FIG. 1, layered above the template image region of FIG. 16, illustrating the concept of sample image regions aligned at image origin positions of the glyph samples, according to the illustrated implementation of template construction shown in FIG. 22.
Figure 19:
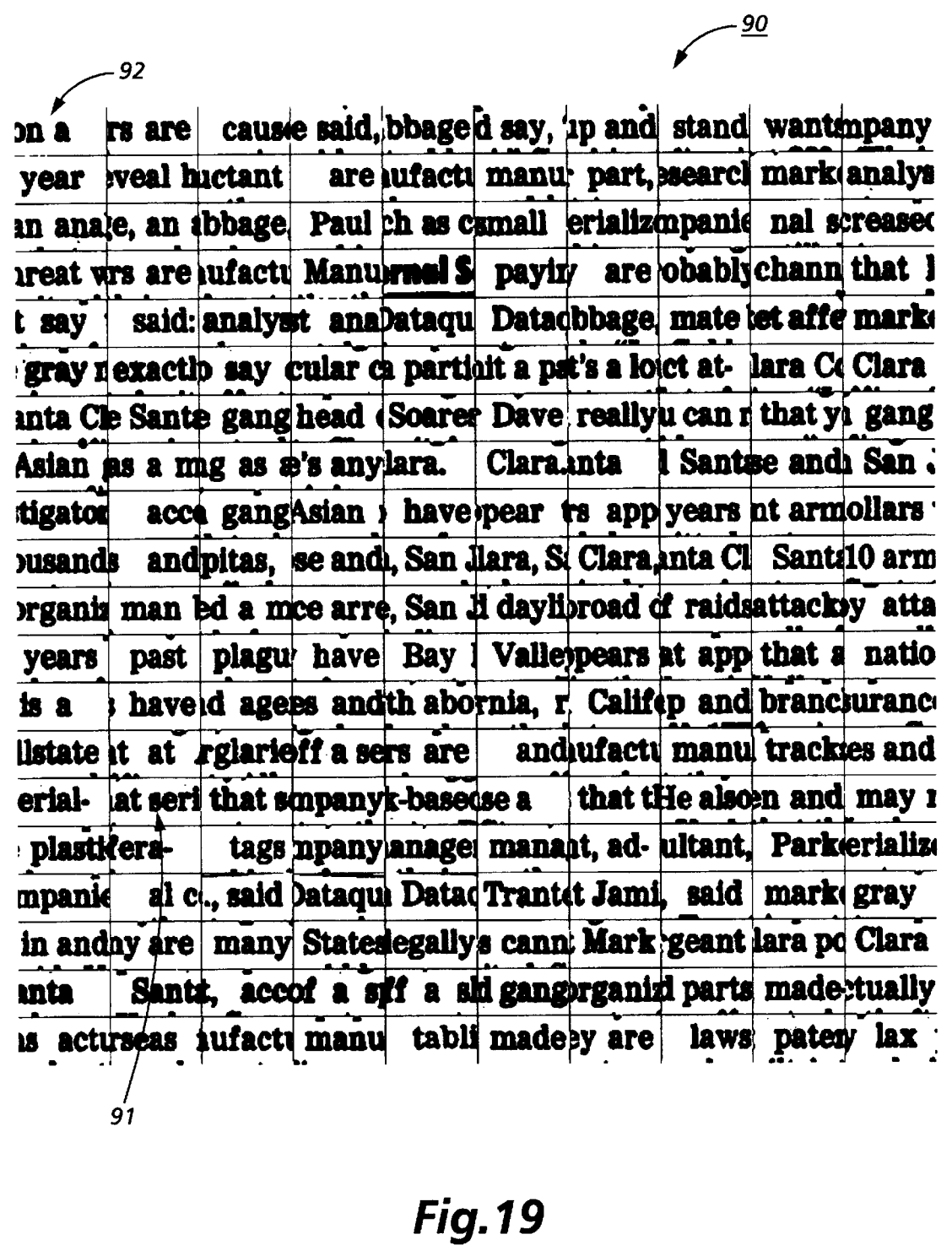
Figure 20:
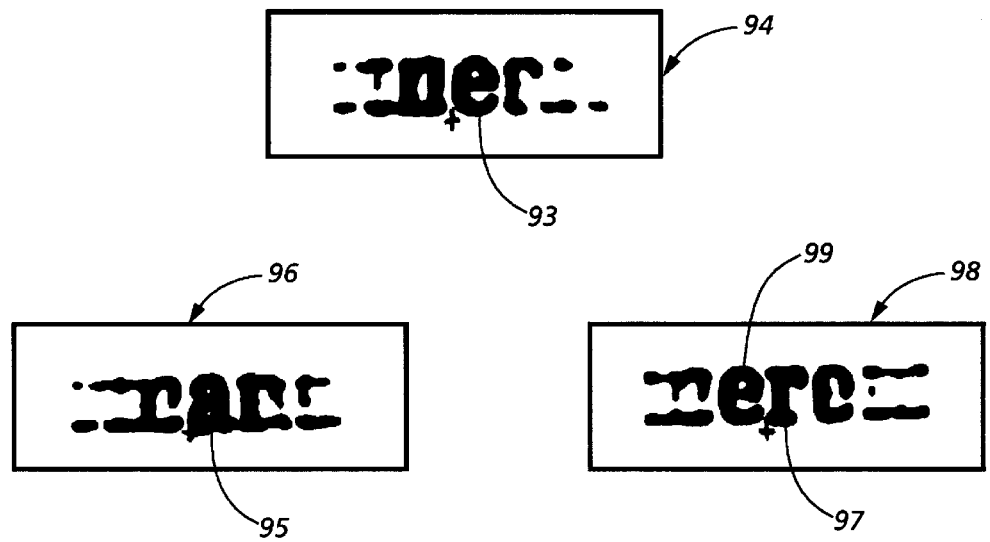
FIG. 20 shows three example of unsatisfactory templates produced using a technique that does not observe an important mathematical constraint imposed on character templates.
Figure 21:
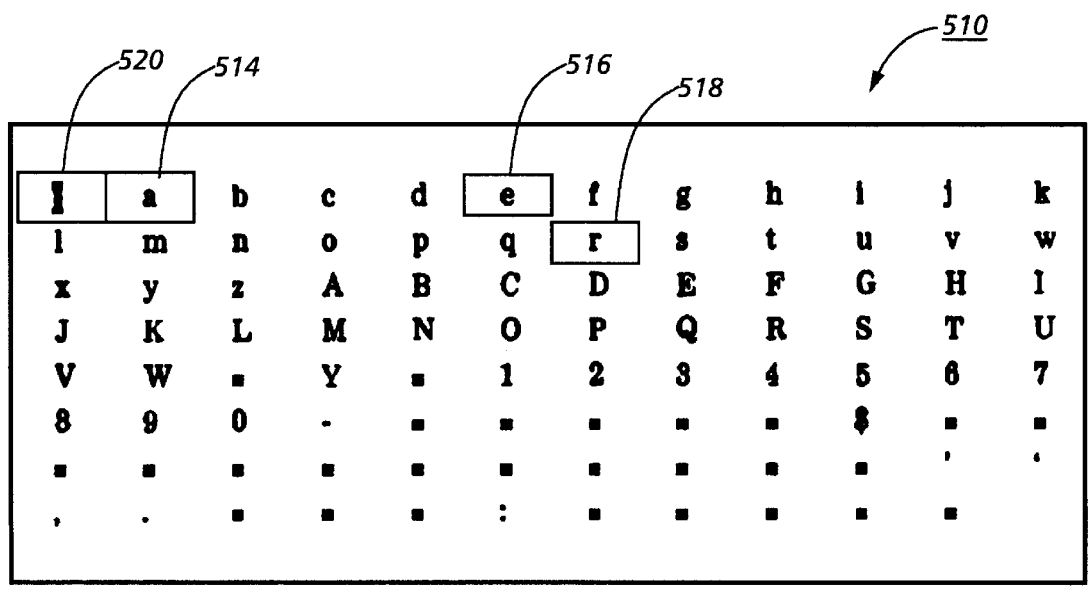
FIG. 21 shows a final set of trained templates produced according to the template construction technique illustrated in the flowchart of FIG. 22.
Figure 22:
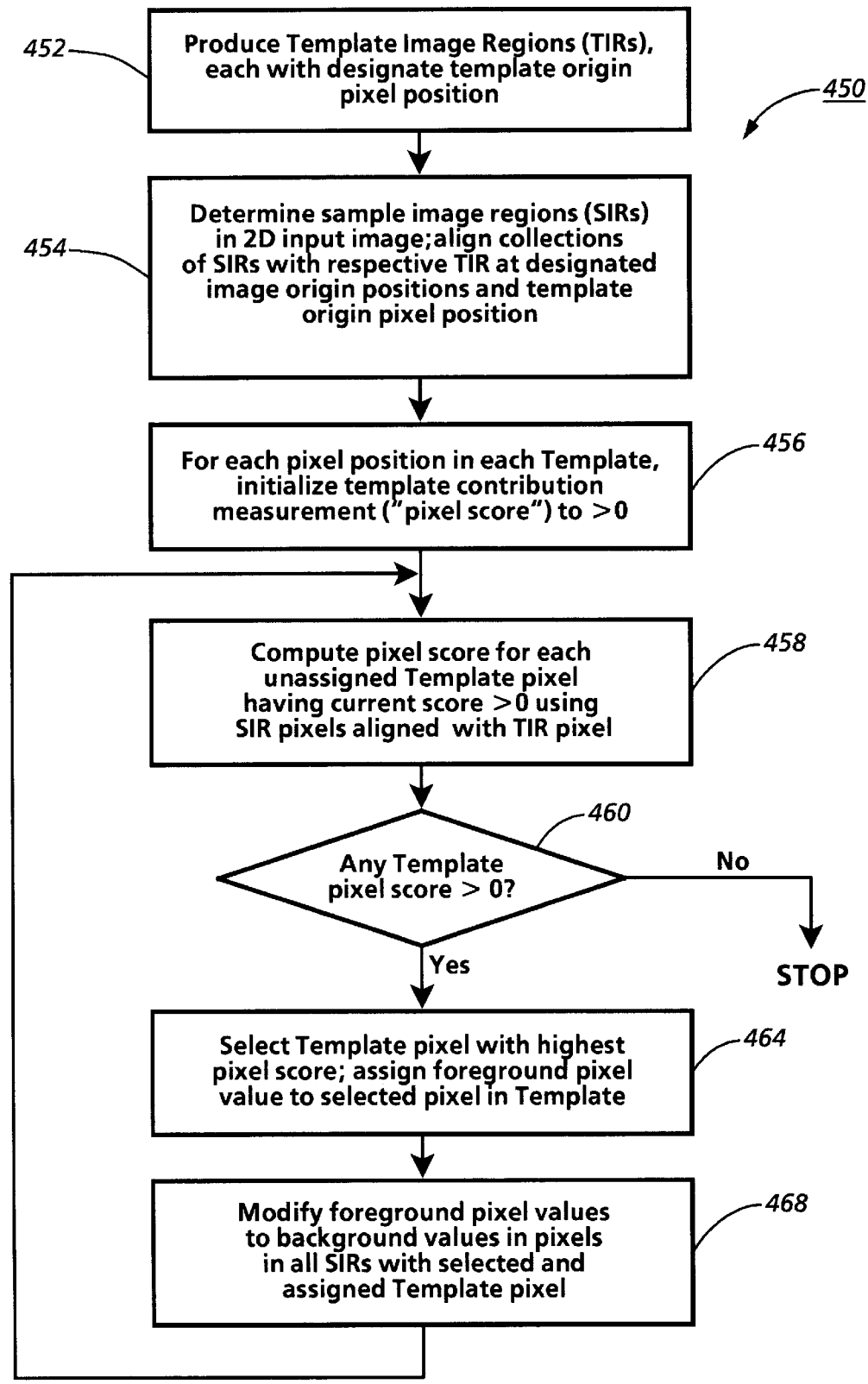
FIG. 22 is a flow chart illustrating the steps for contemporaneously constructing all of the character templates using template image regions of FIG. 16 and aligned sample image regions of FIG. 17 and FIG. 18.

Character template construction process 400 in FIG. 6 produces a set of trained, labeled character templates without prior segmentation of the training data into isolated glyph samples and without identifying bounding boxes for the samples. Template construction technique 400 identifies each glyph sample in the training data using only the x,y coordinate position in 2D image source of glyphs 10 indicating an image origin position and the label identifying the character represented by the glyph sample located at the respective image origin position. FIGS. 15 through 22 illustrate the template construction technique of the present invention. FIG. 15 illustrates the general steps of the template construction technique. FIG. 16 illustrates the concept of a template image region used for storing a trained template, while FIG. 17 illustrates the sample image regions that are identified in the text image from which the templates are trained. FIG. 18 illustrates the concept of aligning the sample image regions at respective image origin positions, and shows the pixel relationships between aligned sample image regions and a template image region. FIG. 19 shows a collection of sample image regions clipped from the 2D input image for use in training a template. FIG. 20 shows three examples of unsatisfactory templates produced using a technique that does not observe an important mathematical constraint imposed on character templates, while FIG. 21 shows a final set of trained templates produced according to the illustrated implementation of the template construction technique as shown in FIG. 22 that substantially observes the template constraint.

a. Overview of template construction.

FIG. 15 illustrates the general steps of template construction, while FIG. 22 illustrates the specific steps of the illustrated embodiment. With respect to FIG. 15, template image regions are created for storing the character templates, in box 410. Then, sample image regions in image 10 are determined, in box 420, using the labeled glyph position pairs 390. The process of producing the templates is shown in boxes 426, 430, and 440. This process mathematically models the template construction problem as an optimization problem. An ideal image is represented, in box 426, as a function of the set of character templates being constructed. The ideal image is a reconstruction of image 10 formed by positioning respective ones of the character templates in an image plane at image pixel positions identified as image glyph source locations of glyphs occurring in image 10, toward the goal of matching image 10. A character template is identified for positioning in the ideal image by the glyph label paired with the image glyph source location. Pixel scores are then computed, in box 430, for template pixel positions in template image regions using selected ones of the sample pixel positions in selected ones of the sample image regions included in image 10. The pixel scores are used, in box 440, to select and sequentially assign a pixel value to selected template pixel positions in selected template image region. The selected template pixel positions are selected on the basis of the pixel scores optimizing the function representing the ideal image such that the pixel value assigned to each selected template pixel position optimizes a matching score measuring the match between image 10 and the ideal image when all template pixel positions have been assigned pixel values. The mathematical model of the template construction problem is presented in detail in section C.6.d below. As will become clear from the discussion of the mathematical model below, representing an ideal image as a function of the set of character templates is a mathematically principled way of presenting the template construction problem. In particular implementations of template construction technique 400, an actual ideal image may or may not be constructed in the memory device of the machine being operated by the invention. If a particular implementation does not actually construct an ideal image, it is typically because of processing efficiency considerations or a design choice in the algorithms that implement the mathematical model, and this is not a departure from the mathematical model or from the general scope of the intended construction process.

b. Creating template image regions for storing templates.

With reference to the flowchart of FIG. 22 showing the illustrated implementation 450 of template construction, the first step is to create a template image region, in box 452, for storing each binary character template to be produced from the training data. Each pixel position in each template image region initially indicates a background pixel color value. In principle, the template image region for each character extends over an entire image plane that is unbounded in all directions. However, the support of a template is typically localized to a relatively small region surrounding the template's origin pixel location so that the template image region is selected to be some bounded image region smaller than the entire image plane, but large enough to contain the entire support of a template. FIG. 16 illustrates exemplary template image region 502 which assumes that the support of each template $Q_t$ lies within a rectangle of height H and width W. Template image region 502 will also be referred to as the "canvas" of the template. The shape of the template canvas is fundamentally arbitrary, and is typically selected on the basis of assumptions about the character set for which templates are being trained, and about the samples in the training data. For example, the use of a rectangle having a width greater than its height as the shape for the canvas in this illustrated implementation is based on the fact that images of characters in the English language character set are placed along horizontal text lines that are divided by horizontal areas of white space. In addition, the canvas shape may also be selected or modified for purposes of optimizing the performance of the template construction procedure.

The selection of the vertical and horizontal size dimensions of the canvas, i.e. the height H and width W canvas parameters, is made on the basis of two factors that make use of information about the characters in the character set being trained. First, H and W canvas parameters are selected so that the resulting image region created is large enough to entirely contain the support of a single template; in effect, selection of the H and W canvas parameters reflects the decision that pixels outside the canvas are assumed not to be part of the template and are assumed to be the background (white) color. Secondly, as will be discussed shortly, the canvas is used to establish regions of the 2D image in which glyph samples are assumed to be contained; therefore, selection of the H and W canvas parameters is also made so that the resulting image region created in the 2D input image is large enough to entirely contain at least a single glyph sample. Moreover, the canvas should be large enough to completely contain at least a single glyph even when the glyph origins are inaccurately determined during the previously described decoding process.

While it might appear that the canvas image area is somewhat similar to the concept of a bounding box because it establishes an image boundary within which it is assumed that a template or glyph sample is entirely contained, such an image boundary is only very roughly defined and the defined region is not a minimal one. Selection of the canvas shape and size is not made with the same intent with which bounding boxes for glyph samples are found in conventional segmentation processes; the goal of such segmentation is typically to find precise and minimal image dimensions for use in assigning pixels to one glyph sample as opposed to another, while the goal of the canvas rectangle is to find an image region for which it can be said that all pixels outside the canvas rectangle are not included in the template or glyph sample, a concept clearly distinguishable from a bounding box. In addition, the template construction procedure may provide for the user of the training system to enter the H and W canvas parameters as an input into the procedure. In the illustrated embodiment, the template construction procedure has been implemented using a template canvas selected to be from three to five times the size of the largest template bounding box for the characters in the character set being trained.

With continued reference to FIG. 16, template canvas 502 has a local coordinate system associated with it in which x increases to the right, y increases downward, and the origin 506 of the coordinate system is at (X, −Ψ) relative to the lower left corner 508 of canvas 502; thus lower left corner 508 of canvas 502 has coordinates at (−X, Ψ) relative to the local coordinate system, where $0 \leq_x < W$ and $0 \leq \Psi < H$. The canvas rectangle 502 is denoted by C, so that $$C = [-x, -x+W-1] \times [\Psi-H+1, \Psi] \quad (12)$$

Canvas parameters H, W, X and Ψ need not be uniform for all templates, and may vary by the particular character template being stored; it is usually more convenient to use the same canvas parameters for each template being trained. The template image regions in the illustrated embodiment have uniform canvas parameters.

Each character template includes a pixel position designated as the template's origin that is assumed to lie within canvas 502. The template origin pixel position is illustrated in FIG. 16 as template origin 506. Designation of template origin 506 within canvas rectangle 502 is arbitrary, subject to the constraint that the template to be stored in canvas rectangle 502 must be entirely contained within canvas rectangle 502 when its origin is placed at selected template origin 506. In the illustrated embodiment, satisfactory results have been achieved when template origin 506 is designated to be a pixel position to the left of and below a center pixel position in canvas rectangle 502.

C. Identifying sample image regions in the 2D input image.

With reference again to FIG. 22, the next step in template construction 400, in box 454, is to determine a sample image region in the 2D image source of glyphs 10 for each labeled glyph image origin position included in the training data produced as the output of the network merging and decoding processes described above. In theory, the sample image region could be defined to be the entire 2D image 10. However, in practice, it is more efficient to work with a smaller, bounded image region within 2D image 10. Template image region 502 is used as a pattern, or guide, in determining two important characteristics of each of these sample image regions: first, the sample image region in 2D image 10 for each labeled glyph image origin position in the training data has vertical and horizontal size dimensions identical to the vertical and horizontal size dimensions (the H and W canvas parameters) of canvas rectangle 502; secondly, the glyph image origin position of the glyph sample is located in the sample image region at a pixel position that is coincident with, or respectively paired with, the pixel position in canvas rectangle 502 designated as template origin position 506. The result of identifying the sample image regions in this manner is to produce a collection of sample image regions in 2D image 10 for each unique character identified by the glyph labels associated with glyph image origin positions in the training data.

FIG. 17 illustrates three sample image regions 80, 82 and 84 identified for glyph image origin positions 85, 87 and 89 in image region 18 of 2D image 10, each having a glyph label indicating the character "r." Each sample image region has the same height, H, and width, W, of canvas rectangle 502, shown by the H and W designations at the periphery of sample image region 84. Each sample image region has a local coordinate system having its origin aligned at the glyph image origin position, as illustrated in FIG. 17 by origin 85 of representative sample image region 80. Glyph image origin positions 85, 87 and 89 are located at pixel positions in sample image regions 80, 82 and 84 that have x and y displacements from the respective lower left corners of the sample image regions identical to the x and y displacements of template origin 506 from the lower left corner 508 of template canvas rectangle 502. It can be seen that the H and W canvas parameters of canvas rectangle 502 have been selected to be large enough to entirely contain the simplified glyph samples for the character "r," and in fact are large enough to contain all or portions of adjacent glyph samples. Sample image regions 80 and 82 also contain portions 81 and 83 of glyph samples occurring in an adjacent line of text in 2D image 10. It can also be seen that sample image regions 80, 82 and 84 are probably large enough to entirely contain the glyph samples for the character "r" even if glyph image origin positions had been inaccurately determined by several pixel positions in either the vertical or horizontal direction.

Identifying the sample image region for a labeled glyph image origin position can be summarized as follows: if vector $x_i = (x_i, y_i)$ is a glyph origin position within an image of text, the corresponding glyph sample image region is defined to be that portion of the text image within the region defined by $x_i - X \leq x < x_i - X + W$ and $y_i + \Psi - H < y \leq y_i + \Psi$. That is, the glyph sample image for a glyph position is that portion of the text image within the template canvas, when the template origin is coincident with the glyph origin.

Identifying glyph samples in 2D image 10 in this manner effectively accomplishes a partial segmentation and isolation of the glyph samples without performing a conventional segmentation process on 2D image 10. This type of partial segmentation reduces the processing needed to produce templates from samples that are the size of the entire 2D image, but because a sample image region is typically much larger than a bounding box that would contain the actual sample, this technique of partially segmenting the glyph samples is unlikely to introduce segmentation errors of the type introduced in conventional segmentation when pixels are assigned to one glyph sample as opposed to another. No such pixel assignments have been made at this point in the template construction procedure; identification of the sample image regions merely reflects the partial segmentation decision that all pixels outside each sample image region are not included in the glyph sample contained within the sample image region.

The term "aligned sample image regions" is introduced to denote the characteristic of each sample image region of the image origin position of the glyph sample being located at a pixel position in the sample image region that has x and y displacements from the lower left corner of the sample image region identical to the x and y displacements of the template image origin 506 from lower left corner 508 of template canvas rectangle 502. The concept of aligned sample image regions is illustrated in FIG. 18 which shows sample image regions 80, 82 and 84 of 2D image 10 from FIG. 17 stacked in layers, one on top of another, above canvas rectangle 502. Respective image origin positions 85, 87 and 89 of sample image regions 80, 82 and 84 are "vertically" aligned with each other, and with template origin position 506, along dotted line axis 88. Alignment of same-sized sample image regions at respective image origin positions in this manner establishes a spatial relationship, or pairing, among each respective pixel location in each of the sample image regions relative to the local coordinate system of the sample image region, and establishes the same spatial relationship, or pairing, between the set of paired pixel locations in the collection of sample image regions and a pixel position in canvas rectangle 502 relative to the template coordinate system. Each set of pixels in aligned sample image regions related in this manner will be referred to as "respectively paired pixels" or "aligned pixels." All of the sample image regions identified in 2D image 10 for a particular one of the characters in the character set for which templates are being trained are referred to as a "collection" of sample image regions. In the illustrated implementation, the collection of sample image regions is represented in a separate data structure of sample image regions that are aligned with each other and with template image region 502 at the image origin position. FIG. 19 illustrates data structure 90 that is the collection of sample image regions for the character "a" in the entire scanned newspaper article that is the image represented by 2D image 10. Data structure 90 is presented in FIG. 19 in rows and columns of concatenated, aligned sample image regions clipped from 2D image 10 according to the pattern provided by canvas rectangle 502; the sample image regions are shown with borders for purposes of illustration. Looking down column 92 of sample image regions, it can be seen that glyph samples of the character "a" are located at approximately the same position in each sample, which is coincident with the template origin position of the template canvas (not shown) for character "a." As FIG. 19 illustrates, a sample image region typically contains glyphs and/or parts of glyphs in addition to the glyph sample located at the template origin. Sample image region 91 has been identified to illustrate a mislabeled sample. It can be seen that as a result of the decoding operation, the label "a" has been given to an image origin position for a glyph that appears to be the character "s" in 2D image 10.

c. The mathematical model of template construction.

Conventional character template construction techniques are concerned with assigning a color to each pixel of a template, given a set of isolated glyph samples for the character associated with that template, and require that the assignment of input image pixels to appropriate glyph samples be completed prior to template construction, as part of a character segmentation operation that creates isolated glyph samples. By contrast, template construction procedure 400 constructs a set of character templates substantially contemporaneously by assigning a color to each pixel in a set of character templates, given a collection of glyph sample images for each of those characters, each of which is permitted to contain whole or parts of adjacent glyphs, as illustrated in FIG. 19. The terms "substantially contemporaneously" mean that the construction of no one character template is effectively completed before any of the others, as will become clear from the description which follows. The mathematical foundation for the template construction procedure proceeds as follows. The reader is reminded that the symbol x is used to denote a vector x and that an equation previously defined in the discussion is subsequently referenced by its equation number in parentheses. Recall also that C denotes a template canvas defined according to equation (12).

Let $q_t(x)$ denote the color of the pixel at position x of template $Q_t$, where t∈B is a transition of the Markov image source. A foreground pixel color is represented by a bit value of 1 (one), and a background pixel color by a bit value of 0 (zero). The objective of template construction is to assign a value to $q_t(x)$ for each transition t∈B and for each x∈C, given a set of labeled glyph image origin positions $(x_i, t_i)$, i=1 ... P.

Template construction according to the present invention is based on a maximum likelihood (ML) criterion. Let $(x_i, t_i)$, i=1 ... P be the set of labeled glyph image origin positions in some observed 2D image Z. As described above, these glyph image origin positions define a composite ideal image $Q_\pi$ by (7). As discussed in Kopec and Chou, "Document Image Decoding," for the asymmetric bit flip channel model shown in FIG. 5 therein, the log normalized likelihood of Z, given $Q_\pi$, may be written $$L(Z|Q_\pi) = \sum_{i|q_i=1} \left[ z_i \log \frac{\alpha_1}{1-\alpha_0} + (1-z_i)\log \frac{1-\alpha_1}{\alpha_0} \right] \quad (13)$$

$$= \sum_{i|q_i=1} \left[ \log \frac{1-\alpha_1}{\alpha_0} + z_i \log \frac{\alpha_0 \alpha_1}{(1-\alpha_0)(1-\alpha_1)} \right] \quad (14)$$

$$= \left[ \cdot (\# \text{ of 1's in } Q_\pi) \cdot \log \frac{1-\alpha_1}{\alpha_0} \right] + \quad (15)$$

$$\left[ \cdot (\# \text{ of 1's in } Q_\pi \wedge Z) \cdot \log \frac{\alpha_0 \alpha_1}{(1-\alpha_0)(1-\alpha_1)} \right]$$

$$= \gamma \|Q_\pi \wedge Z\| + \beta \|Q_\pi\| \quad (16)$$

where the symbol $\|X\|$ denotes the number of 1's in X and $$\gamma = \log \frac{\alpha_0 \alpha_1}{(1-\alpha_0)(1-\alpha_1)} \quad (17)$$

$$\beta = \log \frac{1-\alpha_1}{\alpha_0} \quad (18)$$

Note that the first term on the right hand side of (16) can be simply computed by counting the nonzero bits in the logical and of images $Q_\pi$ and Z, while the second term is a template-dependent bias that is independent of Z. Note that $\gamma > 0$ and $\beta < 0$ if $\alpha_1 > 1 - \alpha_0$. This condition simply means that the probability of a foreground template pixel producing a black pixel in the observed image is greater than the probability of a background pixel being observed as black. This is the normal situation.

The log normalized likelihood possesses an important decomposition property. If composite ideal image $Q_\pi$ is expressed as a disjoint union of templates $Q_{t_1} \ldots Q_{t_P}$, so that $$Q_\pi = \bigcup_{i=1}^{P} Q_{t_i}[x_i] \quad (19)$$

and $$Q_{t_i}[x_i] \cap Q_{t_j}[x_j] = \emptyset \quad (20)$$

for i≠j, then from (16) it is clear that $$L(Z|Q_\pi) = \sum_{i=1}^{P} L(Z|Q_{t_i}[x_i]). \quad (21)$$

Note that (20) expresses a constraint on the supports, not the bounding boxes, of $Q_{t_i}$ and $Q_{t_j}$. Thus, (21) can be used to compute the log normalized probability (16) for a composite image even when the bounding boxes of the constituent templates overlap, as long as the constituent supports are substantially disjoint. In particular, because of template disjointness constraint (10), the preconditions for decomposition (21) are satisfied if $Q_\pi$ is the composite image associated with path π through a Markov source and we have $$L(Z|Q_\pi) = \sum_{i=1}^{P} L(Z|Q_{t_i}[x_i])) \quad (22)$$

$$= \sum_{t \in B} \sum_{i=1}^{N_t} L(Z|Q_t[x_i^{(t)}]) \quad (23)$$

-continued $$= \sum_{t \in B} \sum_{i=1}^{N_t} \{\gamma \|Q_t[x_i^{(t)}] \wedge Z\| + \beta \|Q_t\|\}. \quad (24)$$

By expanding the right hand side of (24) in terms of individual template pixel positions and color values, (24) may be expressed as $$L(Z|Q_\pi) = \sum_{t \in B} \sum_{x \in C} q_t(x) \left[ \gamma \sum_{i=1}^{N_t} z(x + x_i^{(t)}) + \beta N_t \right] \quad (25)$$

where $z(x) \in \{0, 1\}$ is the color of the observed image Z at pixel position x. Template construction using the maximum likelihood criterion involves assigning values to $q_t(x)$ to maximize (25), subject to the template disjointness constraint (10).

The significance of template disjointness constraint (10) to the template construction technique of the present invention can be easily illustrated. If the template disjointness constraint is ignored, template construction using the ML criterion becomes straightforward and consists of separately maximizing each term of the right hand side of (25). Since $q_t(x) \in \{0, 1\}$, the ML decision rule is $$q_t(x) = \begin{cases} 1 & \text{if } S_t(x; Z) > 0 \\ 0 & \text{otherwise} \end{cases} \quad (26)$$

where $$S_t(x; Z) = \gamma \sum_{i=1}^{N_t} z(x + x_i^{(t)}) + \beta N_t \quad (27)$$

The reason for explicitly noting the dependence of $S_t(x;Z)$ on Z becomes clear shortly from the following discussion. The condition $S_t(x;Z) > 0$ may be written as $$\frac{1}{N_t} \sum_{i=1}^{N_t} z(x + x_i^{(t)}) > \frac{-\beta}{\gamma} \quad (28)$$

which has the following interpretation: The left hand side of (28) is the fraction of pixels at location x that are black (i.e., foreground pixels) in the collection of aligned sample image regions for $Q_t$. Thus, $S_t(x;Z)$ may be referred to as an "aligned pixel score" or a "template contribution measurement" at location x for template $Q_t$. The ML decision rule (26) prescribes that the template pixel at x should be black if the fraction of black pixels at location x in the aligned sample image regions exceeds a threshold; equations (17) and (18) indicate that this threshold may be computed from the channel noise parameters $\alpha_0$ and $\alpha_1$. Simply, if the template disjointness constraint is ignored, each ML template may be independently computed by averaging and thresholding the collection of aligned sample image regions for the template, pixel by pixel.

FIG. 20 shows three templates 94, 96 and 98, selected from a set of templates, constructed from collections of sample image regions for the characters "e," "a" and "r," respectively, using (26) without observing template disjointness constraint (10). The sample image regions used were similar to those in FIG. 19 and were extracted from the scanned image of a newspaper column similar to 2D image 10. It can be seen that templates 94, 96 and 98 clearly include the "correct" template images 93, 95 and 97, aligned at the origin of each canvas rectangle (indicated by the "+".) However, it can also be seen that each template canvas includes black pixels that clearly do not belong to the template. These extra black pixels occur in the templates when the averaging and thresholding operations of (26) are performed on neighboring glyphs in each of the sample image regions in the collection for a template. The extra pixels clearly arise as a result of using sample image regions that contain multiple glyphs, as opposed to a single, isolated glyph. If the sample image regions had contained only the central glyph of interest, e.g. as required in conventional template construction techniques, these extra pixels would be missing.

In addition, it can be seen from an examination of templates 94, 96 and 98 that template disjointness constraint (10) has not been observed. The pixels referenced by reference numeral 99 in template 98 for character "r" resemble the character "e." This type of pixel averaging and thresholding might occur, for example, when the sample image regions for the character "r" frequently contain the neighboring glyph for the character "e" preceding the character "r," such as would occur when an input text image contains words that frequently include the character pair "er." If templates 94 and 98 were to be used in the imaging model defined by (7) to synthesize an image $Q_\pi$ that included the character pair "er," it can be seen that template 98 would include black pixels in pixel group 99 that were also included in template 94; because these templates share the same black pixels, the supports of these templates are not disjoint, and the template disjointness constraint expressed by (10) is clearly violated.

e. Constructing templates contemporaneously from the sample image regions.

Maximizing (25), subject to the template disjointness constraint (10) is a computationally difficult problem, in the formal sense of being NP-complete. Rather than use an exponential algorithm to solve the constrained ML template construction problem exactly, the template construction technique of the present invention provides an approximate but effective solution that produces templates that substantially observe the template disjointness constraint. This solution is summarized in pseudo code in Table 2, and shown in flowchart form in boxes 458, 460, 464, and 468 in FIG. 22.

TABLE 2

Procedure for contemporaneous template construction procedure (B, C, Z) do begin
    while max $S_t(x;Z) > 0$ do begin $$\begin{Bmatrix} t \in B \\ x \in C \end{Bmatrix}$$

(s,w) := arg max $S_t(x;Z)$ $$\begin{Bmatrix} t \in B \\ x \in C \end{Bmatrix}$$

$q_s(w) := 1$
    for i = 1 . . . $N_s$ do $z(w + x_i^{(s)}) := 0$
    end
end

The basic strategy of the solution illustrated in Table 2 of assigning foreground pixel color values to individual character templates is as follows. Rather than apply (26) independently to each template pixel included in a single template, on a pixel-by-pixel basis, a value of 1 is assigned, in some sequential order, to each template pixel—in any template—for which $S_t(x;Z) > 0$, thereby producing assigned template pixels. After each such assignment, the observed image Z—that is, the sample image regions clipped from the text image in the illustrated embodiment—is modified by setting to zero (0) all aligned sample pixels at locations that are paired with, or coincident with, the newly assigned template pixel. For example, suppose that template pixel $q_s(w)=1$ has just been assigned. Then the pixels of Z at locations $w+x_i^{(s)}$, $i=1 \ldots N_s$ are set to 0 before the next template pixel assignment is made to a remaining unassigned template pixel. The effect of setting sample pixels in the observed image to zero after a coincident template assignment has been made, which may be called "clearing pixels of Z," is to reduce the value of $S_t(x;Z)$, for subsequent computations of $S_t(x;Z)$, for overlapping template pixels that have not yet been set to 1, thereby decreasing the likelihood that the overlapping pixels will be set to 1 subsequently. The sequential assignment continues as long as $S_t(x;Z)>0$ for some unassigned template pixel. The net result of the template construction technique of the present invention is to produce the entire set of trained character templates contemporaneously, with no one template being complete until no positive $S_t(x;Z)$ remains.

With reference to FIG. 22, after initializing pixel scores, or template contribution measurements, $S_t(x;Z)$, associated with each pixel position in each template canvas, in box 456, to some value greater than zero, $S_t(x;Z)$ is computed, in box 458, for each unassigned template pixel in each template having a currently positive pixel score, using the respectively paired aligned sample pixel positions in the collection of aligned sample image regions for that template. The pixel scores are then tested in box 460, and if any one of the computed pixel scores is greater than zero, the procedure proceeds to box 464 where the template pixel, in any template, having the highest positive pixel score is selected, and a foreground color value is assigned to that selected template pixel. The color values of the aligned pixels in the collection of aligned sample image regions paired with the selected template pixel are then set to zero (i.e., the background color value) in box 468. Then processing returns to box 458 where pixel scores are again computed for remaining unassigned template pixels.

Modifications may be made to the algorithm illustrated by the pseudo code in Table 2 that result in either reducing computation time or in improving template quality, or both. The specific details of such modifications will depend on the features available in the programming language used to implement the template construction technique, but, in general, modifications to reduce computation time will involve reducing the number of pixel scores, $S_t(x;Z)$, to be computed. One such modification that has actually been implemented involves computing pixel scores once, for all template pixels in all templates, and making a rank ordered list of the positive scores computed. Then the template pixel having the highest positive score from this list is selected, the selected template pixel is assigned a foreground pixel color value, and the color values of the aligned pixels in the collection of aligned sample image regions paired with the selected template pixel are set to the background color value. Then, only the next highest score in the rank ordered list of scores is computed next; if this recomputed score is now zero or less, the template pixel having this recomputed score is ignored, and the next highest template pixel score is selected next for template pixel assignment. If the recomputed score is still positive, then the template pixel having this recomputed score is selected next. The next selected template pixel is assigned a foreground pixel color value and the aligned pixels in the aligned sample image regions are cleared. This technique for selecting the next template pixel for assignment by recomputing only the next highest score continues while there are still positive scores in the rank ordered list of scores. Significantly fewer pixel scores are computed for the template pixels in this variation and consequently template construction processing time is reduced, but the general observation from its implementation is that the resulting templates produced are of lower quality than the templates produced using the steps summarized in Table 2 and shown in the flowchart of FIG. 22.

Another modification that can result in faster execution without changing the resulting templates in any way concerns the step of setting pixels of Z to zero after each template pixel is assigned. In the algorithm of FIG. 22 and Table 2, the score of each candidate template pixel, $S_t(x;Z)$, is computed using equation (27) after every template pixel assignment. If the number of glyph samples is large, this may require significant computation. Furthermore, if all candidate template pixels are re-ranked every time a pixel is assigned (e.g. as in the algorithm of FIG. 22), this computation might be repeated many times. Some of the $S_t(x;Z)$ computations may be avoided by noting that $S_t(x;Z)$ will not change when a template pixel for template s is assigned unless one of the glyph sample images for s overlaps one of the glyph sample sample images for t. Thus, $S_t(x;Z)$ only needs to be recomputed when a pixel is assigned to such a potentially overlapping template. Before pixel assignment begins, a table can be constructed that lists, for each template s, the templates t that have at least one glyph sample image that overlaps a glyph sample image of s. When a pixel is assigned to s, only the values of $S_t(x;Z)$ for those templates listed in the table entry for s need to be recomputed.

FIG. 21 shows the results of applying the template pixel color assignment algorithm of Table 2 to the same glyph sample image data used to generate the templates shown in FIG. 20. The set of templates 510 in FIG. 21 are arranged in the order "space", lowercase letters, uppercase letters, numerals and punctuation. If a character does not occur in the input image its template is given as a solid black square. Compared with FIG. 20, templates 510 in FIG. 21 contain significantly fewer extra black pixels, reflecting the effect of the "Z pixel clearing" step of the algorithm. In particular, templates 516, 514 and 518 representing characters "e," "a" and "r," respectively, have been called out for purposes of comparing them to templates 94, 96 and 98 in FIG. 20. Note that, since the technique illustrated by the pseudo code in Table 2 and the flow chart of FIG. 22 is an approximation of the exponential algorithm that would be needed to solve the constrained ML template construction problem exactly (i.e., to maximize equation (25)), the character templates produced using this technique cannot be said to be perfectly disjoint in the rigorous mathematical sense; the constructed templates may be said to have "substantially" disjoint supports (i.e., substantially nonoverlapping foreground pixels when imaged in pairs,) in that some small number of foreground pixels of adjacently imaged templates constructed in this manner may be found to overlap as a result of the approximation technique used.

As noted in (27), computation of the pixel scores requires use of the factors $\gamma$ and $\beta$, where $\gamma>0$ and $\beta<0$. In the illustrated embodiment that produced the templates shown in FIG. 21, the values used for these factors were 2.237 and −1.629, respectively, corresponding to channel noise parameters $\alpha_0=0.9$ and $\alpha_1=0.51$.

7. Determining character set widths for constructed templates

As mentioned earlier, template construction in the illustrated implementation is based on a template model known as the sidebearing model of letterform shape description and positioning. In the imaging of first and second character images modeled after the sidebearing model, a template image origin position of the second character image is displaced in the image by a character set width from a template image origin position of the first character image adjacent to and preceding the second character image. The sidebearing model requires that, when a first rectangular bounding box drawn to contain the first character image overlaps with a second rectangular bounding box drawn to contain the second character image, the first and second character images have substantially nonoverlapping foreground pixels (the template disjointness constraint.) The sidebearing model is explicitly represented in the finite state image model illustrated in FIG. 8. Each transition $t_i$ between nodes in the network has the associated 4-tuple of attributes, $[a_t]$ ($\Delta_t$), $m_t$, $Q_t$. When a template, $Q_t$, is associated with a transition $t_i$, such as those illustrated with the F transitions $t_i$, in FIG. 8, the horizontal displacement, $\Delta_i$, associated with that transition is the character set width, $W_t$, of the template. As noted earlier, the character set width is the vector displacement $\Delta=(\Delta x, \Delta y)$ from the glyph origin position to the point at which the origin of the next glyph is normally placed when imaging consecutive characters in an image plane. In the illustrated implementation, the character set width is one of the font metrics needed to completely describe a character template modeled according to the sidebearing model.

The character set width of each binary template is determined using the collection of sample image regions identified for that template. Because identifying glyph image origin positions of glyph samples in the 2D input image is a process of estimation, it is likely that at least some of the identified samples will have inaccurate image origin positions identified. However, the set width of each glyph sample included in a sample image region can be computed from knowledge of the image origin position of the next adjacent glyph sample in the 2D image. Therefore, computing a set width for a template includes computing the set width for each sample identified for that template using the collection of sample image regions and the displacement from each image origin position in each sample to the image origin position of the next adjacent glyph in the 2D image. The collection of computed set widths for the glyph samples is then used to arrive at a set width for the template; for example, the mean or median set width value for all of the samples may be determined to be the set width for the template. Or the minimum set width computed using the samples may be used as the template's set width.

In the illustrated implementation, the set width of each template is determined using the collections of sample image regions, and not from using the constructed templates. Therefore, the determination of character set widths is not dependent on the completion of template construction, and may take place at any point after the decoding and backtracing steps produces the labeled glyph image origin positions for the glyph samples in the 2D input image. The determination of character set widths may be included in an iterative processing loop that repeats the decoding, backtracing, extraction and template construction steps 330, 374, 380 and 400, respectively; the reasons for iterating the template construction process are explained below. Determining updated character set widths in each iteration of template construction is likely to lead to improved accuracy in identifying the labeled glyph image origin positions in the input 2D image, which in turn will produce more accurate templates using sample image region collections that are aligned more accurately at glyph sample image origins.

However, from a computational efficiency perspective, it may not be necessary to determine set widths in each iteration of template construction. In the illustrated implementation, initial template training experiments included determining set widths once, after an iteration stopping condition had been met, and after the final templates had been produced; no intermediate character set width updating took place. Subsequent experimentation that included determining set widths once every so many iterations showed that templates are improved when the character set widths are updated during the iteration process. When updating character set widths during the template construction process, the preferred method for computing the set width is to determine the minimum set width from the set widths computed for the collection of sample image regions, and then to take a percentage of that minimum, for example 90 per cent, as the set width for the template, in order to ensure that the set widths used for character positioning during subsequent iterations of the decoding process is always going to be less than the actual set widths used for positioning the glyphs in the input 2D input image. The process of determining intermediate set widths may of course be different from the process used to compute a final set width for each template after template construction is completed and the iteration stopping condition has been met.

8. Iterating decoding and backtracing steps with the current set of character templates produced from the template construction step With reference again to FIG. 6, once template construction procedure 400 has been completed one time using the labeled glyph image origin positions produced as a result of decoding, backtracing and extraction steps 330, 374 and 380 respectively, a stopping condition is tested. If the stopping condition has not been met, processing control returns to decoding step 330, where decoding is again performed, using the current set of character templates constructed in the previous iteration of template construction procedure 400.

The illustrated embodiment of transcription correction technique 200 is fundamentally an iterative process because, as has been previously noted, image decoding of an observed 2D image using 2D image models of the type illustrated in FIGS. 7 and 8 assumes the use of an initial set of character templates. When, as is typical in the situation of training, an initial set of templates is not available, an initial set of character templates having an arbitrary pixel content (e.g., small solid black rectangles) that is of practical use by decoding process 330 is generated and used for the initial iteration of decoding. Given such an initial set of templates, decoding, backtracing and extraction steps 330, 374 and 380 respectively are likely to produce improved estimates of labeled glyph image origin positions of glyph samples in 2D image 10 with each subsequent iteration, using the character templates constructed in the previous iteration.

The stopping condition used to control the completion of character template construction may be heuristically determined, or may be a function of one or more processing parameters. In the illustrated embodiment, the stopping condition is a fixed number of iterations that has proven from experience to be the number of iterations that produces the highest quality templates and after which subsequent observable improvements to the templates are of little or no significance. The stopping condition may also be based on a threshold related to the maximum likelihood score computed during decoding.

At the conclusion of the iteration process, the set 510 of trained character templates that is finally produced by this first model modification process is incorporated into 2D image source network 830, and image source network 830 is designated as image source network 838 in FIG. 6 to reflect this model modification.

If 2D image source network 830 were being modified with only one model modification in the form of producing trained character templates, the model modification stage of transcription correction according to the present invention would be completed, and document image decoding process 600 (FIG. 5) would now follow. However, in the illustrated implementation shown in FIG. 6, a second modification is made to 2D image source network 830, in the form of integrating a language model into modified 2D image source network 838. This second model modification is accomplished by producing a language model network 850 and merging that network with modified image source network 838.

9. The language model network

The purpose of language model construction process 314 of FIG. 6, in the context of the construction of a modified formal image source network, is to define the set of messages that the modified image source network can generate in a manner that reflects the language usage in the original 2D image source, as reported by the transcription. The language model network is a formal grammar, in this case, a finite-state grammar, that defines a set of strings (i.e. a language). This language typically contains the original transcription string of the input transcription.

An example of a type of language model that has been found useful for applications in which the transcriptions are literal text transcriptions is a character bigram model. A character bigram model defines, for each character that may appear in a string of the language, the set of characters that are allowed to immediately follow that character in the string. A bigram model imposes no constraints on the language strings other than the constraint on successive character pairs.

Bigram models and their construction are well-known in the field of text processing. However, the illustrated implementation of language model construction process 314 will include a brief description of the construction of a character bigram model for transcription 60 (FIG. 3). The character bigram network for transcription 60 will generate strings of any length, each of which has the property that the only characters that appear in the string are those that occur in original transcription 60, and the only characters pairs that occur in that string are the ones that occur in original transcription 60. Thus, construction of the character bigram network uses knowledge of all of unique characters in transcription 60, and for each respective unique character, all of the pairs of characters that occur in transcription 60 that begin with that respective unique character. FIG. 23 shows bigram table 530 for transcription 60, illustrating all unique characters and pairs of characters. Symbol 532 is a "space" character. Character list 534 illustrates the single characters in transcription 60 that follow "space" character 532. Note that newline character 536 is also included in bigram table 530, along with a list of the single characters that are observed to follow newline character 536 in transcription 60.

For purposes of transcription correction, it is sometimes useful to modify the bigram model to include some character pairs that do not occur in the input transcription string. The motivation for this is that a decoder that uses the bigram language model cannot correct an error unless the correct character, plus the characters immediately preceding and following it, form character pairs that are allowed by the model. If the model only allows character pairs that actually occur in the errorful transcription string, the error will not be corrected unless the correct character pairs also occur somewhere else in the string. A number of simple rules for augmenting bigram models derived from errorful transcription strings have been identified. One rule is to allow every digit 0,1, . . . 9 to occur wherever any digit occurs. For example, if the transcription string includes the pair "n8" then the bigram model will allow all pairs "n0", "n1", "n2", . . . "n9". Similarly, if "8i" occurs in the transcription, then "0i", "1i", . . . "9i" will be included in the language model. A second useful rule is to include in the language model the uppercase form of every lowercase pair that occurs in the transcription. For example, if "aa" occurs in the transcription, then "AA" is allowed by the model as well. A third rule is to allow both period "." and comma "," to occur wherever either one is observed in the transcription. A fourth rule is to allow a newline character, "\n", to follow a character wherever a "space" character is observed following that character, and a fifth rule is the opposite of that: to allow the "space" character to follow a character whenever "\n" is observed following the character. FIG. 24 shows bigram table 540 for transcription 60, illustrating table 530 augmented according to rules four and five. New table entries are shown circled, and new table entries 542 and 544 are called out as examples.

Bigram model construction proceeds as follows. In a first construction pass, for every unique character in the transcription, a pair of nodes, i.e., a beginning node and an end node, is produced with a branch between them labeled with that unique character; at the conclusion of this first pass there are as many independent pairs of nodes with transitions between them as there are unique characters in the transcription. Then, for each pair of first and second characters in the transcription, a null transition is added from the end node of the pair of nodes for the first character to the beginning node of the pair of nodes for the second character in the pair. An initial node is then added that enters the beginning node of a "space" character, and a final node that exits the network from the end node of the "space" character. Padding the bigram model with beginning and end spaces in this way is a convenient technical device that has the effect of treating the start and end of the string the same as an interword space.

Figure 25:
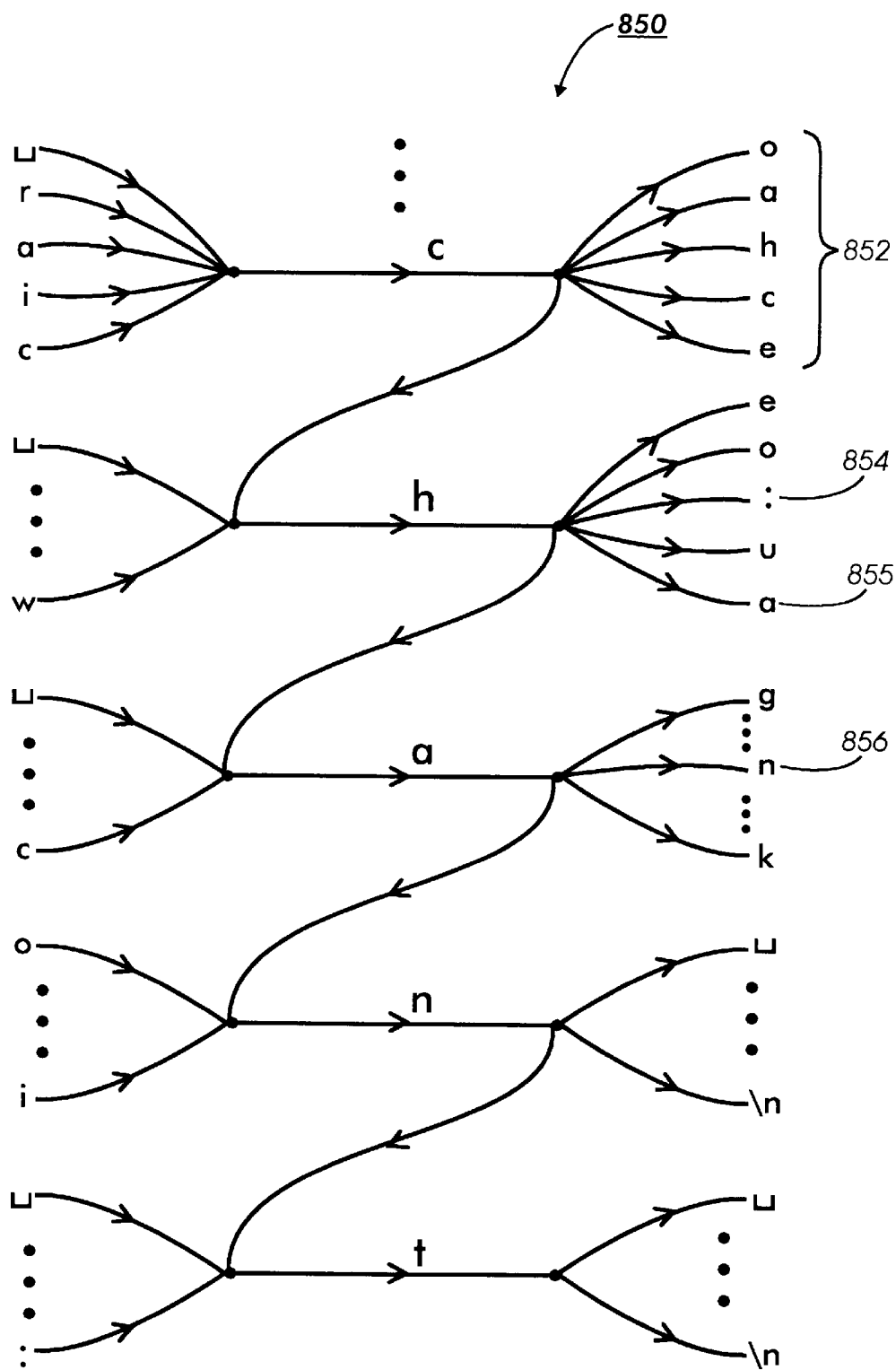
FIG. 25 is a diagram illustrating a finite state transition network modeling the original transcription illustrated in FIG. 3 as a bigram language model network that produces message strings with the character pairs in the augmented bigram table of FIG. 24.

FIG. 25 shows a portion of finite-state network 850 representing a bigram model derived from transcription 60 and augmented bigram table 540 (FIG. 24); the portion illustrated is that part containing the characters of transcription 60 that surround error 68; that is, the transcription string "ch:t" and valid character pairs for these characters in table 540. In this example, the first and last characters of the transcription string portion are "space" characters. Valid character pairs for the character "c", for example, denoted by reference numeral 546 in table 540 are shown as transitions 852. It can also be seen that character ":" may follow character "h", as it does in error 68 in transcription 60, and that correct characters 855 and 856, "a" and "n" may be generated by network 850, since they occur in transcription 60 at location 67 (FIG. 3). Thus, each part of a path through the portion of network 850 shown in FIG. 25 produces a string composed of characters that occur in "chant" or that includes pairs of consecutive characters that also occur as consecutive character pairs somewhere in transcription 60. The string "ch:t" is in the set of strings produced by model 850, as is the string "chant" and as are many other strings, including many that are not valid English words.

A bigram language model produced for an average transcription in the English language will include 50 to 60 pairs of nodes representing unique characters in the transcription and a few thousand transitions.

Many modifications and alternatives to the bigram language model are possible. For example, when statistics about the types of errors that are likely to occur in the transcription string are available, a general approach to augmenting the bigram model is applicable. If the transcription string contains the pair "$c_1c_2$", and substitution errors of the form "$c_3 \rightarrow c_2$" are known to be possible in the transcription, then the bigram model should also allow the pair "$c_1c_3$". An analogous rule can be applied for expected substitutions into "$c_1$". As an example of this approach, suppose that the recognizer that generated the transcription is known to sometimes misrecognize "m" as "rn". To correct such errors, the language model should allow "$c_1$m" to occur if "$c_1$r" occurs in the transcription, and to allow "m$c_2$" if "n$c_2$" occurs.

More complicated types of transcription language models can also be used, such as trigram models, n-gram models for larger values of n, and finite-state word-based language models such as those commonly used in automatic speech recognition systems. Information for using and constructing finite-state networks for grammar representation is available in the speech recognition and natural language processing literature where a large body of theory and techniques for analyzing text corpora in order to derive finite-state language models has been developed. See, for example, the Rabiner tutorial reference cited earlier for a description of word-based grammar used in a syntactic analysis phase of speech recognition system. These techniques may be applied to the problem of constructing a language model for transcription error correction. It is the intent of the present invention that the particular language model used in transcription correction be selected for its utility with respect to the specific type of transcription being corrected and the nature of the errors; some of the techniques mentioned above and found in the literature may provide significant advantages in specific situations over the simple character bigram construction methods described above.

In addition to the input transcription, other sources of a priori knowledge of language usage in the general class of text documents of which the given input image is an example may also be used. For example, if it is known that the input image contains text from an article in the New York Times, possible a priori languages models might also include a general model of English, a model derived by analyzing a collection of articles from a variety of English language newspapers, or a model derived by analyzing a body of past articles from the New York Times.

10. Merging the language model network with the 2D image source network to produce the language-image network A transcription language network, such as language model network 850 in FIG. 25 is capable of generating a complete path through the network; a transcription is available from the transitions composing the path. Thus, image source model 838 (FIG. 6) and language model network 850 (FIG. 25) jointly define a set of ideal images in which each image is a spatial arrangement of copies of character templates placed at specified image locations in the ideal image and selected according to a message string consistent with the language model. Subsequent decoding of 2D image 10 using image source model 838 for purposes of transcription correction would be most efficient if decoding were able to be constrained to generate only ideal images, and consequently paths, that were consistent with the paths, and consequently message strings, generated by language model network 850. Such a constraint can be imposed on the decoding process that uses image source model 838 by merging image source model 838 with language model network 850. Thus, language model network 850 modifies 2D image source network 838 through a merging process whereby the two networks are integrated into a single language-image network 890 that includes the set 510 of trained character templates.

The inputs to the network merge step 324 (FIG. 6) are 2D image model 838 and language model 850. The output of this step is a Markov image source model of the type illustrated in FIG. 7, called the language-image network 890. Language-image network 890 is defined by the same two properties defined previously for merging the transcription network with 2D image source network 830: (a) for each complete path π in the language-image network there is a complete path in image source model 838 which has the same transcription string and image as π; and (b) for each complete path π in image source model 838, if the transcription of π is in the set of transcriptions generated by language model network 850, then there is a complete path in language-image network 890 which has the same transcription string and image as π. The set of transcriptions generated by the language-image network is the intersection of the set of transcriptions generated by image source model 838 and the set of transcriptions generated by language model network 850. The ideal images generated by the language-image network that have a given transcription are the same as those generated by image source model 838 having that transcription.

In contrast to the merging of a portion of formal transcription model 880 with 2D image source network 830 that is illustrated in FIGS. 10–13, the actual merging process of network 838 with language model network 850 involves producing a network that is too complex to illustrate clearly in drawings. The network merging process, however, is accomplished using the same rules described above with respect to the merging of transcription network 880 with 2D image source network 830.

Figure 26:
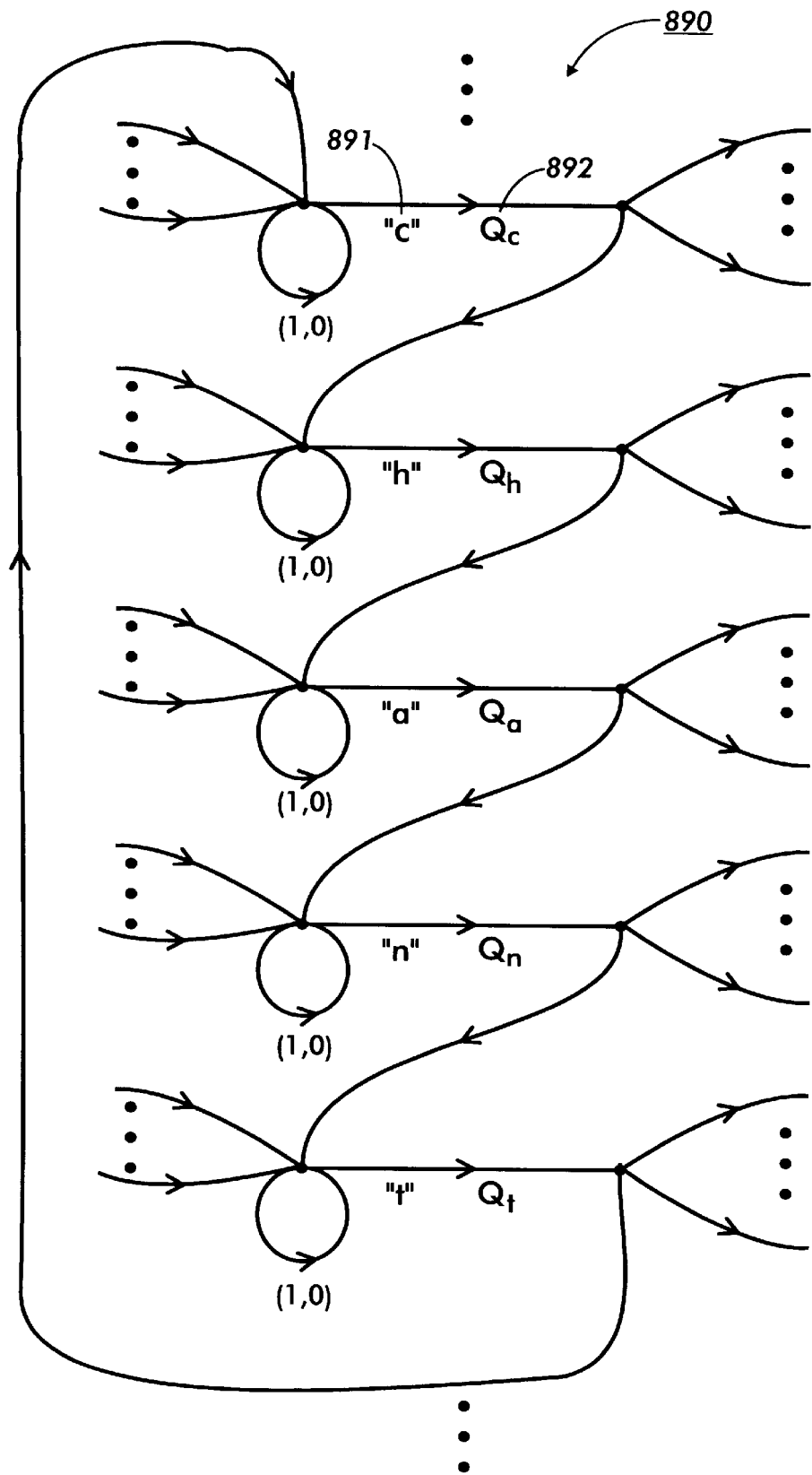
FIG. 26 is a diagram illustrating the finite state transition language-image network resulting from merging the language model network of FIG. 25 with the image source network of FIG. 8.
Figures 27, 28:
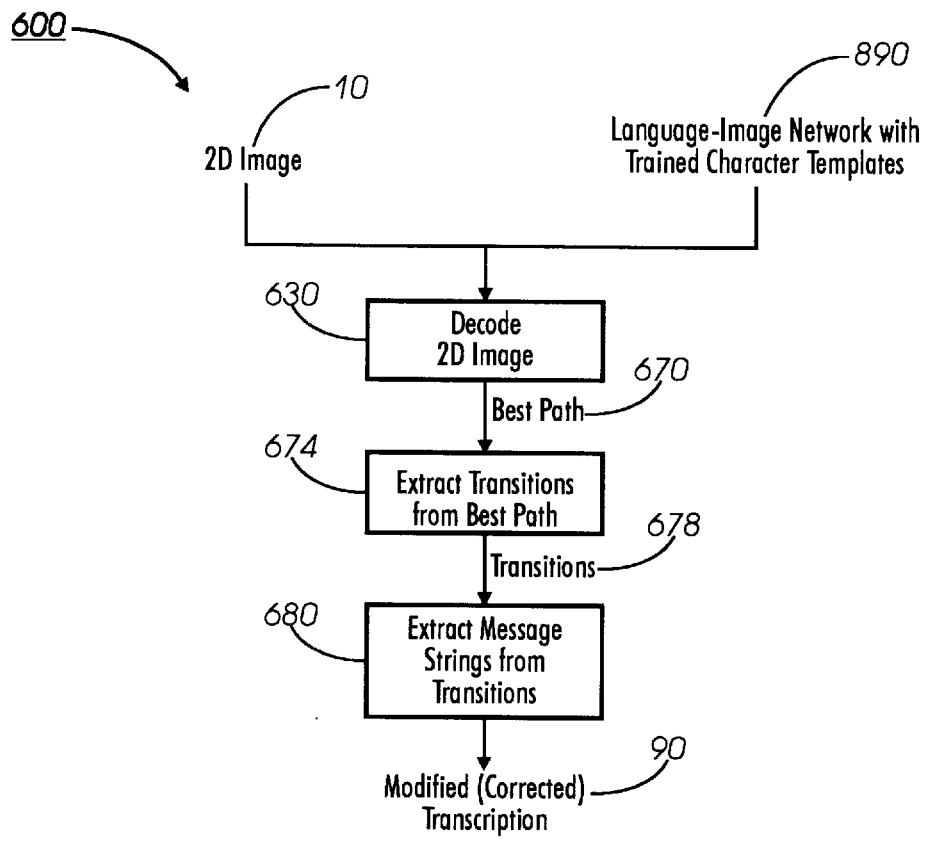
FIG. 27 is a simplified block diagram illustrating the general processes and data flows of the re-recognition stage of the transcription correction technique of the present invention.
FIG. 28 illustrates a corrected transcription produced for the text image of FIG. 1 using the re-recognition process of FIG. 27 according to the transcription correction method and system of the present invention.

FIG. 26 illustrates a portion of language-image network 890 which is the network created as a result of the merging process. Specifically, FIG. 26 illustrates the network that results from merging language model network 850 of FIG. 25 and 2D image model 838, which is 2D image model 830 of FIG. 8 plus the set 510 of trained, font-specific character templates, using the model merging method illustrated earlier in the discussion accompanying FIGS. 10–13.

While the merging of the language model with the image model has been illustrated using the character bigram language model, the merging of a finite-state language model of a type that is different from the character bigram model that also defines a set of candidate transcriptions of the input image is accomplished using the identical procedure just described.

Language-image network 890 is the modified formal image model that is used in subsequent re-recognition process 600 to produce a modified, corrected transcription. Network 890 is a stochastic finite state transition network of the type generally illustrated in FIG. 7 herein. It functions in document image decoding process 600 in a manner that is analogous to the functioning of formal 2D image source network 830 shown in FIG. 8 and described earlier, except that language-image network 890 is constrained by transition sequences that only permit the positioning of trained character templates in the imaging plane in character pair sequences consistent with the language model network 850 developed using original input transcription 60. Specifically, network 890 models a path through 2D image 10 of a single column of text that follows the conventional reading order for a text in the English language, assuming that the path through the image starts at the top left corner of the image and proceeds to the bottom right corner, and proceeds from the left of the image to the right in repeated 1D line sequences. Each transition $t_i$ between nodes in the network has the associated 4-tuple of attributes that are shown in FIG. 8 for network 830 in the order [$a_t$] $\Delta t$, $m_{t'}$, $Q_{t'}$ where, when a (trained) template $Q_t$ is associated with a transition, the message string $m_t$ identifies the character represented by the template. Trained character template 892 in FIG. 26 is the template for the character "c", and message string 891 identifies template 892 as the character "c". Some of the attributes are null for some transitions. Language-image network 890, when used as an image decoder, extracts a simple text string from an observed image (e.g., 2D image 10) that contains character sequence pairs that are consistent with language model 850 to produce a literal text transcription of the observed image (i.e., a transcription without formatting or logical structure tags.)

11. Re-recognition of the input 2D image using the modified language-image network The re-recognition operation 600 of FIG. 5 may be accomplished using any type of software- or hardware-implemented decoder suitable for decoding 2D image 10 using the modified language-image network 890 to produce a transcription of 2D image 10. As with decoding process 330 of FIG. 6 described previously, a decoder based on a dynamic programming algorithm that minimizes the probability of error between the original input 2D image and a target ideal 2D image is likely to be the most appropriate decoding process to use for a particular implementation. A suitable decoding process identifies some or all of the complete paths through the language-image network, each of which indicates a target ideal 2D image, and will determine which one of the identified paths is the best path, by determining which target ideal 2D image best matches the text image according to a defined matching criterion. The best path through the network is the path that indicates the best matched target ideal 2D image; transition image origin positions in the text image can be computed from the transitions that make up this best path, and message strings are available, in turn, from selected ones of the transitions as identified by their transition image origin positions. The matching criterion may be any suitable image measurement; typically, the matching criterion will involve optimizing a pixel match score for the target ideal image compared to the text image.

In the illustrated implementation, re-recognition process 600 implements the document image decoding method disclosed in commonly assigned U.S. Pat. No. 5,321,773, entitled "Image Recognition Method Using Finite State Networks" and is shown in the block diagram of FIG. 27. The inputs to the illustrated implementation of document image decoding process 600 include 2D image 10 (FIG. 1) and modified language-image network 890 that includes trained character templates 510. As noted earlier, character templates 510 are defined by the sidebearing model and include character labels that indicate character template origin coordinate information, set width information, and necessary font metric information. Decoding process 630 is used to decode 2D image 10 using modified language-image network 890 to produce a best sequence of transitions, or path 670, through language-image network 890. Decoding process 630 finds the maximum a posteriori (MAP) path through the network 890, using the assumed asymmetric bit flip channel model described in Kopec and Chou, "Document Image Decoding," and shown in FIG. 5 therein. The purpose of the decoder is to maximize a recursive MAP decision function over all complete paths through network 890 in order to determine the most likely path through the network. In the case of decoding to produce a message string, MAP decoding of an observed image Z with respect to a given image source involves finding a message, M, that maximizes the approximation, $$Pr\{M, Z\} \approx \sum_{\pi|M_\pi=M} Pr\{Z|Q_\pi\}Pr\{\pi\}. \qquad (29)$$

One problem with direct implementation of the MAP rule is that forming the sum in (29) can be computationally prohibited. As shown in Kopec and Chou, "Document Image Decoding," MAP decoding reduces to finding a complete path, π, that maximizes $$L(\pi Z) \equiv \log Pr\{\pi\} + L(Z|Q_\pi) \qquad (30)$$

and then constructing the approximation $$\hat{M} = M_\pi \qquad (31)$$

Substituting (3) and (22) in (30) produces $$L(Z|Q_\pi) = \sum_{i=1}^{P} [L(Z|Q_t[x_i]) + \log \alpha_{t_i}] \qquad (32)$$

as the MAP decision function for image decoding that is to be maximized over all complete paths π. The complete exposition of the mathematical principles underlying decoding process 630 for producing message strings and additional details about the model and image decoding is available in U.S. Patent 5,321,773, and in the article by Kopec and Chou, "Document Image Decoding."

Decoding process 630 is implemented as a Viterbi decoding process which has been previously explained in connection with the discussion of decoding process 330; its basic operation is illustrated in box 330 of FIG. 14. At the conclusion of decoding, after the likelihood score for the $n_F$ image plane in the decoding lattice has been computed, the most likely complete path found by the Viterbi decoder is retrieved by backtracing, in box 674, through the stored transitions from the final node to the initial node in the decoding lattice to identify the set of transitions 678 that compose the best path; in the case of retrieving message strings, transition image origin positions need not be computed. Process 680 concatenates message strings from each of the transitions in the best path into a composite message string, M, that comprises modified, and corrected, transcription 90. An example of corrected transcription 90 is shown in FIG. 28, which shows original transcription 60 with fewer errors.

D. The System and Software Product Configurations

1. The system configuration.

Figure 29:
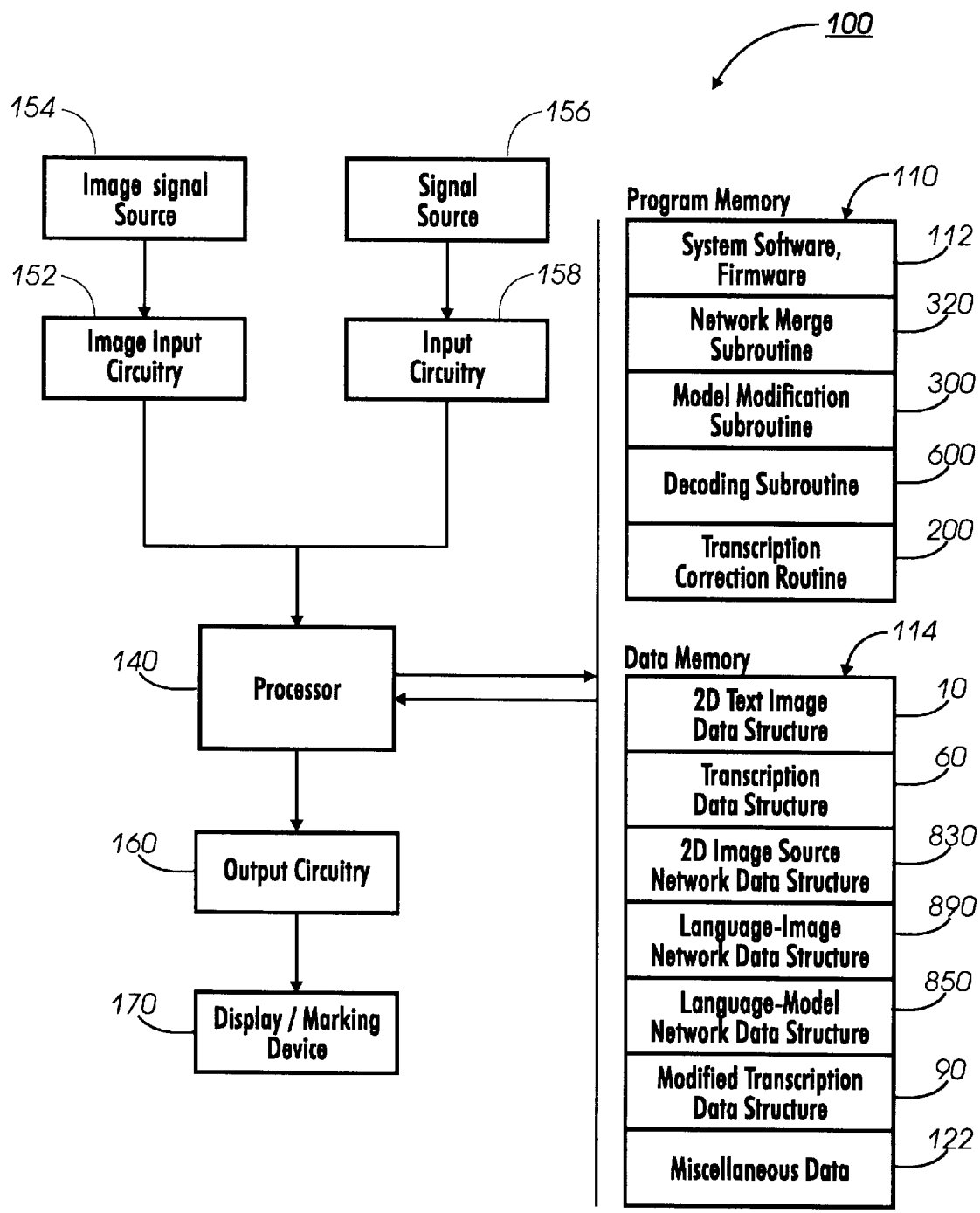
FIG. 29 is a simplified block diagram illustrating the hardware components of the system that the present invention may operate.

FIG. 29 shows the components of processor-controlled system 100 implementing the features described above for automatic transcription correction using a transcription, a grammar-based model, and a 2D image as inputs. System 100 includes processor 140, which could be any processor, including one or more CPUs, and may include specialized hardware such as one or more coprocessors to provide specific functions. Processor 140 is connected for receiving image definition data defining images from image input circuitry 152. Input circuitry 152 is connected for receiving signals indicating image data from an image signal source 154. Image signal source 154 may include an optical scanner, a copier system scanner, a Braille reading system scanner, a bitmap workstation, an electronic beam scanner or any similar signal source capable of providing image signals of the type required by the present invention. In the case of one of the scanners, the output of a sensor associated with the scanner is digitized to produce an image definition data structure defining a two-dimensional image source of glyph samples 10, and the image definition data structure is then provided to processor 140 via image input circuitry 152 for storage in data memory 114.

Processor 140 is also connected for receiving signals from input circuitry 158 connected to signal source 156 that provides signals indicating transcription data structure 60 (FIG. 3) to system 100. Signal source 156 may include any signal-producing source that produces signals of the type needed by the present invention. Such sources include input devices controllable by a human user that produce signals in response to actions by the user, such as a keyboard device; in response to actions by the user entering a sequence of character codes indicating the glyphs the user visually perceives as occurring in 2D image 10, signal source 156 produces signals indicating the character codes which are then received by processor 140 via input circuitry 158. Alternatively, signal source 156 may be an operation (not shown) that processor 140 is executing, or that is being executed by another processor in communication with processor 140, that provides transcription data structure 60 to processor 140 for processing according to the present invention. An example of such an operation is a character recognition operation performed on 2D image 10 that produces transcription data structure 60 as its output. Processor 140 then provides transcription data structure 60 to data memory 114 for storage.

Processor 140 is also connected for accessing program memory 110 and data memory 114 to obtain data stored therein. Processor 140 operates by accessing program memory 110 to retrieve instructions, which it then executes. Program memory 110 includes the underlying system software and firmware 112 that provide the operating system and operating facilities of system 100, and transcription correction routine 200 that implements the invention described in the block diagram of FIG. 6. Depending on the particular implementation of transcription correction routine 200, program memory 110 may also include network merge subroutine 320, model modification subroutine 300, and decoding subroutine 600. During execution of the instructions in program memory 110, processor 140 accesses data memory 114 to obtain data items in 2D image source network 830, transcription data structure 60 and 2D image 10, and to write modified (corrected) transcription 90 to memory 114. Data memory 114 also stores other data, such as the language model network 850, and the merged language-image network 890. Miscellaneous data 122 includes other data used in executing instructions in program memory 110, and may include the data structure including the labeled collections of sample image regions for use in template construction, and initial values, indexes for use in accessing the template canvases and sample image regions, template contribution measurements, and the factors γ and β for use in computing pixel scores. Depending on the particular implementation of transcription correction technique 200, miscellaneous data 122 may also include an initial character template data structure when needed, and the Viterbi decoding lattice and scores.

System 100 may, but need not, include output circuitry 160 connected to processor 140 for receiving image definition data defining an image for presentation on display device 170. Display device 170 may be any suitable display device for presenting images, and may include a cathode ray tube device or a liquid crystal display device for presenting images on display screens, or a printer device for presenting images on a marking medium. Thus output circuitry 160 may include a screen display device driver or printing circuitry. In a document recognition system integrating the present invention as a component thereof, for example, display device 170 may be either a printer or a display screen for presenting the corrected transcription for visual inspection by a user. In another example, when display device 170 is a screen display, it may be used in conjunction with a user interaction device by the user for providing transcription data structure 60 to system 100.

The actual manner in which the physical components of system 100 are connected may vary, and may include hardwired physical connections between some or all of the components as well as connections over wired or wireless communications facilities, such as through remote or local communications networks and infrared and radio connections. Image signal source 154 and image input circuitry 152, for example, may be physically included in a single physical unit such as a scanning device that is part of a device such as a facsimile system, that produces 2D image 10 and transmits it for receipt by processor 140. Or, either or both memory 110 or 114 may include memory that is physically connected to processor 140 as local memory, or that is remotely accessible to processor 140 by means of a wired or wireless communications facility. It is further of importance to note that the range of the physical size of system 100, or of any of its components, may vary considerably from a large device, for example, a multi-featured high volume copier/duplicator device, to much smaller desktop, laptop, and pocket-sized or smaller display devices. The transcription correction technique of the present invention is operable on all systems in this physical size range.

2. The software product of the present invention

Figure 30:
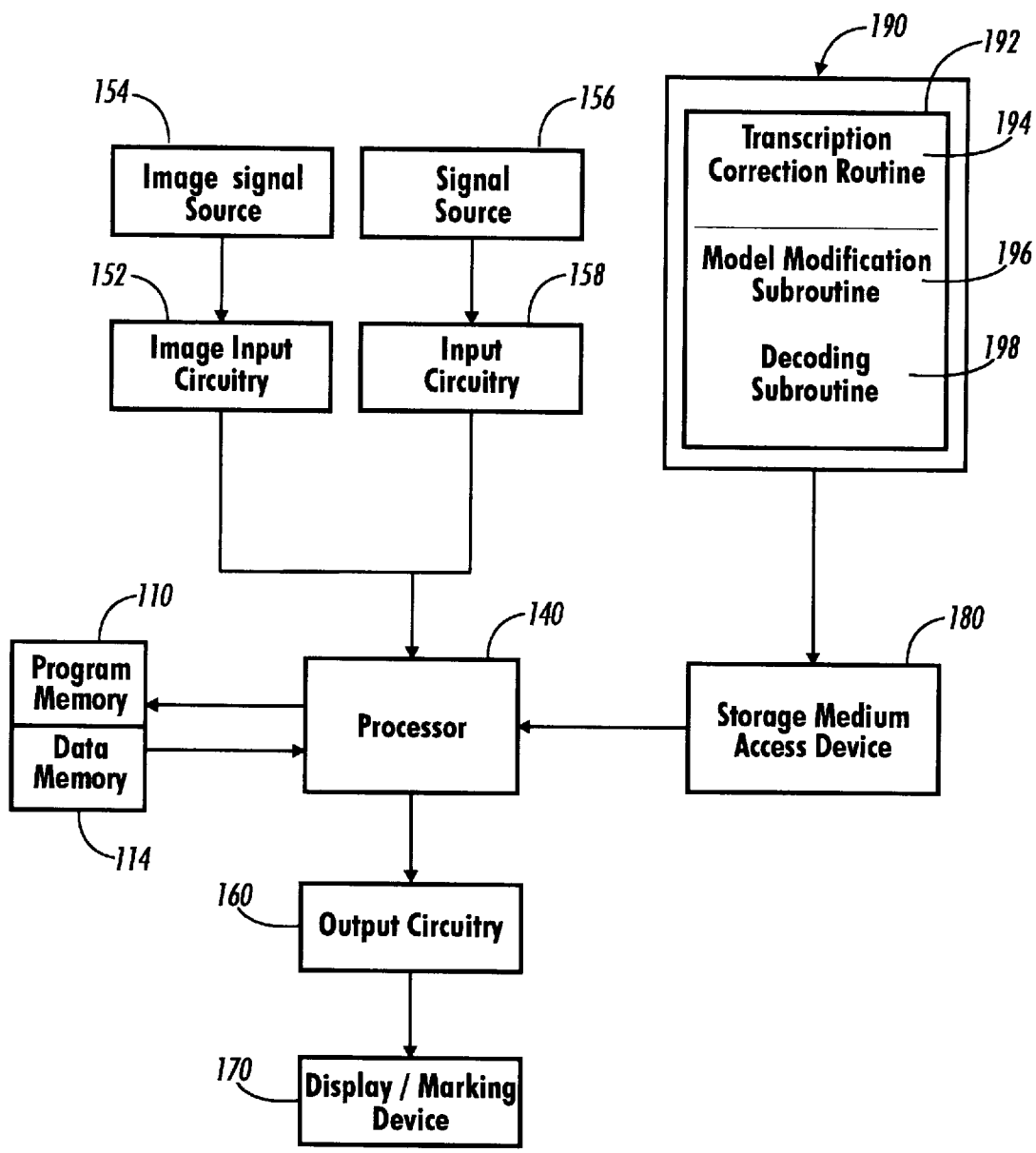
FIG. 30 is a simplified block diagram illustrating a software product for use in the system of FIG. 29.

The present invention may be implemented as a software product for use in operating systems such as those of the configuration shown in FIG. 29, and described in the discussion accompanying FIG. 29 above. FIG. 30 shows software product 190, an article of manufacture that can be used in a system that includes components like those shown in FIG. 30. Software product 190 includes data storage medium 192 that can be accessed by storage medium access device 180. Data storage medium 192 could, for example, be magnetic medium such as a set of one or more floppy disks, an optical medium such as a set of one or more CD-ROMs, or any other appropriate medium for storing data. Data storage medium 192 stores data 194 that storage medium access device 180 can provide to processor 140. Stored data 194 include data indicating model modification instructions 196; when these instructions are provided to processor 140, and processor 140 executes them, the machine is operated to perform the model modification processing represented in box 300 in FIG. 6 for modifying the formal 2D image model using the transcription and the input 2D text image. Stored data 194 also include data indicating decoding instructions 198; when these instructions are provided to processor 140, and processor 140 executes them, the machine is operated to perform the document image decoding processing represented in box 600 in FIG. 6 for re-recognizing the input 2D text image using the modified formal 2D image model. Stored instruction data 194 are capable of activating and controlling the action of a machine configured as shown in FIG. 30 in the very specific manner described above with respect to boxes 300 and 600. The article of manufacture, therefore, in its intended environment of use, i.e., a machine with a processor, controls the operation of the machine, and produces physical results when sensed by the processor. The processor responds to what is sensed and performs the acts directed by stored instruction data 194, as represented by boxes 300 and 600 (FIG. 6).

E. Additional Considerations

1. Efficiency considerations

Viterbi decoding efficiency can be improved when the template training procedure is iterated (i.e. the updated templates from a previous iteration are used as initial templates for the current iteration) by using the labeled glyph image origin positions of the previous iteration to restrict the search during the decoding step of the current iteration. As the templates converge to their final values, the decoded glyph image origin positions will tend to change only slightly from one iteration to the next. Thus, the template matching operations that occur during the Viterbi decoding need only be performed at image positions that lie close to the previous glyph image origin positions, rather than being carried out everywhere in the image. Template match scores at positions far from the previous glyph positions can be set to some large negative constant value.

Several alternative methods of efficiently improving template construction have already been discussed above.

2. Modeling horizontal white space as a template in the image source model

Decoding efficiency of the illustrated embodiment may also be improved by modeling as a template in the image source model the horizontal white space that occurs between semantic units (e.g., words) in an image of black text on a white background. Treating the white space between words as a glyph to be matched by a "space" character template improves decoding performance because the image positions in the input 2D image aligned with "space" character templates tend to be identified relatively quickly as accurate image positions in successive iterations of Viterbi decoding, and this information can be used in subsequent iterations to restrict the computation of likelihood scores to certain locations.

Conceptually, modeling image white space is characterized in the illustrated embodiment by modeling a "space" character template as having a very low foreground probability, $\alpha_1$, indicating that a foreground pixel in an ideal image will more likely not be observed as black in the image locations that "match" the "space" template; that is, these image regions are expected to be free of black pixels. This is accomplished by reversing the relationship between $\alpha_0$ and $\alpha_1$ for the "space" template such that $\alpha_1$ and $\alpha_0$ satisfy the condition, $\alpha_1 < 1 - \alpha_0$. A template that models white space in this way may be referred to as a "hyper-white" template.

In the illustration of the template construction method just described, $\alpha_0$ (background probability) and $\alpha_1$ (foreground probability) are assumed to have the relationship, $\alpha_1 > 1 - \alpha_0$ for all templates; that is, these parameters are uniform for all templates. Modeling at least one template in a manner in which the relationship between $\alpha_0$ and $\alpha_1$ is reversed requires that templates have the property of having different, or nonuniform, foreground probabilities associated with them. Implementing these two concepts—the reversal of the relationship between the probabilities $\alpha_0$ and $\alpha_1$ and permitting foreground probability $\alpha_1$ to vary by template— requires changing the pixel assignment procedure that is illustrated in Table 2 above in the following manner.

Recall that computation of the pixel scores using (27) requires use of the factors $\gamma$ and $\beta$; when $\alpha_1$ and $\alpha_0$ satisfy the condition $\alpha_1 > 1 - \alpha_0$, then $\gamma > 0$ and $\beta < 0$. When $\alpha_1 < 1 - \alpha_0$, the probability that a foreground pixel from a template will produce a black observed pixel is less than the probability of a background pixel being observed as black. Thus $\gamma < 0$ and $\beta > 0$ when $\alpha_1 < 1 - \alpha_0$. The ML template pixel color assignment criterion (26) remains valid, where $S_t(x;Z)$ is defined as before, but now the condition $S_t(x;Z) > 0$ becomes $$\frac{1}{N_t} \sum_{i=1}^{N_t} z(x + x_i^{(0)}) < \frac{-\beta}{\gamma} \qquad (33)$$

in which the direction of inequality is reversed compared to equation (28). The interpretation of (33) is that the fraction of black pixels at location x in the collection of aligned glyph sample image regions for a template $Q_t$ should be less than a threshold, rather than greater.

In the existing procedure of Table 2 above, when a template pixel is assigned a color of 1, e.g. $q_s(w)$: =1, the pixels of Z at locations $w + x_i^{(s)}$, i=1 ... $N_s$ are set to 0 before the next template pixel assignment is made. The effect of this is to reduce the score $S_t(x;Z)$ for overlapping template pixels that have not yet been set to 1, thereby decreasing the likelihood that the overlapping pixels will be set to 1 subsequently. In the case of hyper-white templates, the principle of reducing $S_t(x;Z)$ is still valid, but since $\gamma < 0$ when $\alpha_1 < 1 - \alpha_0$, reducing $S_t(x;Z)$ is accomplished by adding black pixels to Z, rather than removing them. Implementing this requires modifying the pixel assignment procedure of Table 2 to replace the line that assigns a value of zero to pixels in the samples that are aligned with an assigned template pixel with a line that assigns a value of one to those pixels. However, this would only be necessary for the templates modeled as hyper-white templates, i.e. those templates where $\alpha_1 < 1 - \alpha_0$.

Producing a set of character templates in which the foreground probability of each template is nonuniform (i.e., varies by template) requires a slight modification to the definition of the aligned pixel score, $S_t(x;Z)$ in (27) to make $\alpha_1$ an explicit parameter, so that $$S_t(x; Z, \alpha_1) = \gamma_{\alpha_1} \sum_{i=1}^{N_t} z(x + x_i^{(0)}) + \beta_{\alpha_1} N_t \qquad (34)$$

The subscripts on $\gamma$ and $\beta$ indicate that these parameters are related to $\alpha_1$ via (17) and (18).

When the "space" character template alone is modeled as a hyper-white template, while the remaining templates in the input image character set are modeled as black-on-white templates, it can be seen that constructing hyper-white templates involves coloring Z pixels black every time a template pixel is assigned a 1 value, while constructing normal templates involves coloring Z pixels white. To accomplish this, two copies of the observed image Z are maintained during pixel color assignment. One copy, denoted $Z_1$, is used to compute $S_t(x;Z)$ for those templates for which $\alpha_1 > 1 - \alpha_0$. The second copy, denoted $Z_0$, is used to compute $S_t(x;Z)$ for the hyper-white templates, i.e. templates for which $\alpha_1 < 1 - \alpha_0$. Before the pixel assignment process begins, $Z_1$ and $Z_0$ are each initialized to be copies of Z. Every time any template pixel is assigned a 1 value, pixels of $Z_1$ are cleared (from 1 to 0) and pixels of $Z_0$ are set (from 0 to 1.) The selection function $\sigma$ determines which of $Z_0$ or $Z_1$ is used to compute $S_t(x;Z)$ for a given template, and is defined by $$\sigma(\alpha_1) = \begin{cases} 1 & \text{if } \alpha_1 > 1 - \alpha_0 \\ 0 & \text{otherwise.} \end{cases} \qquad (35)$$

The pseudo code of Table 3 shows the pixel assignment procedure for constructing a set of templates that implements the modeling of white space as one of the templates. The value of $\alpha_1$ that is used for template $Q_t$ is denoted $\alpha_1^{(t)}$.

TABLE 3

```
procedure (B, C, Z₁, Z₀) do begin
    while max S_t(x;Z_{σ(α₁⁽ᵗ⁾)},α₁⁽ᵗ⁾) > 0 do begin
        { t ∈ B
          x ∈ C }
        (s, w) := arg max S_t(x;Z_{σ(α₁⁽ᵗ⁾)},α₁⁽ᵗ⁾)
        { t ∈ B
          x ∈ C }
        q_s(w) := 1
        for i = 1 ... N_s do z₁(w + x_i⁽ˢ⁾):= 0
        for i = 1 ... N_s do z₀(w + x_i⁽ˢ⁾):= 1
    end
end
```

The set 510 of character templates illustrated in FIG. 21 has actually been constructed according to the modified procedure of Table 3 using nonuniform foreground probabilities. An example of a "space" character template is shown in template 520 of FIG. 21, where the "space" hyper-white foreground is shown in black. The "space" character template was constructed using $\alpha_1$=0.001, while the remaining templates in the character set of FIG. 21 were constructed using a foreground probability of $\alpha_1$=0.51. The background probability value of $\alpha_0$=0.9 was used.

3. Producing templates comprising arrays of foreground probabilities

In addition to the observation that modeling the white space between semantic units in an image may be useful in performing recognition operations, another common observation about black-on-white images is that pixels of a glyph that lie on the glyph boundary ("edge pixels") are less reliably black than pixels within the interior of the glyph. Representing a character template in a binary form only does not capture this observation about the probability of edge pixels, and so this information is not available during a recognition operation. However, this observation about edge pixels can be formalized by using a different (lower) value of foreground probability $\alpha_1$ for edge pixels than for interior pixels when representing these pixels in a template for a single character, thereby letting $\alpha_1$ vary by template pixel position. The foreground probability for a template pixel position is represented as $\alpha_1^{(t,x)}$, denoting that $\alpha_1$ is a function of both the character template, $Q_t$, and the pixel position x of the template canvas. In the actual operation of the transcription correction method and system of the present invention, it has been observed that image re-recognition using trained character templates having foreground probability values assigned by template pixel position has a significant positive effect on improving transcription correction.

When training data consists of isolated, pre-segmented character samples, it is known which pixels belong to which samples, and therefore to which templates; the samples can be averaged in a conventional manner and quantized to one of several predetermined candidate probability levels. The problem arises, however, that, since templates are trained using unsegmented training data in the present invention, assignment of a color to a pixel in any one particular template canvas is based on the score computations for pixels in all templates, and there is no a priori knowledge about which of the template pixels in any template are likely to be edge pixels. Thus, a priori assignment of candidate values of $\alpha_1$ to particular template pixel locations may not be feasible.

The solution to the $\alpha_1$ assignment problem consists of allowing $\alpha_1^{(t,x)}$ to be assigned automatically and contemporaneously with pixel color assignment, using the same maximum likelihood (ML) criterion of equation (18) that is used for template construction. Potential values of $\alpha_1^{(t,x)}$ are assumed to be drawn from a set of candidate values, denoted A. Experimental results have shown that quality templates are obtained using the set of candidate values A={0.001, 0.6, 0.9, 0.99, 0.999} with a global background parameter of $\alpha_0$=0.9. The pixel color assignment procedures of Table 2 for constructing black-on-white templates having uniform foreground probability values across templates, and the pixel color assignment procedure illustrated in Table 3 having nonuniform foreground probability values across templates, may each be modified to allow for the assignment of $\alpha_1^{(t,x)}$ contemporaneously with pixel color assignment. The required change to the procedure of Table 3 is simply to replace $\alpha_1^{(t)}$ by $\alpha_1^{(t,x)}$ to build an array of foreground pixel values, with reference to the set A as the source of candidate values for $\alpha_1^{(t,x)}$. FIG. 31 shows pseudo code procedure 470 illustrating the modification for contemporaneous assignment of template pixel color and $\alpha_1^{(t,x)}$ value to the procedure in Table 3. In addition to assigning pixel color to template canvas pixels, the algorithm also assigns values to the array $\alpha_1^{(t,x)}$. When the algorithm terminates, if $q_t(x)$=1 then pixel position x of template $Q_t$ is a foreground pixel, as before. The corresponding foreground parameter is given by $\alpha_1^{(t,x)}$. Note that the template disjointness constraint (10), in addition to requiring the assignment of a foreground color to a pixel location in only one template at a time so that the individual black pixels included in one template do not overlap with those in another template, also imposes the rule that a pixel location is assigned only one probability value.

Templates of foreground probabilities constructed in this manner may either be stored as a single probability array per template, or each template can be stored as a set of binary templates, one for each $\alpha_1$ value, with the value of $\alpha_1$ associated with the template. Each of the binary templates may be thought of as a template "level," and the collection of binary templates for a template $Q_t$ may be referred to as a "multi-level template." The template construction process of the transcription correction invention has been implemented using five template levels associated with the foreground $\alpha_1$ candidate values identified above in candidate set A. A pixel having a value of zero in all of the foreground template levels indicates a background pixel. For foreground pixels, a pixel having a value of one at a particular level has the $\alpha_1$ value associated with that level, while a value of zero for a foreground template pixel at that same level indicates that that pixel location either has an actual $\alpha_1$ value associated with a different foreground template level or is a background pixel.

4. Extending the template construction technique to gray-level and color character templates For simplicity of exposition, the discussion of template construction focussed on the case of constructing character templates from binary image samples, where pixel values are directly represented as codes of 0 or 1, and template pixel values are represented as probabilities $\alpha_1^{(t,x)}$. However, most of the concepts presented can be easily generalized to the case where the image pixel values lie in an abstract set. In typical gray-level (i.e., monochrome, continuous tone) images, the value in an image pixel indicates a non-negative intensity represented as an integer from 0 (zero) to 255, where an intensity greater than zero is intended to represent a respective mark or active position in the image. In color images the value of a pixel may be a triple of intensities, one intensity for each color component, for example, red, green and blue. Alternatively, the value in a pixel in a color image may be one of the codes C, M, Y, K, W for cyan, magenta, yellow, black and white. In the case of these non-binary images, the template pixel values in the character templates represent probability distributions on more than two image pixel values. For CMYKW images, for example, the probability distributions can be represented by four probabilities, the fifth being derivable from the first four, since they must sum to one.

The template construction technique may be generalized to produce gray-level or color character templates. In general, the technique is a stepwise optimization procedure in which the likelihood $L_{\{qt\}}(Z|Q_\pi)$, which depends on the collection of templates $\{_{qt}\}$, is iteratively maximized by selecting the template $_{qt}$, the pixel position x, and the value v such that when $_{qt}(x)$ is set to v to obtain a new collection of templates $\{_{q't}\}$, $L_{\{qt\}}(Z|Q_\pi)$ is maximized.

5. Implementing transcription correction in the text line image environment

The automatic transcription correction technique 200 (FIG. 5) of the present invention has been described with respect to what may be called a two-dimensional (2D) implementation in which the formal image source model models a set of 2D images that are conventionally thought of as one or more document page images, and in which decoding of a 2D page image is performed without any initial segmentation into smaller image units such as text lines, words or glyphs. Transcription correction technique 200 may also be implemented in the single text line image environment. In the terminology used herein, the text line image environment is considered to be a one-dimensional (1D) image environment, in contrast to the 2D page image environment. This discussion of the application of the transcription correction technique to the line image environment assumes for simplicity that the term "text line image" or "line image" refers to a horizontal row of glyphs imaged across a page in a substantially colinear arrangement, as is, for example, conventionally found in English text and in musical scores. However, the term "text line image" is equally applicable to substantially colinear arrangements of consecutive glyphs in vertical columns, or in any other arrangement that is characteristic of a particular character system and its notational form, and that complies with the mathematical definition of a text line image source as described below.

From the perspective of processing efficiency, the 2D implementation of transcription correction, and in particular the Viterbi decoding of the 2D image in both the template training and re-recognition processes, involves a computationally complex algorithm. This is particularly true in template training, when decoding is constrained by the transcription message string(s). Decoding of a 2D image may execute in a time frame that is commercially unacceptable, or may require a prohibitively large amount of storage. The 2D implementation may be simplified by factoring the 2D image model into a 1D vertical image source model and one or more 1D horizontal text line image source models. Factoring the 2D image source into its 1D constituent models has the effect of improving the performance of several aspects of Viterbi decoding; decoding is significantly simpler than decoding using a full 2-dimensional model. In particular, the Viterbi algorithm for text line image sources is essentially identical to the well-known segmental form of Viterbi algorithm used in speech recognition.

a. Overview of transcription correction in the text line image environment.

Figure 32:
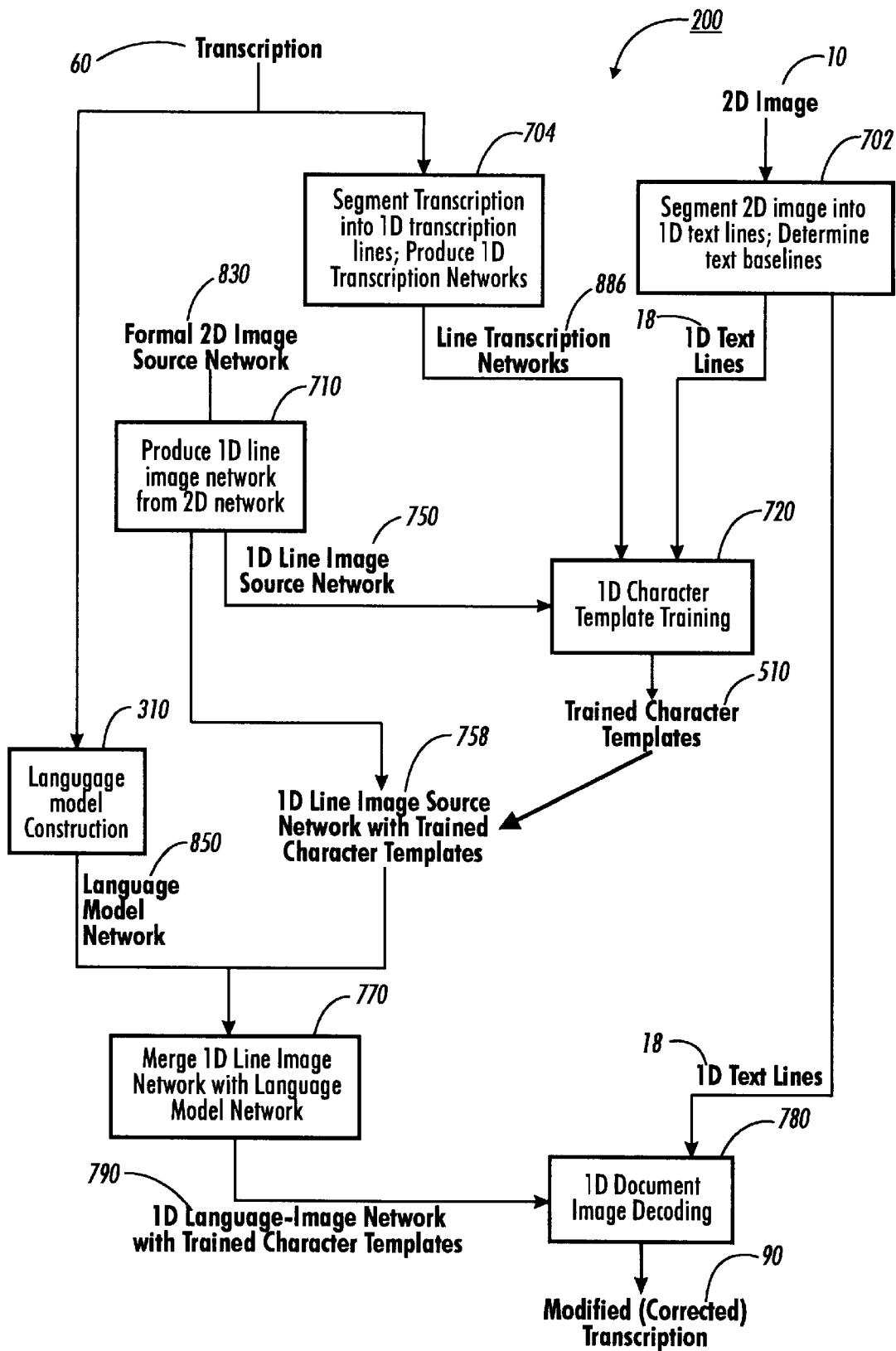
FIG. 32 is a block diagram illustrating the general processes and data flows of the transcription correction technique of the present invention as implemented in the text line (i.e., one-dimensional) image environment.

FIG. 32 is a block diagram illustrating an implementation of transcription correction technique 200 in the single text line image environment. This implementation assumes that the original 2D formal image model 830, the 2D image 10 and original transcription 60 are input into the 1D implementation and that all necessary conversions into 1D forms of these data structures are handled automatically. 2D image source network 830 is automatically factored, in process 710, into constituent 1D models, including 1D text line image network 750 which is a horizontal text line image source model which may be used to decode text line images. Factoring of 2D image source network 830 into its constituent 1D models is described in more detail below.

1D text line image network 750 is then modified according to the two model modifications of template training and language model merging that have been described with respect to the 2D implementation. Process 702 uses a conventional text line image segmentation process to determine the text lines in 2D image 10, and determines the baselines of the individual text lines using a suitable image processing technique for determining baselines. Transcriptions and transcription networks associated with line images have exactly the same general form as those used in the 2D context. In process 704, transcription 60 is divided into individual transcription lines by detecting the newline characters, and a 1D transcription line network is produced for each text transcription line. Segmented text lines 18 and respectively paired transcription line networks are input into 1D character template training process 720 along with 1D text line image network 750. Template training process 720 is described in further detail below.

Language model network 850 is produced using original transcription 60 by process 310 as previously described, and is merged, in process 770, with 1D text line image network 758, which is 1D text line image network 750 combined with trained character templates 510. The operation of network merging process 770 follows the same rules as previously described with respect to merging processes 320 and 324 of FIG. 6 and produces a 1D merged language-image network 790 that includes trained character templates 510. The merged 1D language-image network 790 is then used, in process 780, for the re-recognition of the set of 1D text lines 18 on a line by line basis to produce a set of transcription lines that comprise the modified, corrected transcription 90. Decoding process 780 operates in a manner that is similar to the decoding process described in the discussion accompanying FIGS. 14 and 27 with the notable exception that text line images are decoded individually, resulting in a substantially simpler implementation of Viterbi decoding.

While FIG. 32 illustrates an implementation of transcription correction technique 200 which is entirely automatic, many variations of transcription correction in the 1D image environment that require direct user involvement are also possible. For example, prior to the initiating transcription correction, a user of the transcription correction technique may use an image editor to manually identify the text lines and their baselines in input 2D image 10. Or, the user may manually identify text line endings in the input transcription. In addition, for particularly complex 2D image models, automatic factoring of the model into its 1D constituents may not be possible without user intervention. Thus, user participation may range from no involvement in a fully automatic implementation to considerable involvement in the preparation of each of the three input data structures;

thus, all such implementation variations of transcription correction technique 200 in the 1D image environment are contemplated as being within the scope of the claims that define the invention.

b. Mathematical principles of text line image source models.

Figure 33:
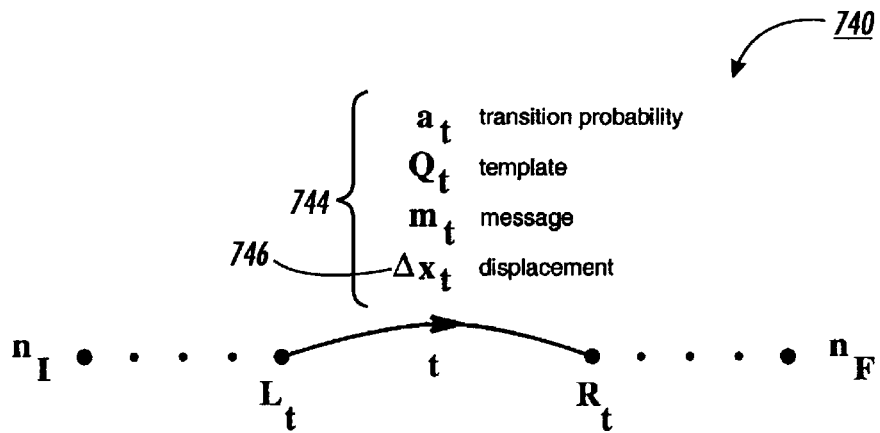
FIG. 33 illustrates a formal text line image source model represented in its general form as a simplified, finite state transition network.

The illustrated implementation of the transcription correction technique utilizes a finite state transition network to represent the input image source model, in a manner similar to that of the 2D environment described above. FIG. 33 shows the general form of a line image source model 740, and is similar in structure to the 2D image model 50 of FIG. 7. Line image source model 740 models the spatial structure of a set of line images as a finite set of states and a set of directed transitions. Each transition connects a pair of states, $L_t$ and $R_t$, that are called, respectively, the predecessor (left) state and the successor (right) state of the transition. Formally, the Markov line image source model 740 of FIG. 33 is a special case of the Markov image source 50 of FIG. 7 in which each complete path π through the model has the same y coordinate of path displacement; that is, $\Delta y\pi$ is the same for each π, where the path displacement $\Delta_\pi$ is defined by equation (8) above.

A simple and very common form of text line image source model models a horizontal text line image in which the y component of each branch displacement is zero, i.e., $\Delta y_t = 0$ for each transition t. It is clear from (8) that $\Delta y_\pi = 0$ for each complete path π through such a source. Moreover, from equations (5) and (6) above, the y coordinates of all of the image positions $x_i$ defined by π will be equal to the y coordinate of the initial position $x_1$. Normally, $x_1 = 0$, as discussed previously. However, the choice of initial y position is arbitrary. Thus, by setting the y position appropriately, a line image source can be used to describe horizontal text lines aligned at any vertical baseline position. When all branch y displacements of a line image source are zero, they can be omitted from the description of the model, suggesting the characterization of the model as being "one-dimensional." This is illustrated in FIG. 33 by showing transition displacement 746 as only the 1D (scalar) displacement $\Delta x_t$, in contrast to FIG. 7 which shows 2D vector displacement 58 ($\Delta_t$).

Note also, however, that since a text line image may include glyphs that are imaged both above and below the text baseline (i.e., glyphs whose image origin positions occur above or below the vertical position that has been determined to be the baseline, relative to other nearby glyphs that are imaged at the baseline), and that such an image is represented as a two-dimensional array of pixels, there clearly may be instances where the text line image source model will be defined to include as a transition data item a 2D vector displacement, $\Delta_t$. The key to defining a one-dimensional image source model in the present context is that $\Delta y_\pi$ for each complete path π through the model equals some constant path displacement that is independent of the path.

More information on line Markov sources is available in A. Kam and G. Kopec, "Separable source models for document image decoding", in Document Recognition II, Luc M. Vincent, Henry S. Baird, Editors, Proc. SPIE 2422, pp. 84–97 (Feb., 1995) (hereafter, Kam and Kopec, "Separable source models"), and in A. Kam, "Heuristic Document Image Decoding Using Separable Markov Models", S. M. Thesis, Massachusetts Institute of Technology, Cambridge, Mass., June, 1993 (hereafter, Kam, "Heuristic Document Image Decoding"). The text line image source model described herein corresponds exactly to what is called a "horizontal subsource with constant y displacement" in the first of these references, and corresponds to what is called a "child HMM" in the second of these references. Both of these references are hereby incorporated by reference herein for all that they teach.

Figure 34:
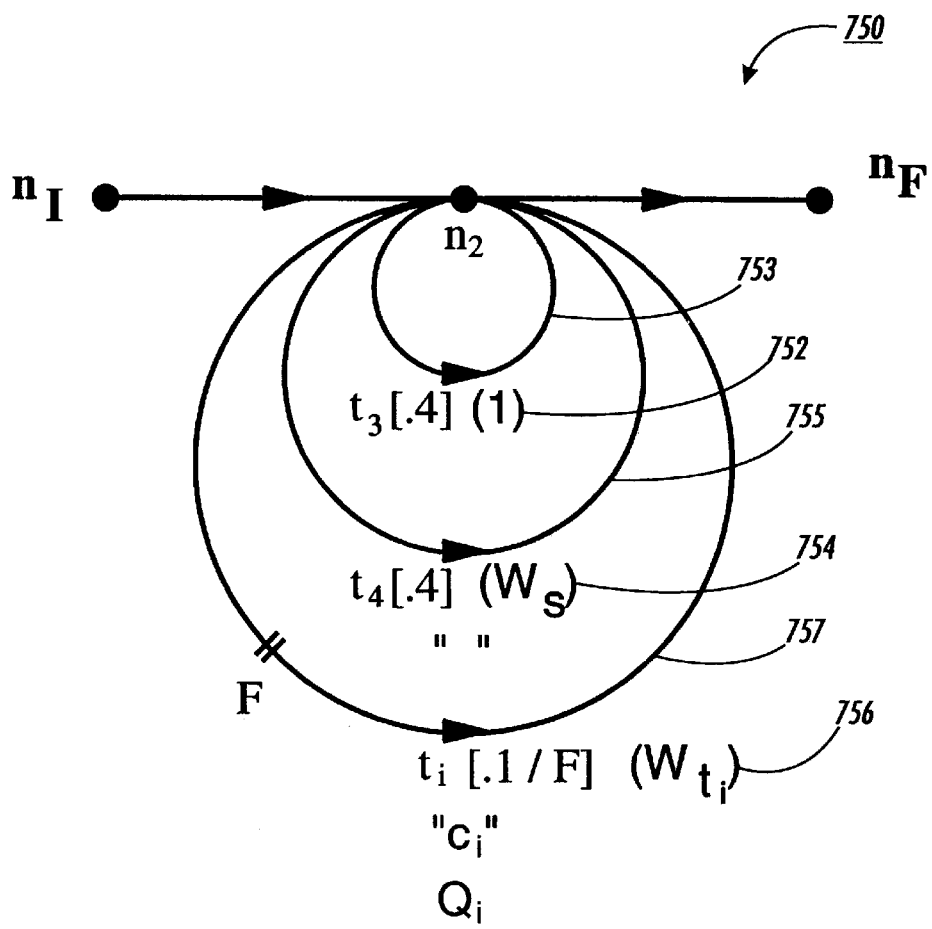
FIG. 34 is a diagram illustrating a finite state transition network modeling a set of text line images having a spatial structure of a single text line, used in implementing the present invention in the text line image environment.

FIG. 34 shows a simple line image source model 750 for lines of printed text. It can be seen that model 750 is the same as the subgraph of the text column model 830 (FIG. 8) that consists of state $n_2$ and the self-transitions 753, 755 and 757 from $n_2$ to $n_2$. As discussed previously, the portion of the text column model around node $n_2$ represents the creation of a horizontal text line. In fact, text line image source model 750 in FIG. 34 may be viewed as the result of extracting the portion of text column model 830 around node $n_2$ and making it a separate model. The branch displacements in FIG. 34 are one-dimensional, as noted above. Self-transition 753 provides for fine horizontal spacing along the baseline; self-transition 755 provides for the imaging of a space character of displacement $W_s$; and self-transition 757 provides for the imaging of a character template $Q_i$ having a horizontal displacement equal to character set width $W_{t_i}$. The message strings generated by the line image model of FIG. 34 differ from those generated by the text column model of FIG. 8 in that they do not include the newline character \n that appears in text column model 830 in FIG. 8 on the transition from state $n_2$ to $n_3$. The newline characters in a text column message are viewed as line separators that are logically part of the page-level markup, rather than as parts of the text lines themselves.

c. Obtaining a text line image source model from a 2D image model.

Certain types of 2D image models are of a form that are able to be automatically factored into 1D constituent models without modification. When a particular 2D image model is of the type that is able to be factored in this manner directly, without modification, it is called a "separable" source model. Other types of 2D image models may only be able to be factored after being converted to an equivalent model that is of a separable form. Generating 1D vertical and horizontal source models from a 2D image model most efficiently, and, for separable 2D models, automatically, in order to take advantage of improved decoding performance, is discussed in detail in Kam and Kopec, "Separable source models" and in Kam, "Heuristic Document Image Decoding." Process 710 in FIG. 32 automatically produces the text line image network 750 of FIG. 34 from 2D image source network 830 of FIG. 8 using the techniques described in these two references.

d. Character template training in the 1D image environment.

Figure 35:
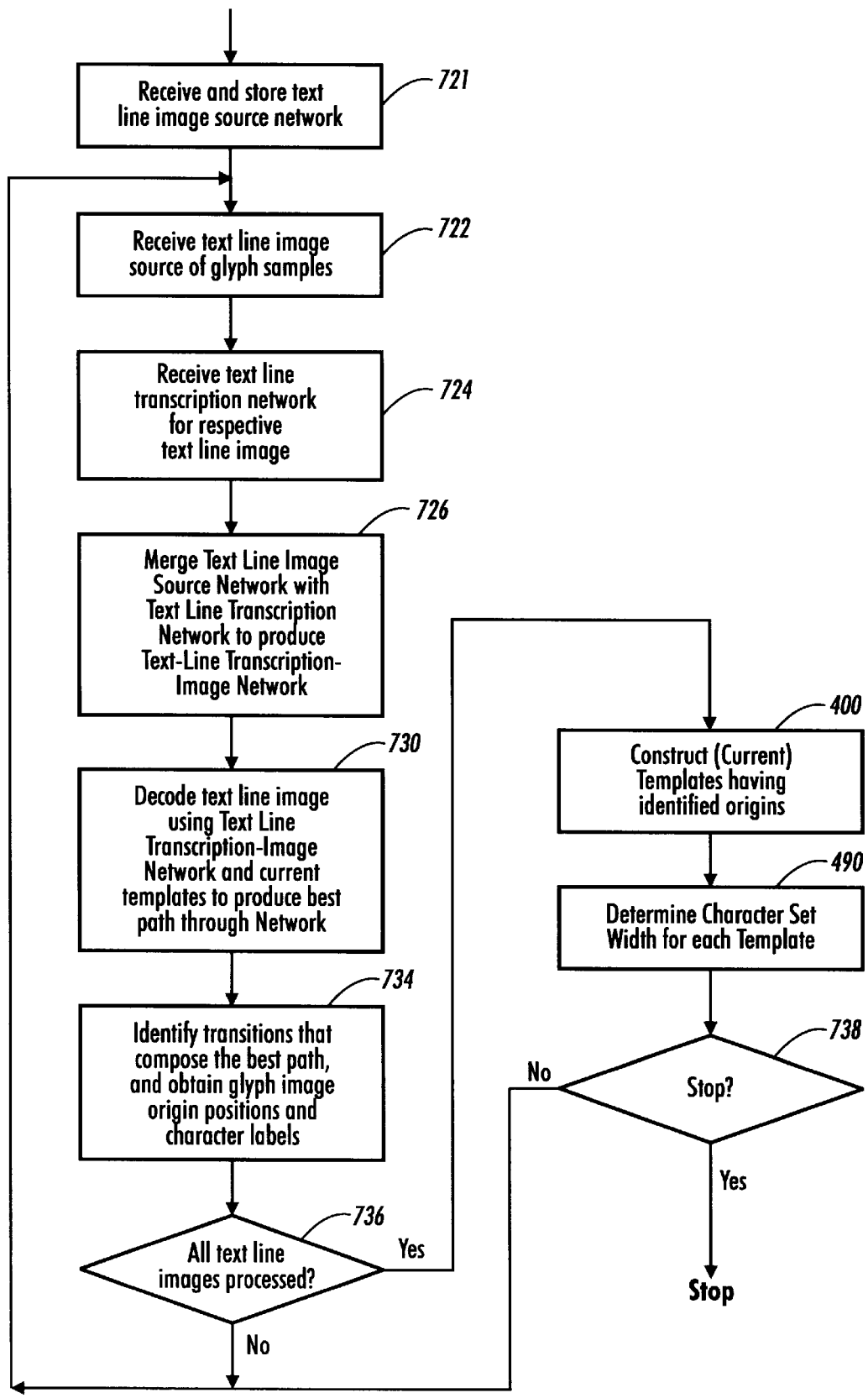
FIG. 35 is a flow chart illustrating the general steps of the character template training process in the text line image environment shown in the block diagram of FIG. 32.

Process 720 performs character template training in the text line environment. The flowchart of FIG. 35 illustrates the steps of an implementation of process 720 that is carried out in the text line environment, that utilizes finite state networks as data structures for representing the text line image source model and the transcription, and that trains templates modeled according to the sidebearing model of character positioning. The text line image source model 750 is received and stored, in box 721. A processing loop begins with box 722 where a text line image is received. The transcription network for the respective text line image is received in box 724.

As in the 2D implementation, identifying labeled glyph positions in the text line image source of glyph samples includes analogous steps: network merging in box 726, Viterbi decoding in box 730, and label and glyph position extraction from transition positions of the best path in box 734. With respect to network merging, the functional properties of the merged text line transcription-image network are the same as those presented previously in the context of the 2D implementation described above (referred to there as network properties (a) and (b)). The step of network merging in box 726 produces a modified text line image source model that is constrained to generate only transcriptions from the set of transcriptions defined by the text line transcription network 886 (FIG. 32). The states of the merged model are initially all pairs of line image source states and transcription network states. The merging process conceptually reflects the three rules for adding transitions to these initial states that have been described in the discussion accompanying FIGS. 10–13. The transitions added to the network after the first step are constructed from line image source transitions for which $m_t=\epsilon$ (i.e. the message associated with t is the null string). The transitions added after the second step of adding transitions are constructed from line image source transitions for which $m_t\neq\epsilon$ (i.e. the message associated with t is a single-character string) and from each transition t' of transcription network 886 for which $m_{t'}=m_t$. Then, the transitions added in the third step are constructed from transcription network transitions for which $m_{t'}=\epsilon$. Finally, a resulting line transcription image network is produced by removing nodes and transitions that cannot lie on any complete path. In actual practice, when the template training procedure is carried out in the 1D image environment using line network models for the image source and transcription, and using literal transcriptions, the merging of the networks becomes a straightforward task, and there is no need to formally carry out the three model merging steps. The merged network can be directly produced from the two input network sources.

Decoding the text line image source image to produce the best path through the line transcription image network is accomplished in box 730. In the illustrated implementation, Viterbi decoding is used, and, as noted above, since line image source models are essentially 1-dimensional, Viterbi decoding using line image sources is significantly simpler than decoding using a full 2-dimensional model. The transitions, and their image positions, that compose the best path are obtained from backtracing through the nodes of the best path in the same manner as previously described, and labels and glyph sample image origin positions are extracted from the appropriate transitions, in box 734. The glyph sample image origin positions that are directly defined by a path through the line transcription image source network are just x coordinates. Complete glyph sample image origin positions indicating samples in a text line image are generated, trivially, by pairing each of these x coordinates with the text baseline y position.

Once decoding of a first text line image is completed, a test is made in box 736 to determine whether all text line images of glyph samples have been processed; if not, processing returns to step 722. When all samples have been identified, processing continues with template construction process 400, which is carried out in the same manner as previously described. Producing templates defined according to the sidebearing model requires determination of character set widths as described above. Finally, the entire process of identifying samples and constructing templates is iterated until a stopping condition, tested in box 738, is met.

While this invention has been described in conjunction with specific embodiments, it is evident that many alternatives, modifications and variations will be apparent to those skilled in the art. Accordingly, the invention as herein described is intended to embrace all such alternatives, modifications and variations as fall within the scope of the appended claims.

We claim:

1. A method of operating a system to correct errors in a transcription of a text image; the system including a processor and a memory device for storing data; the data stored in the memory device including instruction data the processor executes to operate the system; the processor being connected to the memory device for accessing the data stored therein; the method comprising:

operating the processor to obtain a formal two-dimensional image source model data structure, hereafter referred to as a 2D image model, modeling as a grammar a set of two-dimensional (2D) text images; each 2D text image including a plurality of glyphs occurring therein; each glyph being an image instance of a respective one of a plurality of characters in an input image character set; the 2D image model including mapping data indicating a mapping between a glyph occurring in a 2D text image and a respective message string identifying a character in the input image character set;

operating the processor to obtain an image definition data structure defining a two-dimensional text image, hereafter referred to as an input 2D image of glyphs, including a plurality of glyphs occurring therein representing characters in the input image character set; the input 2D image of glyphs having a vertical dimension size larger than a single line of glyphs; the input 2D image of glyphs being one of the set of 2D text images modeled by the 2D image model;

operating the processor to obtain a first transcription data structure, hereafter referred to as a first transcription, associated with the input 2D image of glyphs; the first transcription including a first ordered arrangement of transcription labels identifying characters in the input image character set represented by the glyphs occurring in the input 2D image of glyphs; the first transcription including at least one transcription error;

operating the processor to modify the mapping data included in the 2D image model using the transcription labels in the first transcription to produce modified mapping data included in a modified 2D image model; and operating the processor to perform a recognition operation on the input 2D image of glyphs using the modified mapping data included in the modified 2D image model; the modified mapping data mapping a sequence of glyphs occurring in a 2D text image to a sequence of respective message strings identifying characters in the input image character set; the sequence of message strings produced by the modified mapping data indicating a second transcription identifying the characters represented by the glyphs occurring in the input 2D image of glyphs and including a message string indicating a correction of the at least one transcription error in the first transcription;

wherein the glyphs included in the input 2D image of glyphs are perceptible as appearing in a visually consistent character image design, hereafter referred to as an input image font;

wherein the mapping data included in the 2D image model includes a first set of character templates;

wherein operating the processor to modify the mapping data included in the 2D image model includes producing character template training data including a plurality of glyph samples and respectively paired glyph labels for each character in the input image character set; each glyph sample being included in the input 2D image of glyphs; each respectively paired glyph label being produced using the first transcription and indicating a respective one of the characters in the input image character set; and producing a second set of character templates using the character template training data; the second set of character templates indicating character images of the characters in the input image character set and being perceptible as appearing in the input image font; and wherein performing the recognition operation on the input 2D image of glyphs using the modified 2D image model includes mapping each glyph occurring in the input 2D image of glyphs to a respective message string identifying the character in the input image character set using the second set of character templates appearing in the input image font.

2. The method of claim 1 of operating a system to correct errors in a transcription wherein the 2D image model includes spatial positioning data modeling spatial positioning of the plurality of glyphs occurring in a representative one of the set of 2D text images modeled by the 2D image model; and wherein operating the processor to produce the character template training data includes operating the processor to determine a 2D image position indicating an image location of each glyph sample occurring in the input 2D image of glyphs using the spatial positioning data included in the 2D image model; and operating the processor to produce the respectively paired glyph label for each glyph sample using the mapping data included in the 2D image model and using the first transcription; the transcription labels included in the first transcription providing the message strings mapped to respective ones of the glyph samples.

3. The method of claim 1 of operating a system to correct errors in a transcription wherein the 2D image model is represented as a stochastic finite state network data structure indicating a regular grammar, hereafter referred to as a 2D image network; the 2D image network modeling the set of 2D text images as a series of nodes and transitions between pairs of the nodes; the 2D image network representing the mapping data as at least one sequence of transitions from a first node to a final node, called a path, through the 2D image network; each transition included in the at least one path indicating path data items associated therewith and accessible by the processor; the path data items including an image displacement and a message string;

wherein the transcription data structure associated with the input 2D image of glyphs is represented as a finite state network data structure, hereafter referred to as a transcription network, modeling the transcription as a series of transcription nodes and a sequence of transitions between pairs of the transcription nodes; each transition having a transcription label associated therewith; a sequence of transitions, called a transcription path, through the transcription network indicating the ordered arrangement of the transcription labels in the transcription; and wherein operating the processor to produce the character template training data further includes merging the series of nodes of the 2D image network with the series of transcription nodes of the transcription network to produce a transcription-image network representing the modified mapping data as at least one complete transcription-image path through the transcription-image network; the transcription labels in the transcription network providing the message strings associated with transitions in the transcription-image network;

performing a decoding operation on the input 2D image of glyphs using the transcription-image network to produce the at least one complete transcription-image path; a transition included in the at least one complete transcription-image path indicating the path data items and mapping a 2D image position of a respective one of the glyphs occurring in the input 2D image of glyphs, computed using the image displacement, to a respective one of the transcription labels indicating a character in the input image character set; the transcription label providing the respectively paired glyph label included in the character template training data; and obtaining, from transitions included in the at least one complete transcription-image path, the 2D image position in the input 2D image of glyphs indicating an image location of a glyph sample in the input 2D image of glyphs and the glyph label paired therewith.

4. The method of claim 1 of operating a system to correct errors in a transcription wherein each glyph sample of the character template training data is represented as a 2D image pixel position included in a sample image region in the input 2D image of glyphs; each sample image region including a plurality of image pixel positions in the input 2D image of glyphs, hereafter referred to as sample pixel positions, each indicating a sample pixel value; and wherein producing the second set of character templates using the character template training data includes operating the processor to produce, for each respective character template in the second set of character templates, a template image region including a plurality of template pixel positions for storing the respective character template; and operating the processor to produce the set of character templates using the template image regions and the sample image regions; producing the set of character templates including (a) producing an image definition data structure for defining and storing an ideal image; the ideal image being represented as a function of the second set of character templates being trained, and being a reconstruction of the input 2D image of glyphs formed by positioning respective ones of the character templates in the second set of character templates in an image plane at ideal image pixel positions indicating 2D image pixel positions of glyph samples occurring in the input 2D image of glyphs; each respective one of the character templates positioned in the ideal image being identified by the glyph label paired with the 2D image pixel position;

(b) computing pixel scores for template pixel positions in template image regions using the sample pixel values of selected ones of the sample pixel positions in selected ones of the sample image regions included in the input 2D image of glyphs; and (c) sequentially assigning a pixel value to selected template pixel positions in selected template image regions; the selected template pixel positions being selected on the basis of the pixel scores optimizing the function representing the ideal image such that, when all template pixel positions have been assigned pixel values, the pixel value assigned to each selected template pixel position optimizes a matching score measuring a match between the input 2D image of glyphs and the ideal image.

5. The method of claim 1 of operating a system to correct errors in a transcription wherein each sample image region of the character template training data includes a 2D image pixel position indicating an input 2D image location of a glyph and is identified as a training data sample for the character template indicated by the respectively paired glyph label; each sample image region including a plurality of image pixel positions in the input 2D image of glyphs, hereafter referred to as sample pixel positions, each indicating a sample pixel value; and wherein producing the second set of character templates using the character template training data includes operating the processor to produce, for each respective character template in the second set of character templates, a template image region including a plurality of template pixel positions for storing the respective character template; and operating the processor to produce the set of character templates using the template image regions and the sample image regions; producing the set of character templates including (a) computing template pixel scores for respective ones of the template pixel positions in the template image regions using the sample pixel values indicated by the sample pixel positions included in the sample image regions;

(b) assigning a foreground pixel value to a template pixel position, referred to as an assigned template pixel position, in one of the template image regions; the assigned template pixel position being selected on the basis of the template pixel scores;

(c) modifying the sample pixel values of the sample pixel positions used in computing the template pixel score for the assigned template pixel position to indicate modified sample pixel values that, when used in computing a subsequent template pixel score for an unassigned template pixel position, reduce the chance that a foreground pixel value will be assigned to the unassigned template pixel position on the basis of the subsequent template pixel score; and (d) repeating substeps (a), (b) and (c) until a stopping condition indicates that the second set of character templates is complete.

6. The method of claim 1 of operating a system to correct errors in a transcription wherein each character template included in the second set of character templates is based on a character template model defining character image positioning of first and second adjacent character images in an image, referred to as a sidebearing model of character image positioning, wherein a template image origin position of the second character image is displaced in the image by a character set width from a template image origin position of the first character image adjacent to and preceding the second character image; the sidebearing model of character image positioning requiring that, when a first rectangular bounding box drawn to contain the first character image overlaps with a second rectangular bounding box drawn to contain the second character image, the first and second character images have substantially nonoverlapping foreground pixels; and wherein operating the processor to produce the second set of character templates further includes determining, for each character template, a character set width thereof using the character template training data.

7. A method of operating a system to correct errors in a transcription of a text image; the system including a processor and a memory device for storing data; the data stored in the memory device including instruction data the processor executes to operate the system; the processor being connected to the memory device for accessing the data stored therein; the method comprising:

operating the processor to obtain a formal two-dimensional image source model data structure, hereafter referred to as a 2D image model, modeling as a grammar a set of two-dimensional (2D) text images; each 2D text image including a plurality of glyphs occurring therein; each glyph being an image instance of a respective one of a plurality of characters in an input image character set; the 2D image model including mapping data indicating a mapping between a glyph occurring in a 2D text image and a respective message string identifying a character in the input image character set;

operating the processor to obtain an image definition data structure defining a two-dimensional text image, hereafter referred to as an input 2D image of glyphs, including a plurality of glyphs occurring therein representing characters in the input image character set; the input 2D image of glyphs having a vertical dimension size larger than a single line of glyphs; the input 2D image of glyphs being one of the set of 2D text images modeled by the 2D image model;

operating the processor to obtain a first transcription data structure, hereafter referred to as a first transcription, associated with the input 2D image of glyphs; the first transcription including a first ordered arrangement of transcription labels identifying characters in the input image character set represented by the glyphs occurring in the input 2D image of glyphs; the first transcription including at least one transcription error;

operating the processor to modify the mapping data included in the 2D image model using the transcription labels in the first transcription to produce modified mapping data included in a modified 2D image model; and operating the processor to perform a recognition operation on the input 2D image of glyphs using the modified mapping data included in the modified 2D image model; the modified mapping data mapping a sequence of glyphs occurring in a 2D text image to a sequence of respective message strings identifying characters in the input image character set; the sequence of message strings produced by the modified mapping data indicating a second transcription identifying the characters represented by the glyphs occurring in the input 2D image of glyphs and including a message string indicating a correction of the at least one transcription error in the first transcription;

wherein operating the processor to modify the mapping data included in the 2D image model includes constructing a language model using the transcription labels included in the first transcription; the language model modeling as a grammar the ordered arrangement of the transcription labels indicated by the first transcription as at least two sequences of transcription labels; one of the sequences of transcription labels indicating the ordered arrangement of the transcription labels indicated by the first transcription; and combining the language model with the mapping data included in the 2D image model to produce the modified mapping data included in the modified 2D image model; the modified mapping data constraining the mapping between a glyph occurring in a 2D text image and a respective message string identifying a character in the input image character set to map a sequence of glyphs to a sequence of respective message strings indicated by the language model and identifying characters in the input image character set; the sequence of respective message strings produced by the modified mapping data being one of the at least two sequences of transcription labels occurring in the first transcription.

8. The method of claim 7 of operating a system to correct errors in a transcription wherein the language model constructed using the transcription labels included in the first transcription is a character n-gram model indicating a plurality of sequences of n transcription labels occurring in the first transcription.

9. The method of claim 8 of operating a system to correct errors in a transcription wherein the language model is a character bigram model.

10. The method of claim 8 wherein the sequences of n transcription labels indicated by the character n-gram model include at least one sequence of transcription labels added using information about the language represented by the glyphs occurring in the input 2D text image.

11. The method of claim 7 of operating a system to correct errors in a transcription wherein the 2D image model is represented as a stochastic finite state network data structure indicating a regular grammar, hereafter referred to as a 2D image network; the 2D image network modeling the set of 2D text images as a series of nodes and transitions between pairs of the nodes; the 2D image network representing the mapping data as at least one sequence of transitions from a first node to a final node, called a path, through the 2D image network; each transition included in the at least one path indicating path data items associated therewith and accessible by the processor; the path data items including an image displacement and a message string;

wherein constructing the language model using the transcription labels included in the first transcription includes constructing a language model network represented as a finite state network data structure; the language model network modeling the plurality of sequences of transcription labels as a series of transcription nodes and a sequence of transitions between pairs of the transcription nodes; each transition in the language model network having a transcription label associated therewith; a sequence of transitions, called a language model path, through the language model network indicating one of the plurality of sequences of transcription labels;

wherein operating the processor to combine the language model with the mapping data included in the 2D image model includes merging the series of nodes of the 2D image network with the series of transcription nodes of the language model network to produce a language-image network representing the modified mapping data as at least one complete language-image path through the language-image network; the transcription labels in the language model network providing the message strings associated with transitions in the language-image network; and wherein performing the recognition operation on the input 2D image of glyphs using the modified mapping data includes performing the recognition operation using the language-image network; the second transcription being produced by extracting the sequence of message strings from the sequence of transitions included in the at least one complete language-image path through the language-image network.

12. A method of operating a system to correct errors in a transcription of a text image; the system including a processor and a memory device for storing data; the data stored in the memory device including instruction data the processor executes to operate the system; the processor being connected to the memory device for accessing the data stored therein; the method comprising:

operating the processor to obtain a stochastic finite state network data structure, hereafter referred to as a two-dimensional (2D) image network; the 2D image network modeling as a grammar a set of 2D text images, each including a plurality of glyphs; the 2D image network including a first set of character templates representing character images in an input image character set; a representative one of the set of 2D text images being modeled as at least one path through the 2D image network; the at least one path indicating path data items associated therewith and accessible by the processor; the path data items indicating character templates included in the first set of character templates, image origin positions, and message strings such that the at least one path through the 2D image network maps respective ones of the plurality of glyphs included in the representative image to message strings indicating characters in the input image character set;

operating the processor to obtain an image definition data structure defining a two-dimensional text image, hereafter referred to as an input 2D image of glyphs, including a plurality of glyphs occurring therein representing characters in the input image character set; the input 2D image of glyphs having a vertical dimension size larger than a single line of glyphs; the input 2D image of glyphs being one of the set of 2D text images modeled by the 2D image model;

operating the processor to obtain a first transcription data structure, hereafter referred to as a first transcription, associated with the input 2D image of glyphs; the first transcription including a first ordered arrangement of transcription labels identifying characters in the input image character set represented by the glyphs occurring in the input 2D image of glyphs; the first transcription including at least one transcription error;

operating the processor to produce a second set of character templates using the 2D image model; the second set of character templates being produced using character template training data produced using the first transcription and the input 2D image;

operating the processor to construct a language model network represented as a finite state network data structure using the transcription labels included in the first transcription; the language model network modeling a plurality of sequences of transcription labels occurring in the first transcription as a series of transcription nodes and a sequence of transitions between pairs of the transcription nodes; each transition in the language model network having a transcription label associated therewith; a sequence of transitions, called a language model path, through the language model network indicating one of the plurality of sequences of transcription labels;

operating the processor to merge the series of nodes of the 2D image network with the series of transcription nodes of the language model network to produce a language-image network; the transcription labels in the language model network providing the message strings associated with transitions in the language-image network; and operating the processor to perform a decoding operation on the input 2D image of glyphs using the language-image network including the second set of character templates to produce at least one complete language-image path through the language-image network; the language-image network mapping a plurality of glyphs included in the input 2D image of glyphs to a sequence of message strings indicating characters in the input image character set such that the sequence of message strings indicates one of the plurality of sequences of transcription labels indicated by a language model path through the language model network and the sequence of message strings includes a message string that indicates a correction for the at least one transcription error; the sequence of message strings indicating a second, corrected transcription.

13. The method of claim 12 wherein the decoding operation performed on the input 2D image of glyphs using the language-image network is a dynamic programming based decoding operation.

14. The method of claim 12 of operating a system to correct errors in a transcription wherein each character template included in the second set of character templates is based on a character template model defining character image positioning of first and second adjacent character images in an image, referred to as a sidebearing model of character image positioning, wherein a template image origin position of the second character image is displaced in the image by a character set width from a template image origin position of the first character image adjacent to and preceding the second character image; the sidebearing model of character image positioning requiring that, when a first rectangular bounding box drawn to contain the first character image overlaps with a second rectangular bounding box drawn to contain the second character image, the first and second character images have substantially nonoverlapping foreground pixels; and wherein operating the processor to produce the second set of character templates further includes determining, for each character template, a character set width thereof using the character template training data.

15. A method of operating a system to correct errors in a transcription of a text image; the system including a processor and a memory device for storing data; the data stored in the memory device including instruction data the processor executes to operate the system; the processor being connected to the memory device for accessing the data stored therein; the method comprising:

operating the processor to obtain a formal two-dimensional image source model data structure, hereafter referred to as a 2D image model, modeling as a grammar a set of two-dimensional (2D) text images; each 2D text image including a plurality of glyphs occurring therein; each glyph being an image instance of a respective one of a plurality of characters in an input image character set; the 2D image model including mapping data indicating a mapping between a glyph occurring in a 2D text image and a respective message string identifying a character in the input image character set;

operating the processor to obtain an image definition data structure defining a two-dimensional text image, hereafter referred to as an input 2D image of glyphs, including a plurality of glyphs occurring therein representing characters in the input image character set; the input 2D image of glyphs having a vertical dimension size larger than a single line of glyphs; the input 2D image of glyphs being one of the set of 2D text images modeled by the 2D image model;

operating the processor to obtain a first transcription data structure, hereafter referred to as a first transcription, associated with the input 2D image of glyphs; the first transcription including a first ordered arrangement of transcription labels identifying characters in the input image character set represented by the glyphs occurring in the input 2D image of glyphs; the first transcription including at least one transcription error;

operating the processor to modify the mapping data included in the 2D image model using the transcription labels in the first transcription to produce modified mapping data included in a modified 2D image model; and operating the processor to perform a recognition operation on the input 2D image of glyphs using the modified mapping data included in the modified 2D image model; the modified mapping data mapping a sequence of glyphs occurring in a 2D text image to a sequence of respective message strings identifying characters in the input image character set; the sequence of message strings produced by the modified mapping data indicating a second transcription identifying the characters represented by the glyphs occurring in the input 2D image of glyphs and including a message string indicating a correction of the at least one transcription error in the first transcription;

wherein the step of operating the processor to modify the mapping data included in the 2D image model includes operating the processor to perform a constraining operation on the 2D image model using the first transcription to produce the modified mapping data; the modified mapping data included in the 2D image model being capable of producing a representative transcription of a 2D text image that indicates the first ordered arrangement of transcription labels included in the first transcription; the constraining operation and the modified mapping data together preventing the recognition operation from producing all possible message strings capable of being produced by the mapping data of the 2D image model in an unmodified form and limiting the recognition operation to producing a second transcription identifying only the characters represented by the glyphs occurring in the input 2D image of glyphs.

* * * * *